US012681625B2

(12) United States Patent
Santos et al.

(10) Patent No.: US 12,681,625 B2
(45) Date of Patent: Jul. 14, 2026

(54) STICKER CREATION FOR MESSAGING

(71) Applicant: Apple Inc., Cupertino, CA (US)

(72) Inventors: Ron C. Santos, San Jose, CA (US); Jennifer P. Chen, Mountain View, CA (US); Saumitro Dasgupta, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/328,478

(22) Filed: Jun. 2, 2023

(65) Prior Publication Data

US 2023/0393719 A1     Dec. 7, 2023

Related U.S. Application Data

(60) Provisional application No. 63/365,876, filed on Jun. 5, 2022.

(51) Int. Cl.
| | |
|---|---|
| *G06F 3/048* | (2013.01) |
| *G06F 3/0482* | (2013.01) |
| *G06F 3/04845* | (2022.01) |
| *G06T 11/00* | (2006.01) |
| *G06V 10/22* | (2022.01) |
| *H04M 1/72439* | (2021.01) |
| *H04N 23/63* | (2023.01) |

(52) U.S. Cl.
CPC ........ *G06F 3/04845* (2013.01); *G06F 3/0482* (2013.01); *G06T 11/001* (2013.01); *G06V 10/225* (2022.01); *G06V 10/235* (2022.01); *H04M 1/72439* (2021.01); *H04N 23/631* (2023.01); *G06T 2200/24* (2013.01); *H04M 2250/52* (2013.01)

(58) Field of Classification Search
CPC .. G06F 3/04845; G06F 3/0482; G06T 11/001; G06T 2200/24; G06V 10/225; G06V 10/235; H04M 1/72439; H04M 2250/52; H04N 23/631
See application file for complete search history.

(56) References Cited

U.S. PATENT DOCUMENTS

| | | | |
|---|---|---|---|
| 6,323,846 | B1 | 11/2001 | Westerman et al. |
| 6,570,557 | B1 | 5/2003 | Westerman et al. |
| 6,677,932 | B1 | 1/2004 | Westerman |
| 7,614,008 | B2 | 11/2009 | Ording |

(Continued)

FOREIGN PATENT DOCUMENTS

| | | |
|---|---|---|
| CN | 105874447 A | 8/2016 |
| CN | 106575149 A | 4/2017 |

(Continued)

OTHER PUBLICATIONS

Advisory Action received for U.S. Appl. No. 16/145,033, mailed on Nov. 2, 2021, 5 pages.

(Continued)

*Primary Examiner* — Rashawn N Tillery

(74) *Attorney, Agent, or Firm* — Kubota & Basol LLP

(57) ABSTRACT

In some embodiments, an electronic device detects a first user input corresponding to a request to initiate a process to create a first sticker based on a first image including one or more objects, and facilitates creation of the sticker based on the first image. The first sticker can then be displayed in a messaging conversation.

49 Claims, 34 Drawing Sheets

(56) References Cited

U.S. PATENT DOCUMENTS

| | | | |
|---|---|---|---|
| 7,633,076 B2 | 12/2009 | Huppi et al. | |
| 7,653,883 B2 | 1/2010 | Hotelling et al. | |
| 7,657,849 B2 | 2/2010 | Chaudhri et al. | |
| 7,663,607 B2 | 2/2010 | Hotelling et al. | |
| 7,844,914 B2 | 11/2010 | Andre et al. | |
| 7,957,762 B2 | 6/2011 | Herz et al. | |
| 8,006,002 B2 | 8/2011 | Kalayjian et al. | |
| 8,239,784 B2 | 8/2012 | Hotelling et al. | |
| 8,279,180 B2 | 10/2012 | Hotelling et al. | |
| 8,381,135 B2 | 2/2013 | Hotelling et al. | |
| 8,479,122 B2 | 7/2013 | Hotelling et al. | |
| 8,566,403 B2 | 10/2013 | Pascal et al. | |
| 9,338,242 B1 | 5/2016 | Suchland et al. | |
| 9,348,458 B2 | 5/2016 | Hotelling et al. | |
| 9,875,511 B1* | 1/2018 | Baubert | G06Q 20/322 |
| 9,904,906 B2 | 2/2018 | Kim et al. | |
| 9,933,937 B2 | 4/2018 | Lemay et al. | |
| 10,019,136 B1 | 7/2018 | Ozog | |
| 10,051,103 B1 | 8/2018 | Gordon et al. | |
| 10,269,164 B1* | 4/2019 | Song | G06T 11/60 |
| 10,270,983 B1 | 4/2019 | Van Os et al. | |
| 10,362,219 B2* | 7/2019 | Wilson | G06T 7/70 |
| 10,375,313 B1 | 8/2019 | Van Os et al. | |
| 10,521,948 B2* | 12/2019 | Rickwald | H04L 51/52 |
| 10,595,169 B2* | 3/2020 | Peterson | H04W 4/14 |
| 10,659,405 B1* | 5/2020 | Chang | G06F 3/04817 |
| 2002/0015024 A1 | 2/2002 | Westerman et al. | |
| 2005/0190059 A1 | 9/2005 | Wehrenberg | |
| 2006/0017692 A1 | 1/2006 | Wehrenberg et al. | |
| 2006/0033724 A1 | 2/2006 | Chaudhri et al. | |
| 2006/0197753 A1 | 9/2006 | Hotelling | |
| 2007/0271340 A1 | 11/2007 | Goodman et al. | |
| 2008/0320391 A1 | 12/2008 | Lemay et al. | |
| 2009/0113315 A1 | 4/2009 | Fisher et al. | |
| 2010/0299601 A1 | 11/2010 | Kaplan et al. | |
| 2011/0142299 A1* | 6/2011 | Akbarzadeh | G06V 40/172 382/118 |
| 2013/0054634 A1 | 2/2013 | Chakraborty et al. | |
| 2013/0205210 A1 | 8/2013 | Jeon et al. | |
| 2014/0025737 A1 | 1/2014 | Kruglick | |
| 2014/0181205 A1 | 6/2014 | Sherrets et al. | |
| 2015/0074615 A1* | 3/2015 | Han | G06F 21/41 715/863 |
| 2015/0124105 A1* | 5/2015 | Imahira | H04N 1/00164 348/207.1 |
| 2015/0180980 A1 | 6/2015 | Welinder et al. | |
| 2015/0185995 A1 | 7/2015 | Shoemaker et al. | |
| 2015/0227609 A1 | 8/2015 | Shoemaker et al. | |
| 2015/0227782 A1 | 8/2015 | Salvador et al. | |
| 2015/0256491 A1 | 9/2015 | Eatough et al. | |
| 2015/0309672 A1* | 10/2015 | Miwa | G06F 16/434 715/838 |
| 2015/0356615 A1* | 12/2015 | Hagen | G06Q 30/0267 705/14.64 |
| 2016/0044269 A1 | 2/2016 | Kang | |
| 2016/0054841 A1 | 2/2016 | Yang et al. | |
| 2016/0073034 A1 | 3/2016 | Mukherjee et al. | |
| 2016/0202889 A1 | 7/2016 | Shin et al. | |
| 2016/0239724 A1 | 8/2016 | Arfvidsson et al. | |
| 2016/0274769 A1* | 9/2016 | Sakahara | G06T 11/60 |
| 2017/0026430 A1 | 1/2017 | Beckhardt et al. | |
| 2017/0041549 A1 | 2/2017 | Kim et al. | |
| 2017/0063753 A1 | 3/2017 | Probasco et al. | |
| 2017/0083189 A1 | 3/2017 | Yang et al. | |
| 2017/0093780 A1 | 3/2017 | Lieb et al. | |
| 2017/0336960 A1* | 11/2017 | Chaudhri | H04L 51/18 |
| 2017/0344257 A1 | 11/2017 | Gnedin et al. | |
| 2017/0357442 A1* | 12/2017 | Peterson | G06F 9/54 |
| 2018/0005420 A1* | 1/2018 | Bondich | G06V 40/176 |
| 2018/0034765 A1 | 2/2018 | Keszler et al. | |
| 2018/0039406 A1 | 2/2018 | Kong et al. | |
| 2018/0068475 A1* | 3/2018 | Blue | G06T 11/60 |
| 2018/0083898 A1* | 3/2018 | Pham | G06F 40/56 |
| 2018/0143761 A1 | 5/2018 | Choi et al. | |

| | | | |
|---|---|---|---|
| 2018/0165858 A1* | 6/2018 | Ahuja | G06F 3/01 |
| 2018/0182149 A1 | 6/2018 | Chong et al. | |
| 2018/0314409 A1* | 11/2018 | Adilipour | H04L 51/10 |
| 2018/0335927 A1 | 11/2018 | Anzures et al. | |
| 2018/0336715 A1 | 11/2018 | Rickwald et al. | |
| 2019/0339822 A1 | 11/2019 | Devine et al. | |
| 2019/0342507 A1 | 11/2019 | Dye et al. | |
| 2020/0137011 A1* | 4/2020 | Guthery | G06Q 40/12 |
| 2020/0302669 A1 | 9/2020 | Barlier et al. | |
| 2020/0358726 A1 | 11/2020 | Dryer et al. | |
| 2021/0406543 A1* | 12/2021 | Drummond | H04W 4/021 |
| 2022/0326846 A1* | 10/2022 | Park | G06F 3/04883 |
| 2022/0374137 A1 | 11/2022 | Triverio et al. | |
| 2023/0087879 A1* | 3/2023 | An | G06T 13/40 345/474 |
| 2023/0136013 A1* | 5/2023 | Goodrich | H04L 51/10 345/419 |
| 2023/0260127 A1* | 8/2023 | Ben Baruch | G06T 11/00 345/633 |
| 2023/0328400 A1* | 10/2023 | Li | H04N 23/62 348/218.1 |
| 2024/0004521 A1 | 1/2024 | Devine et al. | |
| 2024/0070189 A1* | 2/2024 | Kim | G11B 27/102 |
| 2024/0104808 A1 | 3/2024 | Oefverstroem et al. | |
| 2025/0157116 A1* | 5/2025 | Zeng | G06T 13/80 |

FOREIGN PATENT DOCUMENTS

| | | | | |
|---|---|---|---|---|
| CN | 107122049 A | | 9/2017 | |
| CN | 107710197 A | | 2/2018 | |
| GB | 2550639 A | | 11/2017 | |
| JP | 2005222512 A | * | 8/2005 | |
| WO | 2013/169849 A2 | | 11/2013 | |
| WO | 2014/094199 A1 | | 6/2014 | |
| WO | 2014/105276 A1 | | 7/2014 | |

OTHER PUBLICATIONS

Applicant-Initiated Interview Summary received for U.S. Appl. No. 16/145,033, mailed on Apr. 30, 2021, 4 pages.
Applicant-Initiated Interview Summary received for U.S. Appl. No. 16/145,033, mailed on Jun. 29, 2020, 5 pages.
Applicant-Initiated Interview Summary received for U.S. Appl. No. 16/145,033, mailed on Nov. 24, 2020, 4 pages.
Applicant-Initiated Interview Summary received for U.S. Appl. No. 16/145,033, mailed on Oct. 7, 2021, 4 pages.
Brief Communication Regarding Oral Proceedings received for European Patent Application No. 19724963.4, mailed on Jun. 22, 2021, 2 pages.
Certificate of Examination received for Australian Patent Application No. 2019100490, mailed on Oct. 16, 2019, 2 pages.
Corrected Notice of Allowance received for U.S. Appl. No. 16/145,033, mailed on Jun. 23, 2023, 3 pages.
Decision on Appeal received for U.S. Appl. No. 16/145,033, mailed on Apr. 4, 2023, 9 pages.
Decision to Grant received for Danish Patent Application No. PA201870385, mailed on Mar. 26, 2020, 2 pages.
Decision to Grant received for European Patent Application No. 19724963.4, mailed on Feb. 3, 2022, 2 pages.
Examiner's Answer to Appeal Brief received for U.S. Appl. No. 16/145,033, mailed on Aug. 4, 2022, 10 pages.
Extended European Search Report received for European Patent Application No. 22152524.9, mailed on May 2, 2022, 10 pages.
Final Office Action received for U.S. Appl. No. 16/145,033, mailed on Jul. 6, 2021, 113 pages.
Final Office Action received for U.S. Appl. No. 16/145,033, mailed on Sep. 22, 2020, 49 pages.
Intention to Grant received for Danish Patent Application No. PA201870385, mailed on Jan. 24, 2020, 2 pages.
Intention to Grant received for European Patent Application No. 19724963.4, mailed on Sep. 20, 2021, 7 pages.
International Preliminary Report on Patentability received for PCT Patent Application No. PCT/US2019/024790, mailed on Nov. 19, 2020, 11 pages.

(56) References Cited

OTHER PUBLICATIONS

International Search Report and Written Opinion received for PCT Patent Application No. PCT/US2019/024790, mailed on Sep. 11, 2019, 18 pages.

Invitation to Pay Additional Fee received for PCT Patent Application No. PCT/US2019/024790, mailed on Jul. 18, 2019, 10 pages.

Minutes of the Oral Proceedings received for European Patent Application No. 19724963.4, mailed on Sep. 3, 2021, 6 pages.

Non-Final Office Action received for U.S. Appl. No. 16/145,033, mailed on Feb. 9, 2021, 55 pages.

Non-Final Office Action received for U.S. Appl. No. 16/145,033, mailed on Mar. 4, 2020, 50 pages.

Notice of Acceptance received for Australian Patent Application No. 2019266054, mailed on Nov. 25, 2021, 3 pages.

Notice of Acceptance received for Australian Patent Application No. 2022200514, mailed on Apr. 17, 2023, 3 pages.

Notice of Allowance received for Chinese Patent Application No. 201811136445.7, mailed on Aug. 11, 2021, 2 pages (1 page of English Translation and 1 page of Official Copy).

Notice of Allowance received for U.S. Appl. No. 16/145,033, mailed on Aug. 17, 2023, 8 pages.

Notice of Allowance received for U.S. Appl. No. 16/145,033, mailed on May 3, 2023, 5 pages.

Office Action received for Australian Patent Application No. 2019100490, mailed on Jul. 26, 2019, 4 pages.

Office Action received for Australian Patent Application No. 2019266054, mailed on Aug. 23, 2021, 4 pages.

Office Action received for Australian Patent Application No. 2019266054, mailed on Jun. 29, 2021, 3 pages.

Office Action received for Australian Patent Application No. 2022200514, mailed on Feb. 15, 2023, 2 pages.

Office Action received for Australian Patent Application No. 2022200514, mailed on Jan. 17, 2023, 3 pages.

Office Action received for Chinese Patent Application No. 201811136445.7, mailed on Apr. 14, 2021, 7 pages (4 pages of English Translation and 3 pages of Official Copy).

Office Action received for Chinese Patent Application No. 201811136445.7, mailed on Oct. 28, 2020, 17 pages (10 pages of English Translation and 7 pages of Official Copy).

Office Action received for Danish Patent Application No. PA201870385, mailed on Aug. 23, 2019, 3 pages.

Office Action received for European Patent Application No. 19724963.4, mailed on Jul. 28, 2020, 6 pages.

Record of Oral Hearing received for U.S. Appl. No. 16/145,033, mailed on Apr. 19, 2023, 16 pages.

Result of Consultation received for European Patent Application No. 19724963.4, mailed on Jul. 8, 2021, 3 pages.

Result of Consultation received for European Patent Application No. 19724963.4, mailed on May 31, 2021, 3 pages.

Search Report and Opinion received for Danish Patent Application No. PA201870385, mailed on Nov. 16, 2018, 10 pages.

Summons to Attend Oral Proceedings received for European Patent Application No. 19724963.4, mailed on Dec. 23, 2020, 8 pages.

International Search Report received for PCT Patent Application No. PCT/US2023/024370, mailed on Sep. 7, 2023, 5 pages.

International Search Report received for PCT Patent Application No. PCT/US2024/022386, mailed on Sep. 23, 2024, 7 pages.

Non-Final Office Action received for U.S. Appl. No. 18/520,372, mailed on Dec. 20, 2024, 32 pages.

Non-Final Office Action received for U.S. Appl. No. 18/367,934, mailed on Feb. 27, 2025, 12 pages.

Notice of Allowance received for Chinese Patent Application No. 202111244490.6, mailed on Sep. 23, 2024, 2 pages (1 page of English Translation and 1 page of Official Copy).

Office Action received for Chinese Patent Application No. 202111244490.6, mailed on Apr. 3, 2024, 20 pages (11 pages of English Translation and 9 pages of Official Copy).

Office Action received for Australian Patent Application No. 2023208169, mailed on Dec. 5, 2024, 3 pages.

Office Action received for Australian Patent Application No. 2023208169, mailed on Oct. 2, 2024, 3 pages.

Office Action received for European Patent Application No. 22152524.9, mailed on Jun. 25, 2024, 7 pages.

Office Action received for European Patent Application No. 22152524.9, mailed on Dec. 5, 2023, 8 pages.

Invitation to Pay Additional Fees and Partial International Search Report received for PCT Patent Application No. PCT/US2024/022386, mailed on Aug. 2, 2024, 9 pages.

Written Opinion received for PCT Patent Application No. PCT/US2024/022386, mailed on Sep. 23, 2024, 11 pages.

Non-Final Office Action received for U.S. Appl. No. 18/520,372, mailed on Jun. 18, 2025, 36 pages.

Final Office Action received for U.S. Appl. No. 18/520,372, mailed on Mar. 25, 2025, 37 pages.

Applicant-Initiated Interview Summary received for U.S. Appl. No. 18/367,934, mailed on May 29, 2025, 4 pages.

* cited by examiner

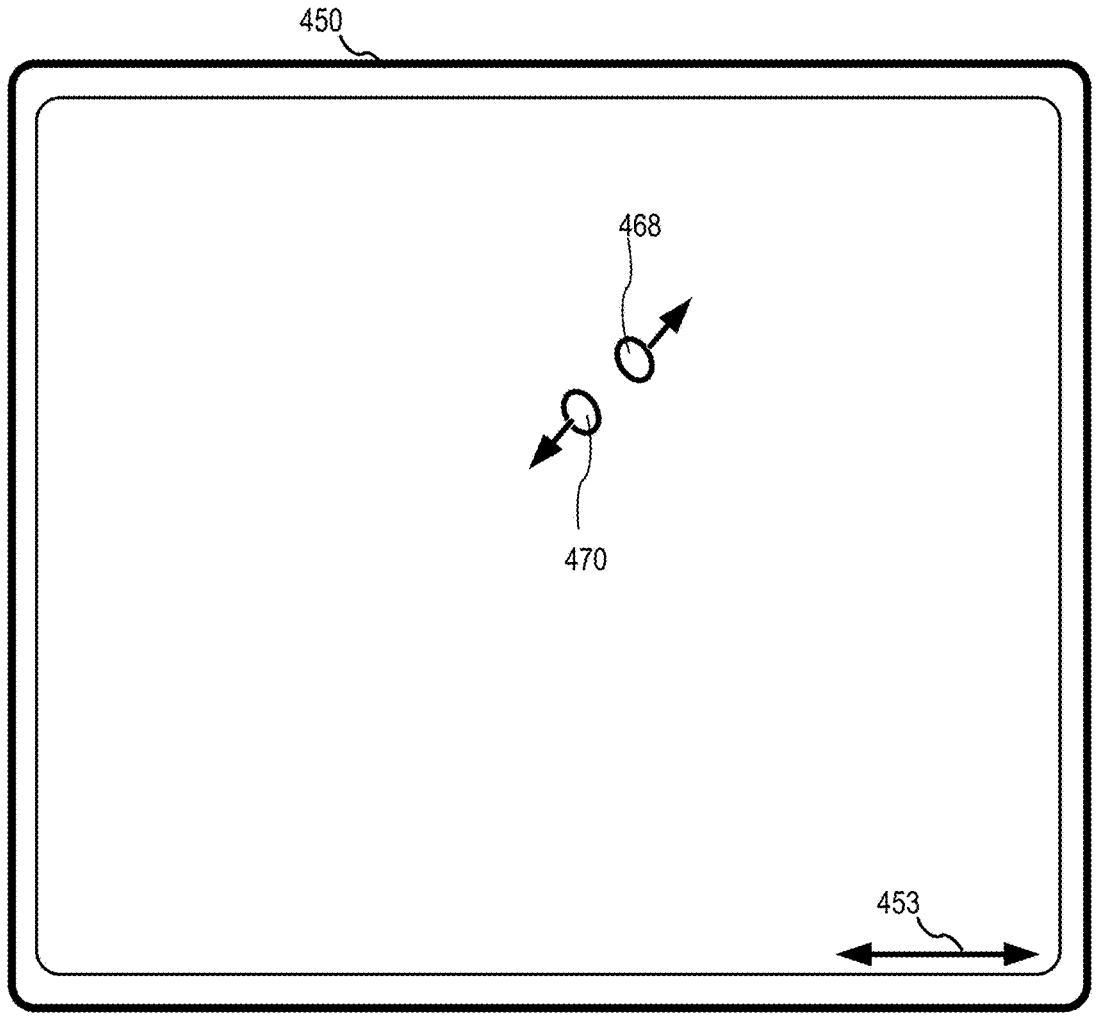
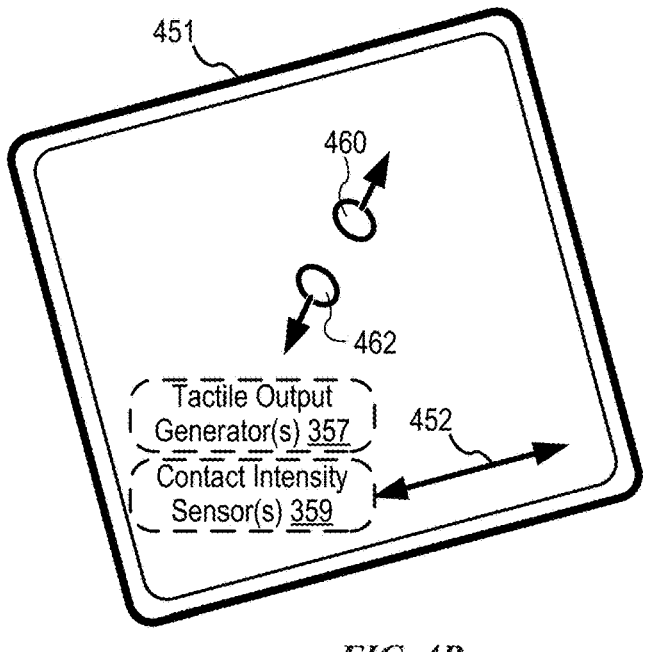
*FIG. 4B*

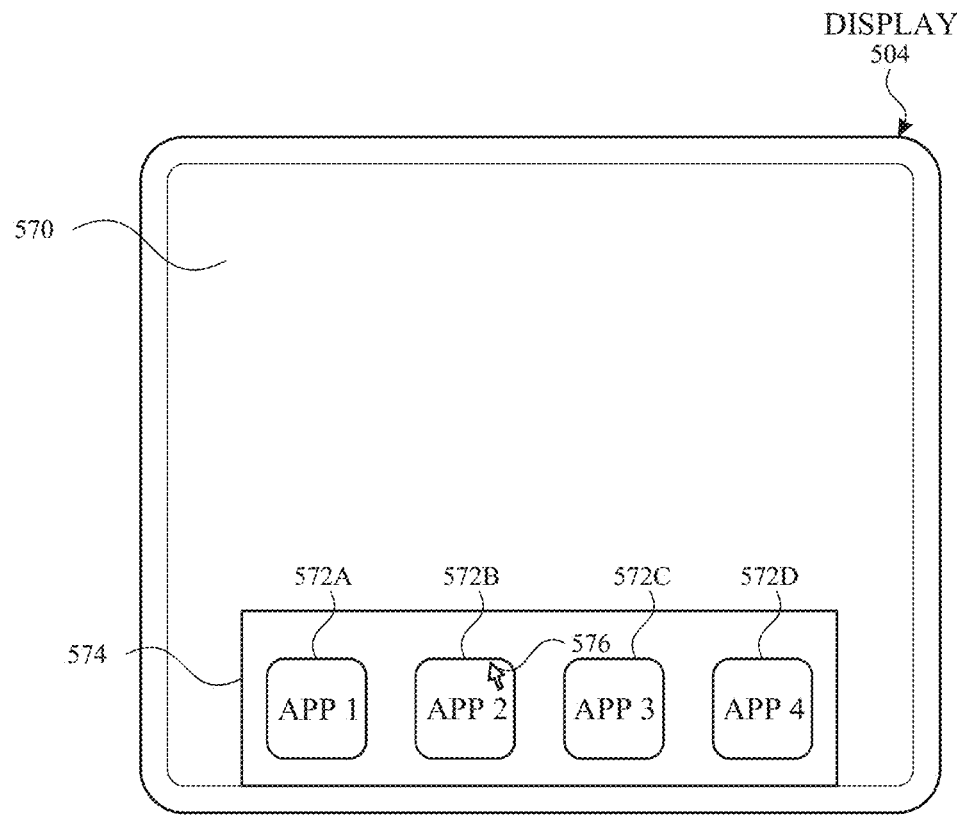
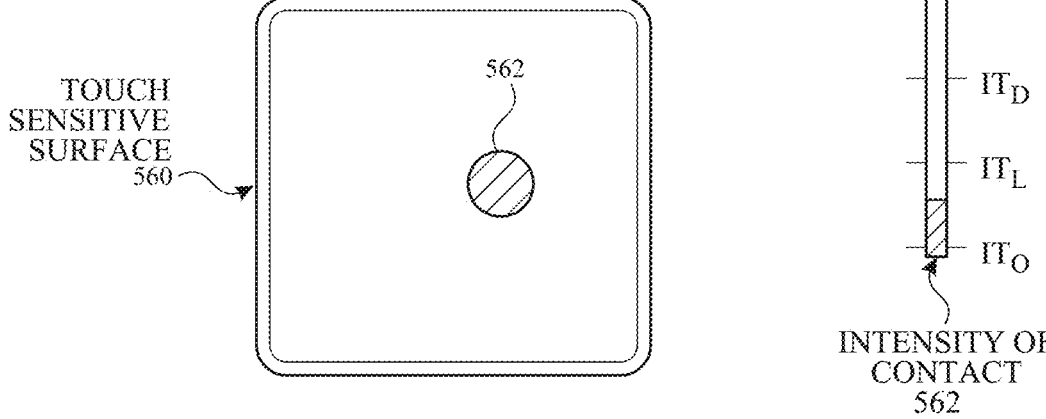
*FIG. 5E*

700

STICKER CREATION FOR MESSAGING

CROSS-REFERENCE TO RELATED APPLICATIONS

This application claims the benefit of U.S. Provisional Application No. 63/365,876, filed Jun. 5, 2022, the content of which is incorporated herein by reference in its entirety for all purposes.

FIELD OF THE DISCLOSURE

This relates generally to user interfaces associated with using a camera to create stickers for use within messaging conversations.

BACKGROUND OF THE DISCLOSURE

User interaction with electronic devices has increased significantly in recent years. These devices can be devices such as computers, tablet computers, televisions, multimedia devices, mobile devices, and the like. In some circumstances, users wish to use devices to create stickers for use within messaging conversations.

SUMMARY OF THE DISCLOSURE

Some embodiments described in this disclosure are directed to one or more electronic devices that detect, via the one or more input devices, a first user input corresponding to a request to initiate a process to create a first sticker based on a first image including one or more objects, wherein the first sticker is for use in a messaging application. Some embodiments described in this disclosure are directed to identifying a first object of the one or more objects in the first image, and generating the first sticker for use within the messaging application, and after initiating the process to create the first sticker, applying the first sticker to a messaging conversation. The full descriptions of the embodiments are provided in the Drawings and the Detailed Description, and it is understood that the Summary provided above does not limit the scope of the disclosure in any way.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIGS. 5E-5H illustrate exemplary components and user interfaces of a personal electronic device in accordance with some embodiments.

FIGS. 5I-5N provide a set of sample tactile output patterns that may be used, either individually or in combination, either as is or through one or more transformations (e.g., modulation, amplification, truncation, etc.), to create suitable haptic feedback in various scenarios and for various purposes, such as those mentioned above and those described with respect to the user interfaces and methods discussed herein.

DETAILED DESCRIPTION

Figure 1A:
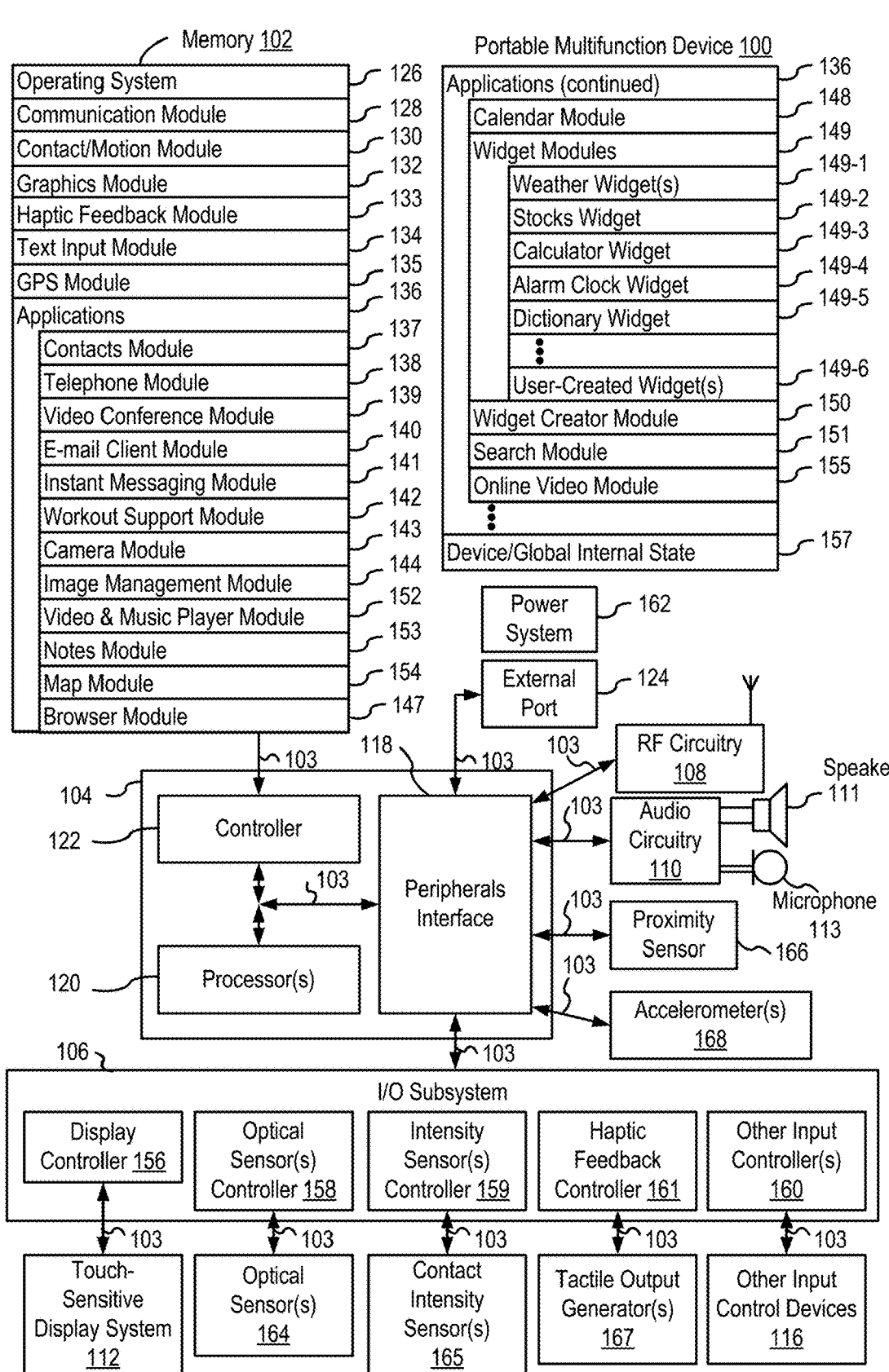
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices to create stickers for use within messaging conversations. Such techniques provide a fun and easy way to create unique and personalized stickers.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touch-pads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6)

U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
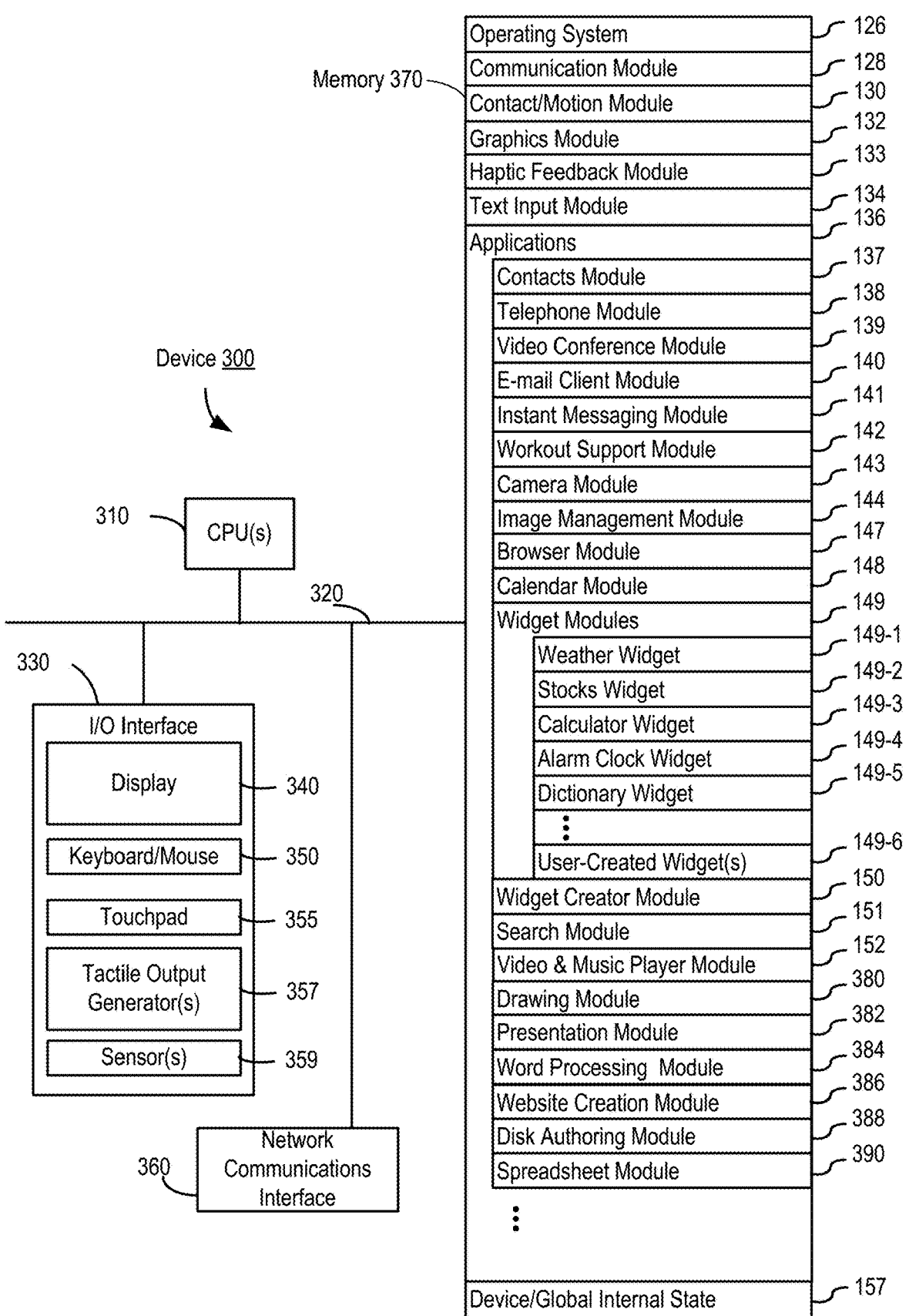
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail client module 140, IM 141, browser 147, and any other application that needs text input).

GPS module 135 determines the location of the device and provides this information for use in various applications (e.g., to telephone module 138 for use in location-based dialing; to camera module 143 as picture/video metadata;

and to applications that provide location-based services such as weather widgets, local yellow page widgets, and map/navigation widgets).

Applications 136 optionally include the following modules (or sets of instructions), or a subset or superset thereof:

- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;
- Search module 151;
- Video and music player module 152, which merges video player module and music player module;
- Notes module 153;
- Map module 154; and/or
- Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
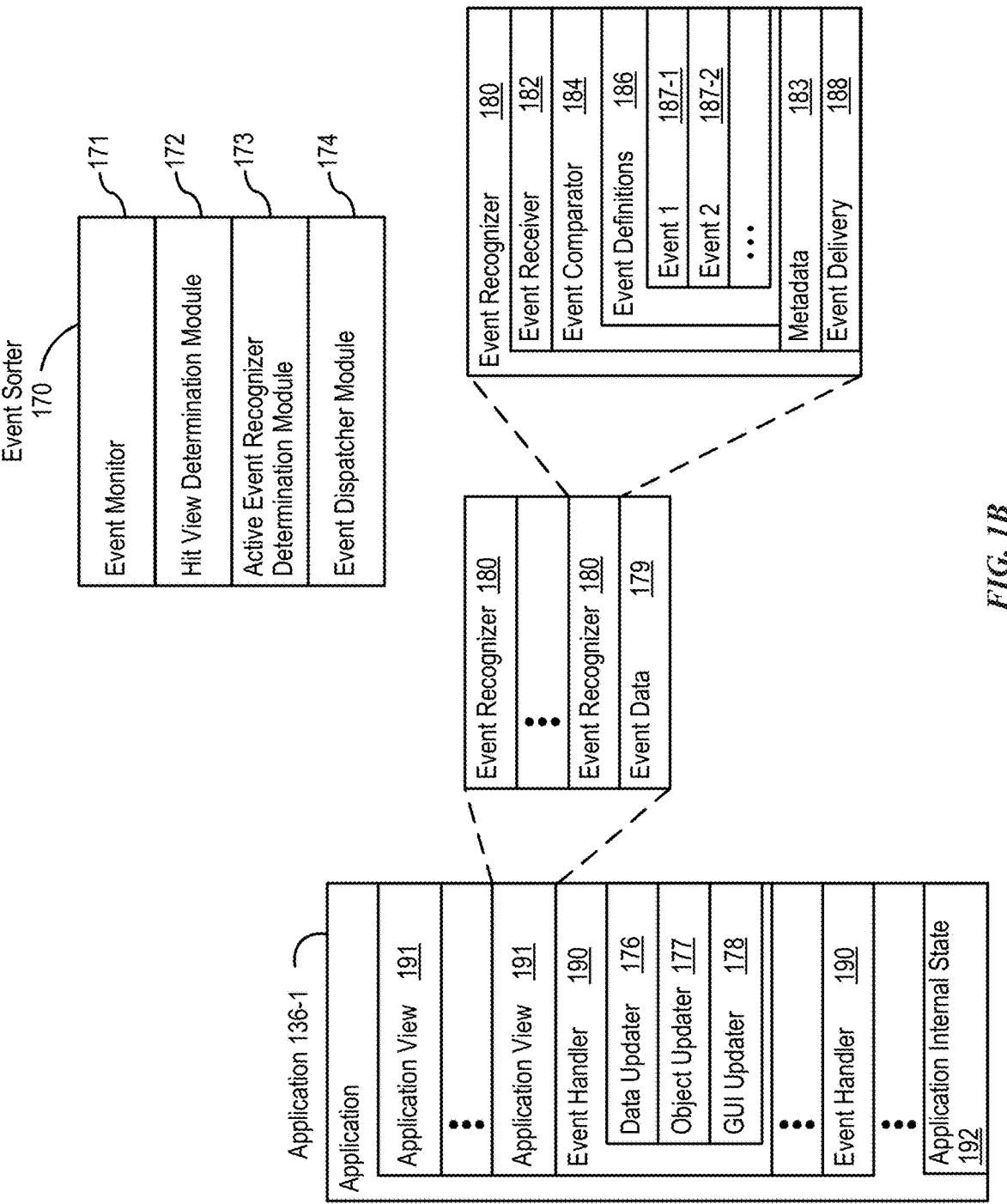
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of:

resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
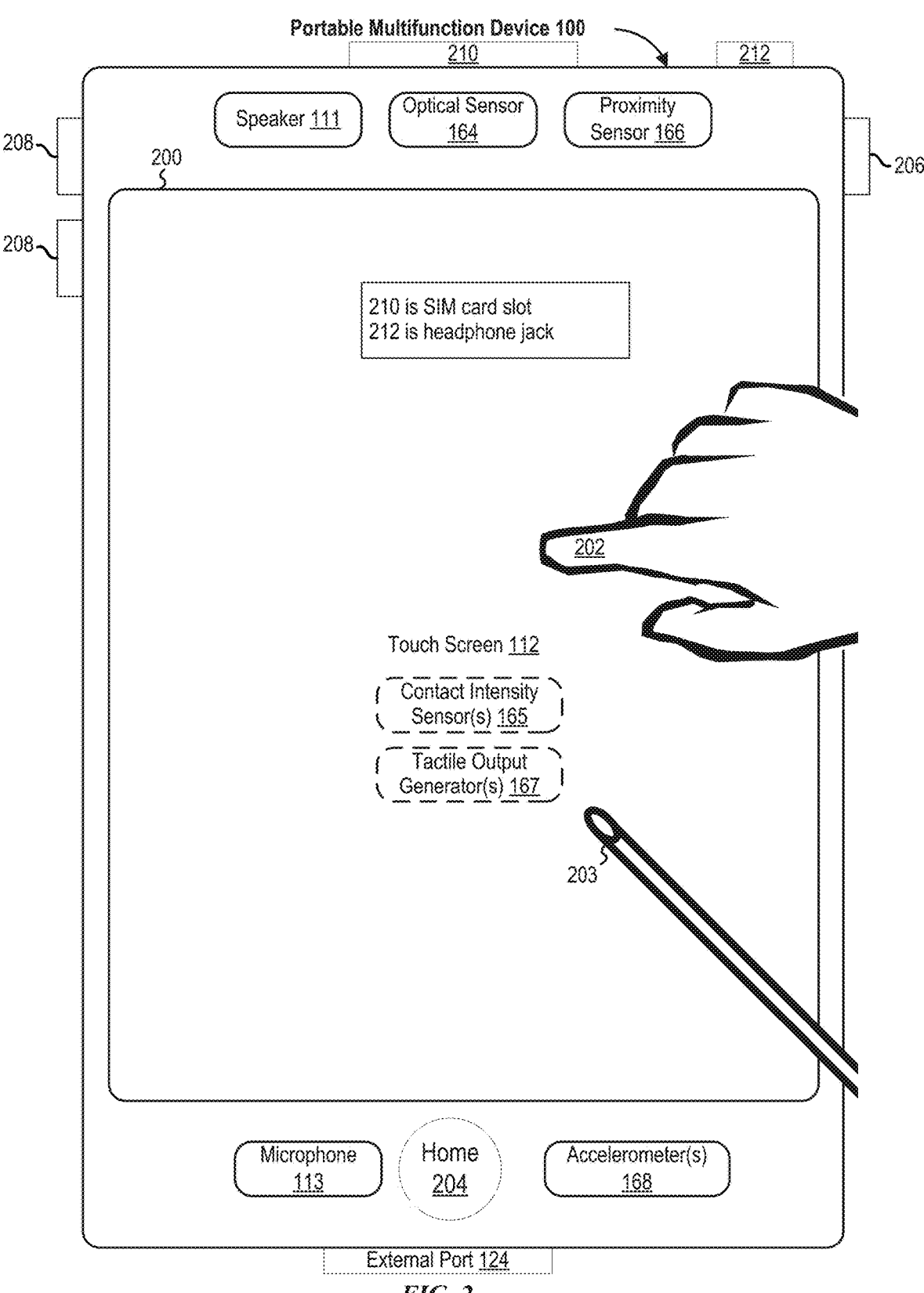
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
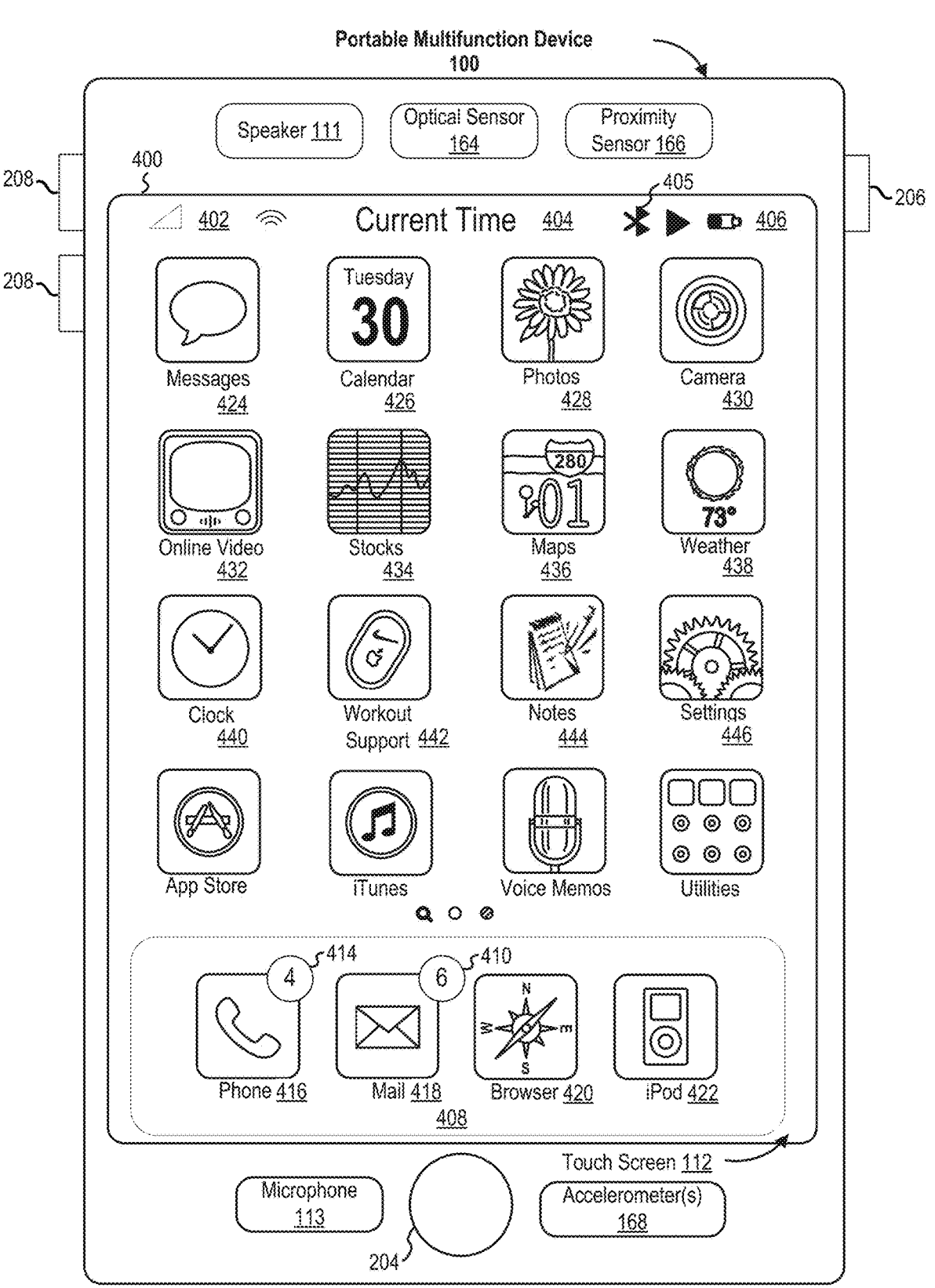
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;

Time 404;

Bluetooth indicator 405;

Battery status indicator 406;

Tray 408 with icons for frequently used applications, such as:

Icon 416 for telephone module 138, labeled "Phone," which optionally includes an indicator 414 of the number of missed calls or voicemail messages;

Icon 418 for e-mail client module 140, labeled "Mail," which optionally includes an indicator 410 of the number of unread e-mails;

Icon 420 for browser module 147, labeled "Browser;" and

Icon 422 for video and music player module 152, also referred to as iPod (trademark of Apple Inc.) module 152, labeled "iPod;" and Icons for other applications, such as:

Icon 424 for IM module 141, labeled "Messages;"

Icon 426 for calendar module 148, labeled "Calendar;"

Icon 428 for image management module 144, labeled "Photos;"

Icon 430 for camera module 143, labeled "Camera;"

Icon 432 for online video module 155, labeled "Online Video;"

Icon 434 for stocks widget 149-2, labeled "Stocks;"

Icon 436 for map module 154, labeled "Maps;"

Icon 438 for weather widget 149-1, labeled "Weather;"

Icon 440 for alarm clock widget 149-4, labeled "Clock;"

Icon 442 for workout support module 142, labeled "Workout Support;"

Icon 444 for notes module 153, labeled "Notes;" and

Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
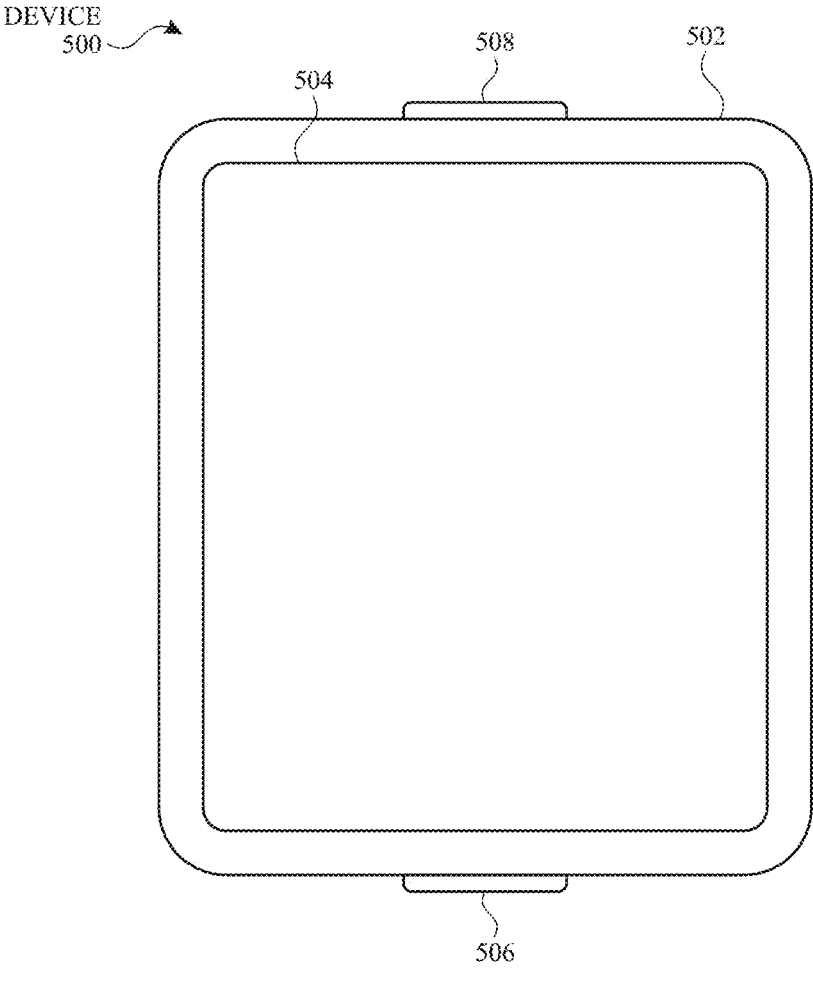
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/ 040061, titled "Device, Method, and Graphical User Interface for Displaying User Interface Objects Corresponding to an application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
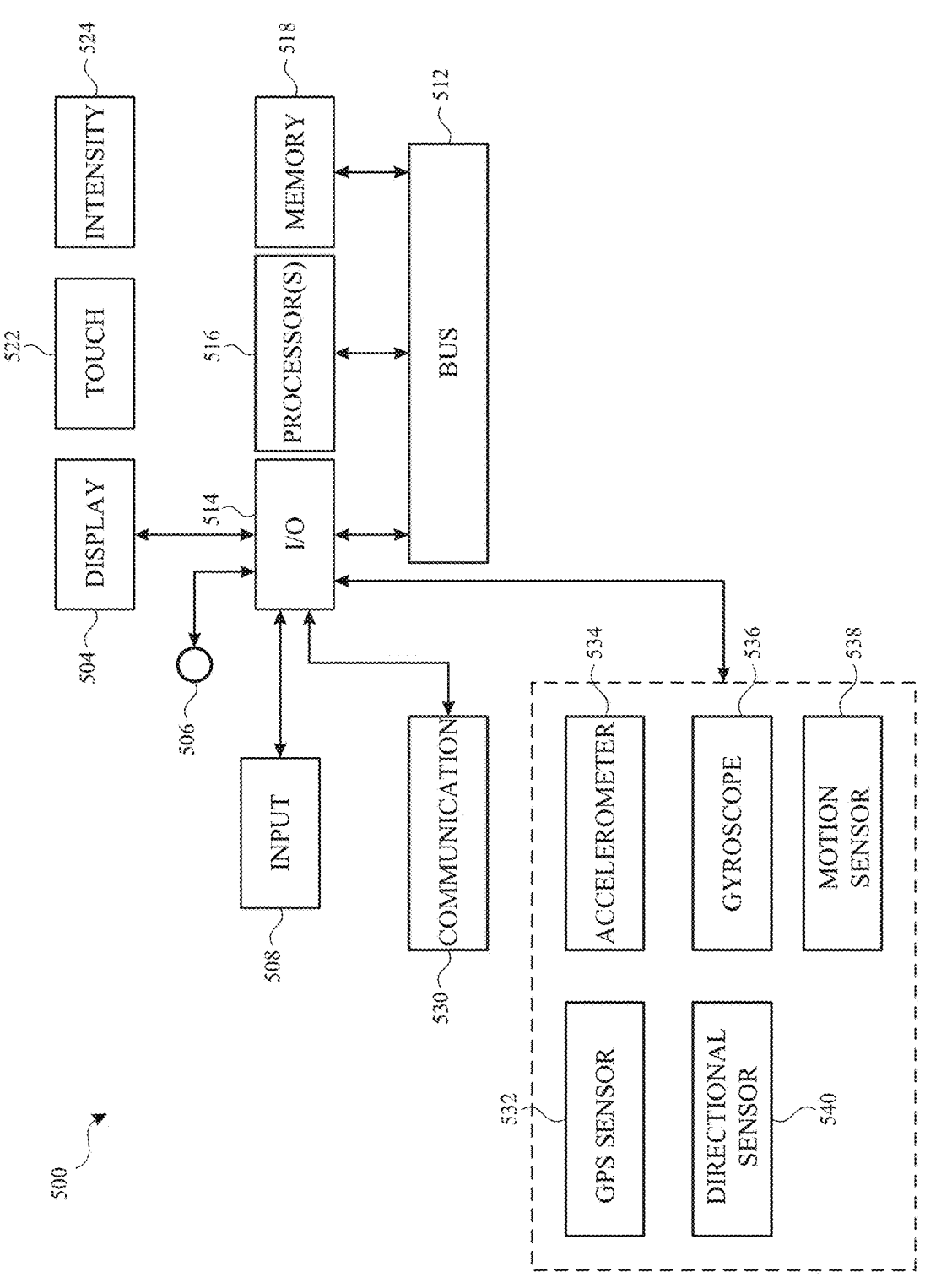
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Figure 7:
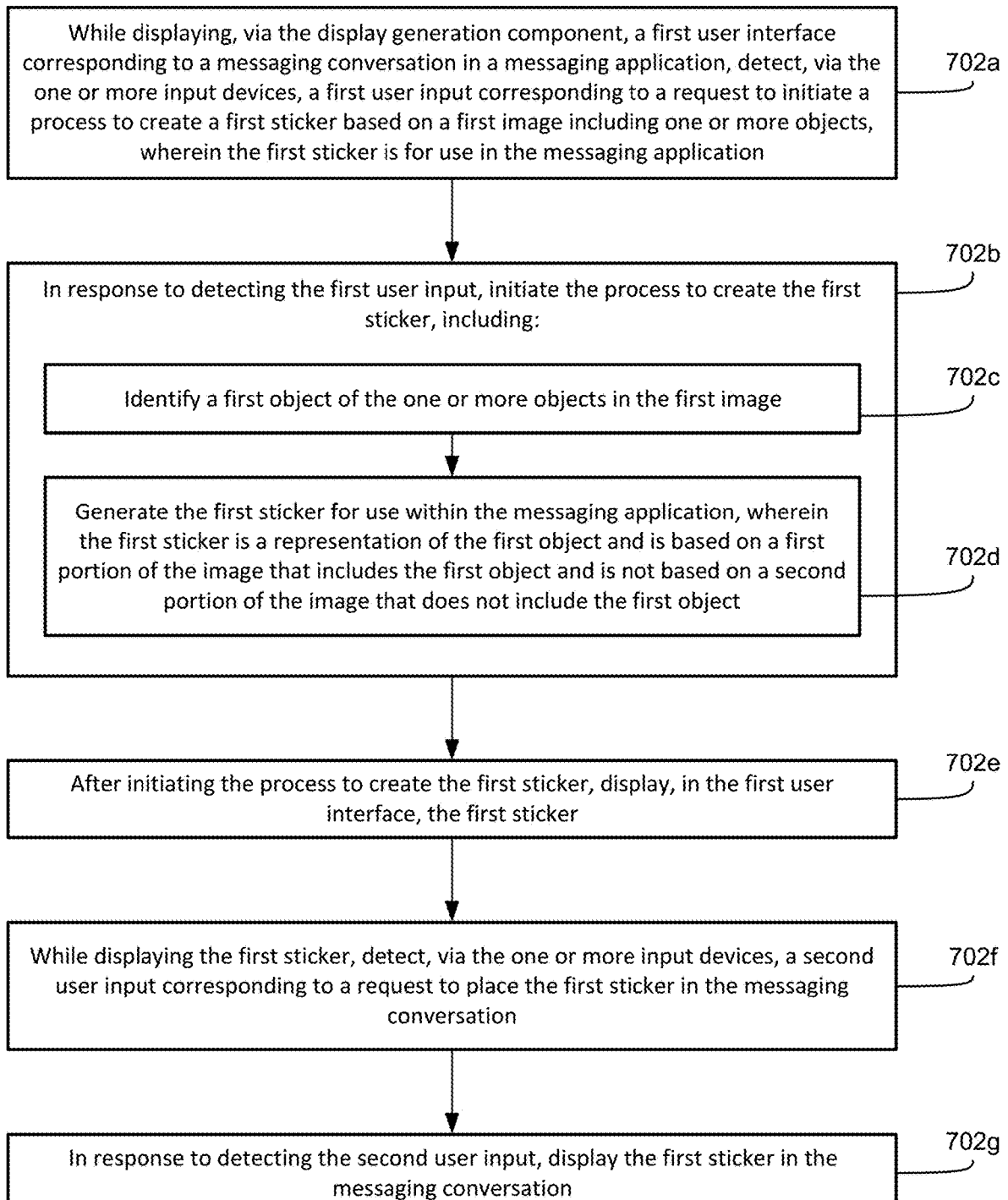
FIG. 7 is a flow diagrams illustrating a method 700 of creating stickers for use within a messaging conversation in accordance with some embodiments.

Memory 518 of personal electronic device 500 can include one or more non-transitory computer-readable storage mediums, for storing computer-executable instructions, which, when executed by one or more computer processors 516, for example, can cause the computer processors to perform the techniques described below, including method 700 (FIG. 7). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
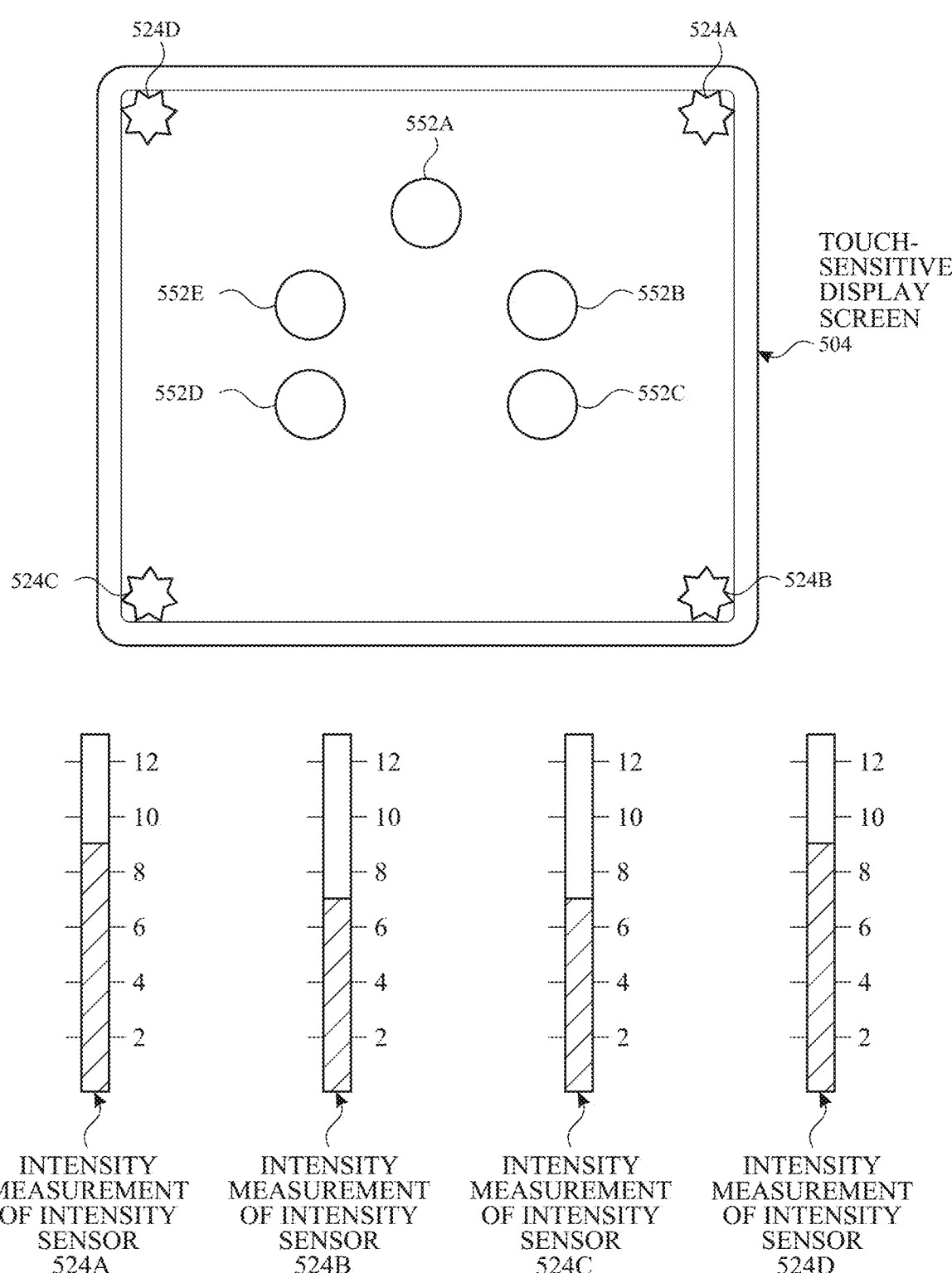
FIGS. 5C-5D illustrate exemplary components of a personal electronic device having a touch-sensitive display and intensity sensors in accordance with some embodiments.
Figure 5D:
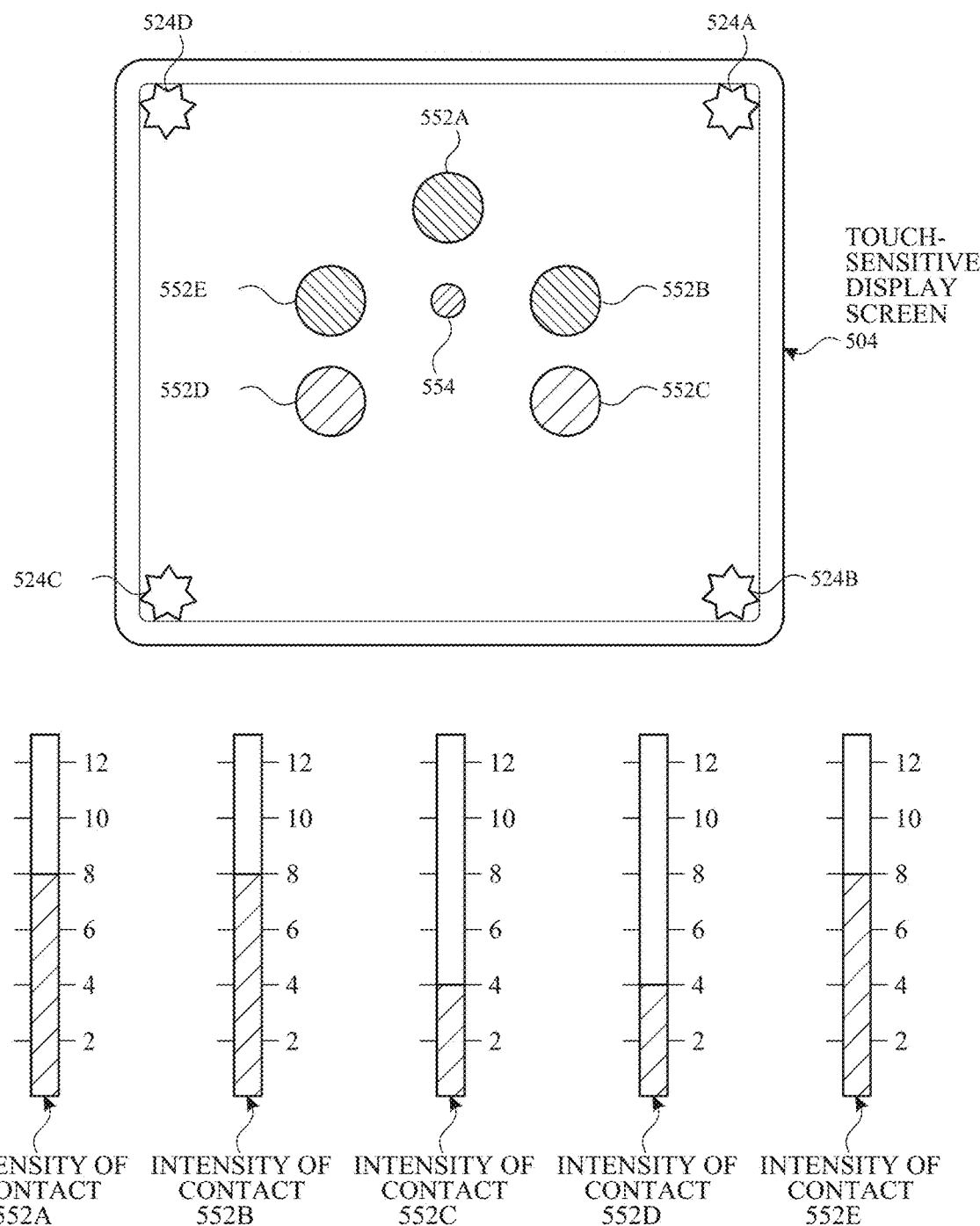

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, $Ij=A\cdot(Dj/\Sigma Di)$, where Dj is the distance of the respective contact j to the center of force, and $\Sigma Di$ is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 5F:
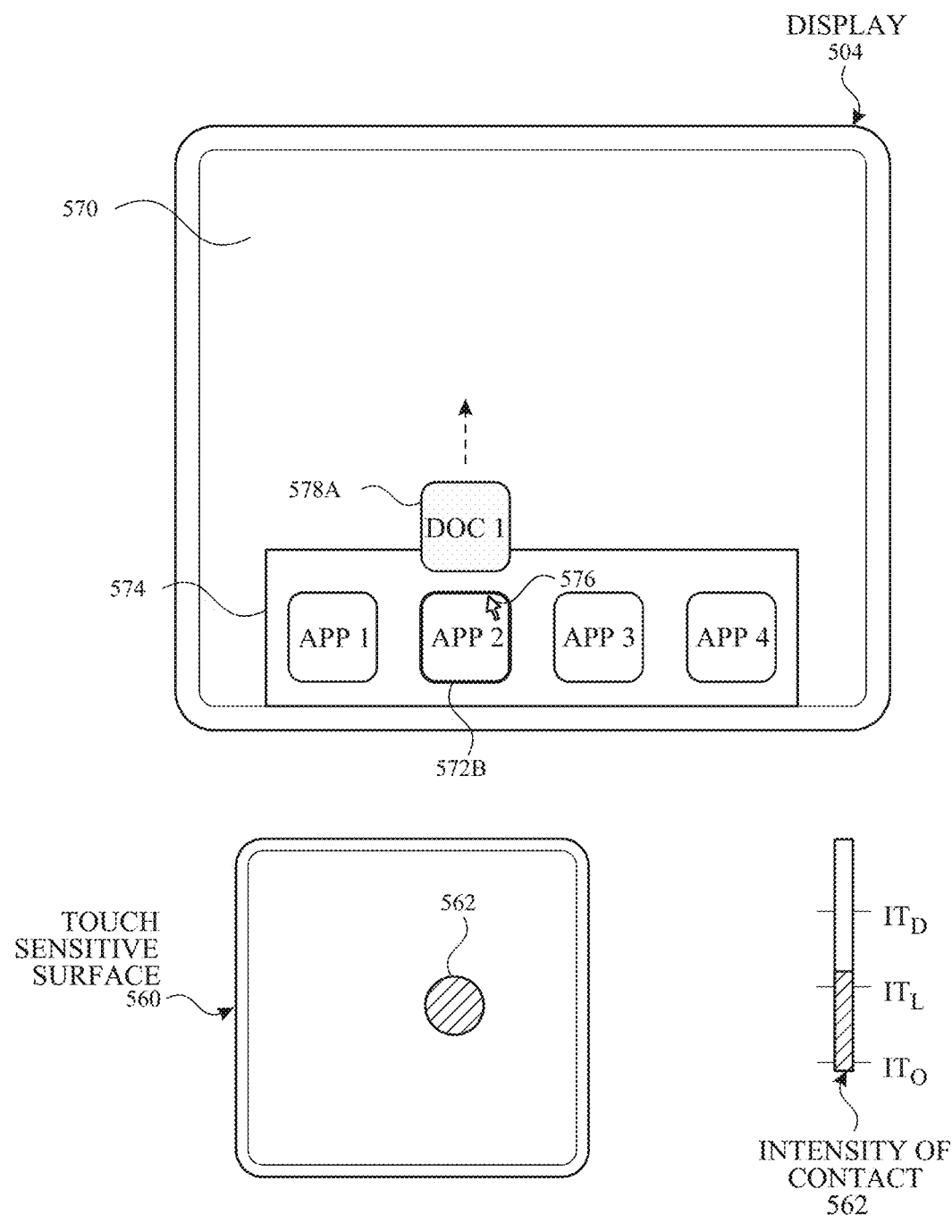
Figure 5G:
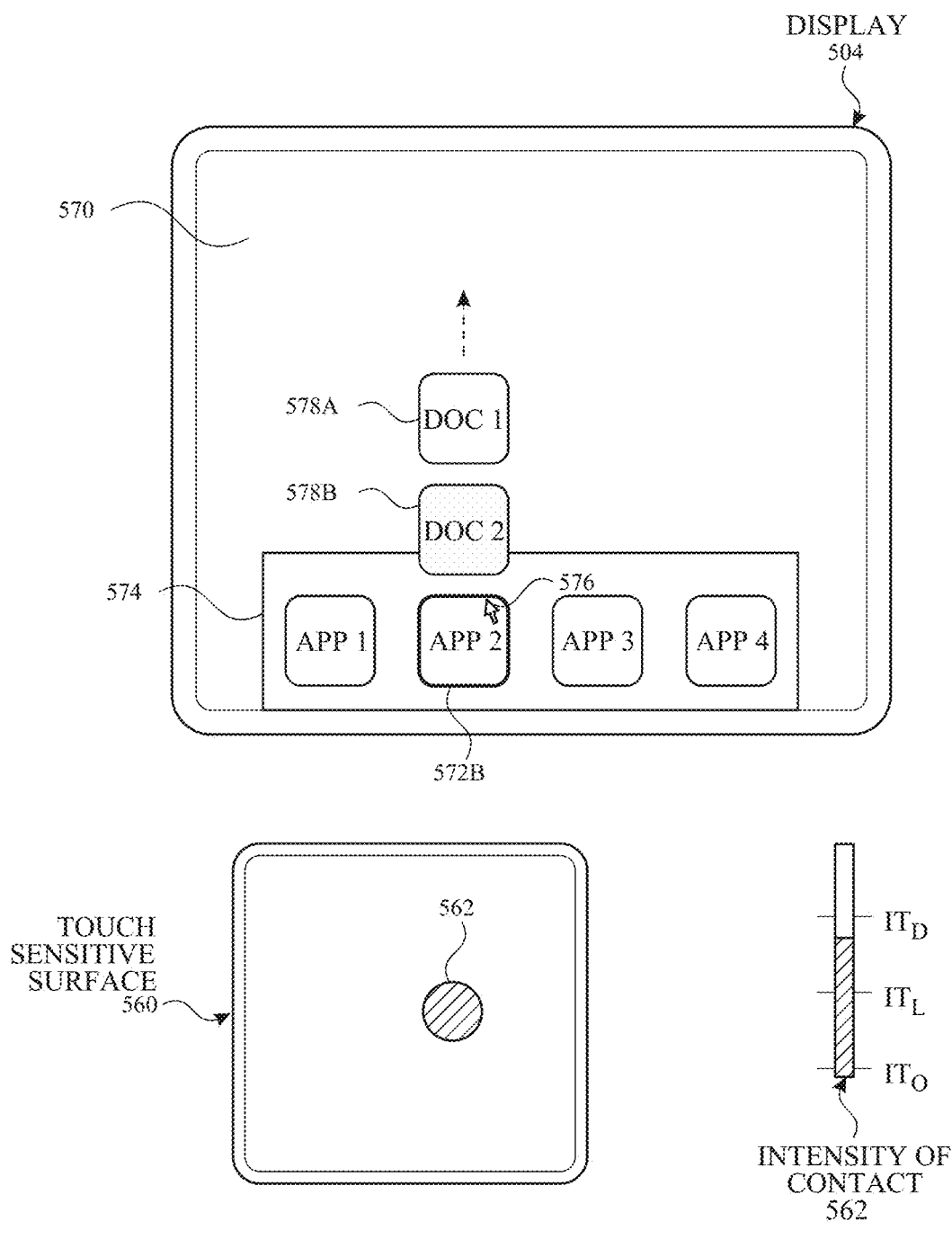
Figure 5H:
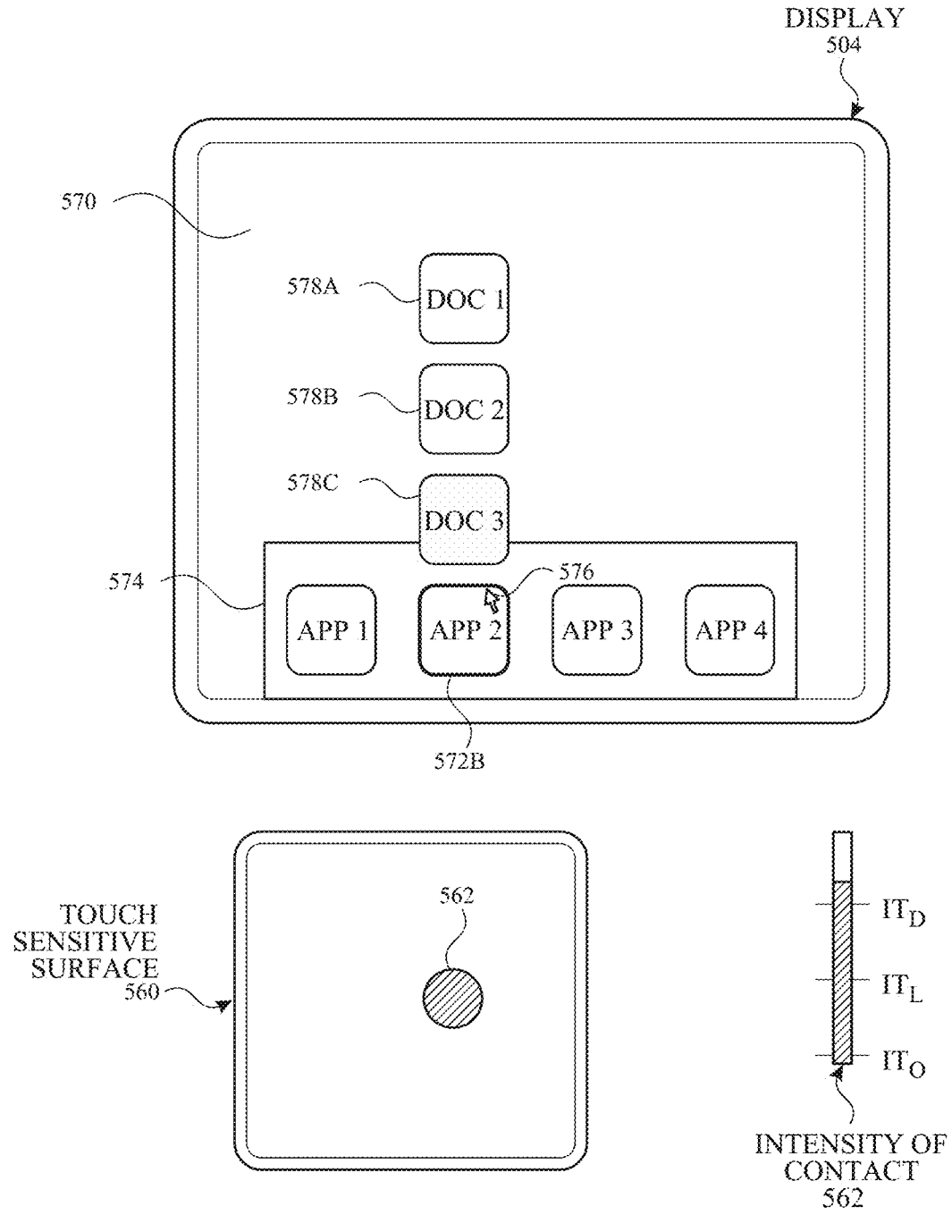
Figure 51:
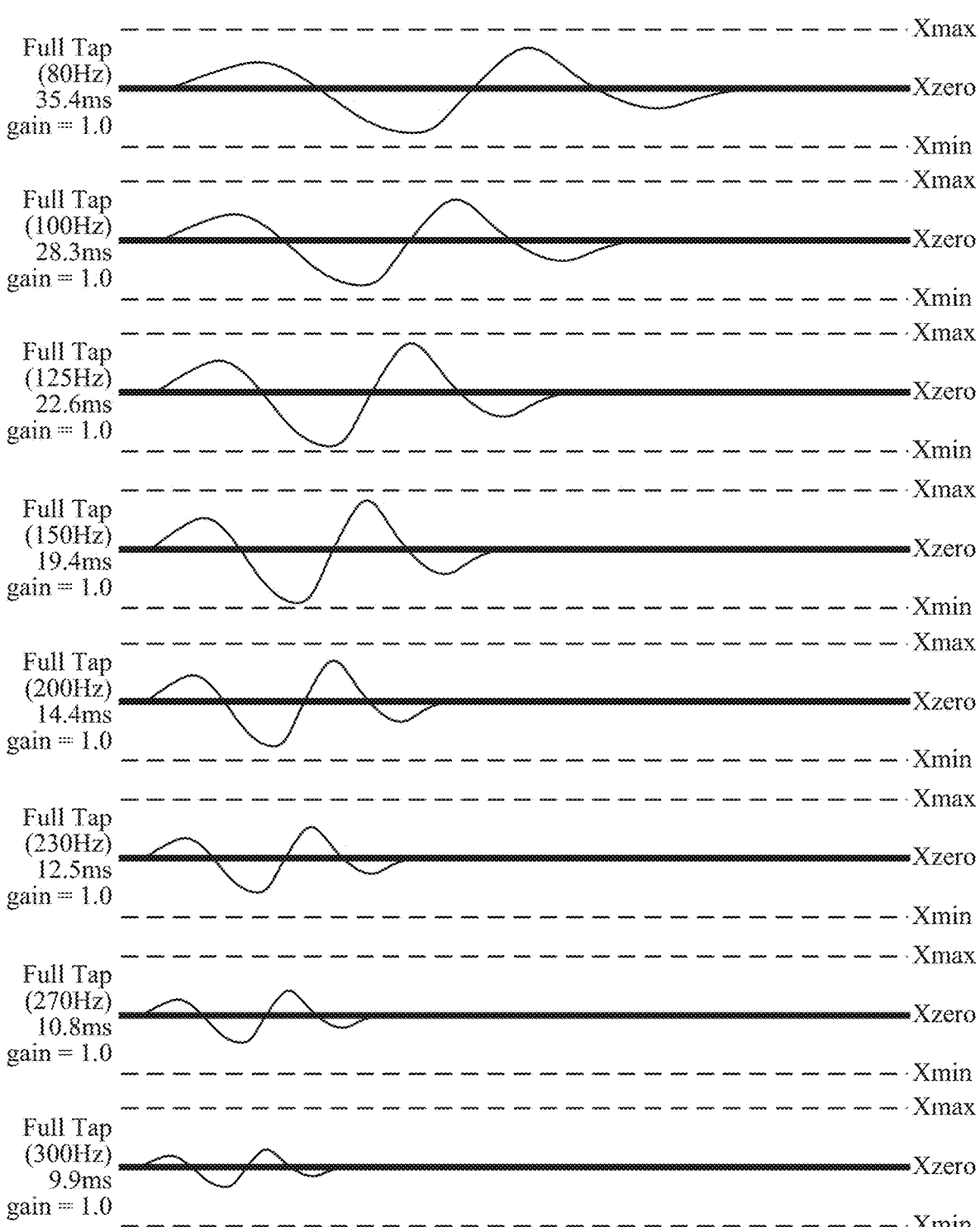

FIGS. 5E-5H illustrate detection of a gesture that includes a press input that corresponds to an increase in intensity of a contact 562 from an intensity below a light press intensity threshold (e.g., "IT$_L$") in FIG. 5E, to an intensity above a deep press intensity threshold (e.g., "IT$_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "IT$_D$"). Contact 562 is maintained on touch-sensitive surface 560. In response to the detection of the gesture, and in accordance with contact 562 having an intensity that goes above the deep press intensity threshold (e.g., "IT$_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "IT D"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

In some embodiments, electronic device 500 includes one or more tactile output generators, where the one or more tactile output generators generate different types of tactile output sequences, as described below in Table 1. In some embodiments, a particular type of tactile output sequence generated by the one or more tactile output generators of the device corresponds to a particular tactile output pattern. For example, a tactile output pattern specifies characteristics of a tactile output, such as the amplitude of the tactile output, the shape of a movement waveform of the tactile output, the frequency of the tactile output, and/or the duration of the tactile output. When tactile outputs with different tactile output patterns are generated by a device (e.g., via one or more tactile output generators that move a moveable mass to generate tactile outputs), the tactile outputs may invoke different haptic sensations in a user holding or touching the device. While the sensation of the user is based on the user's perception of the tactile output, most users will be able to identify changes in waveform, frequency, and amplitude of tactile outputs generated by the device.

Figure 5J:
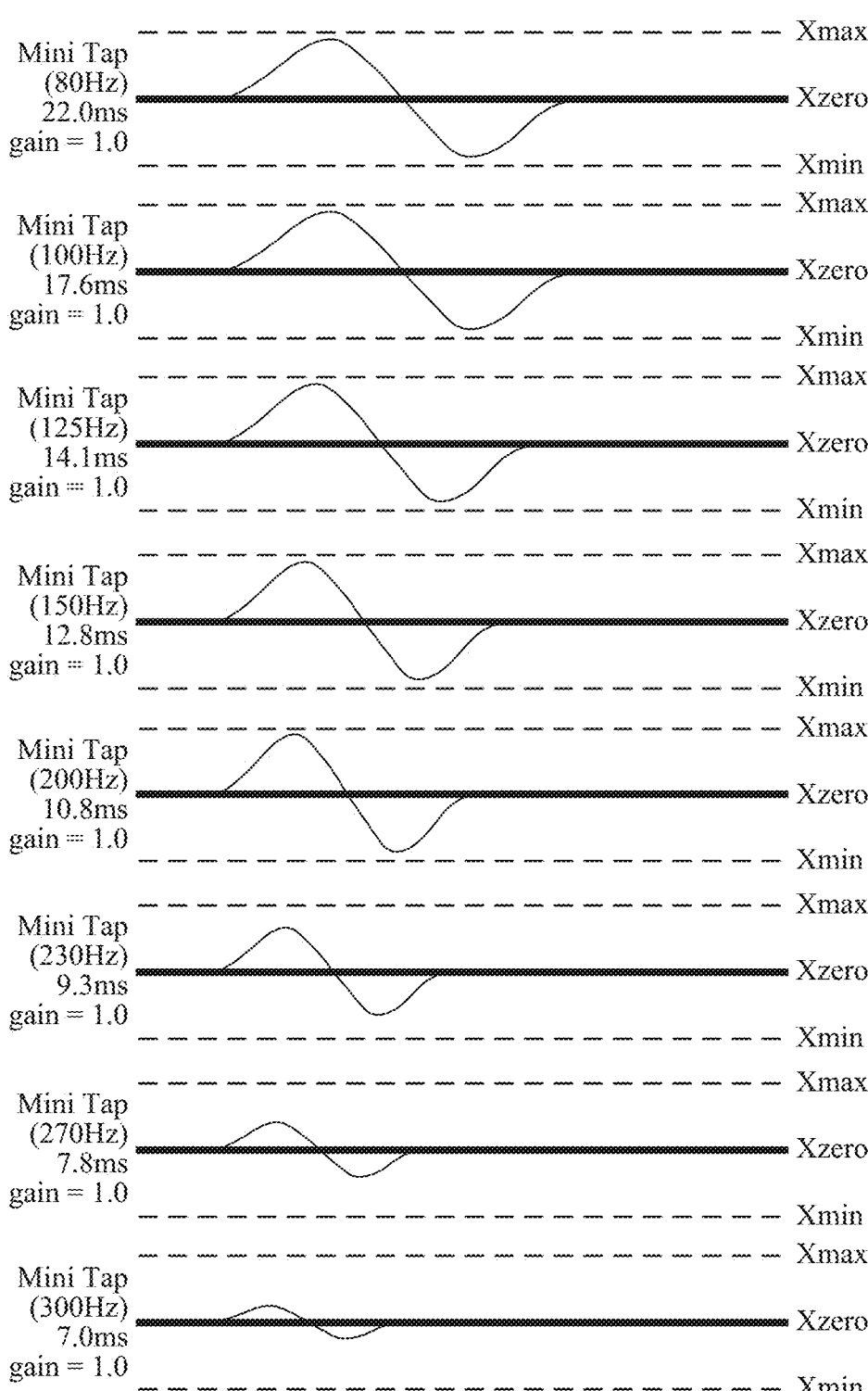
Figure 5K:
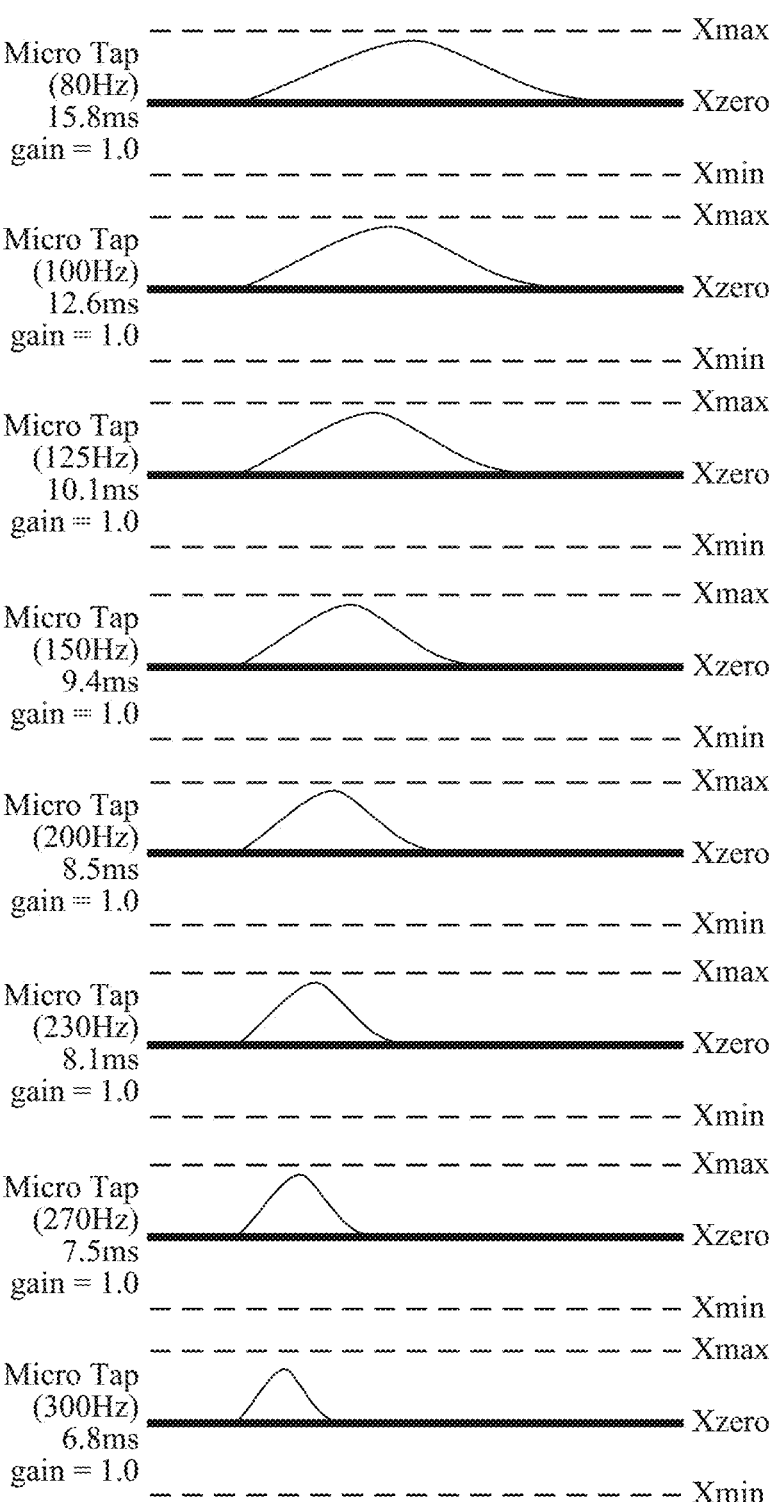
Figure 5L:
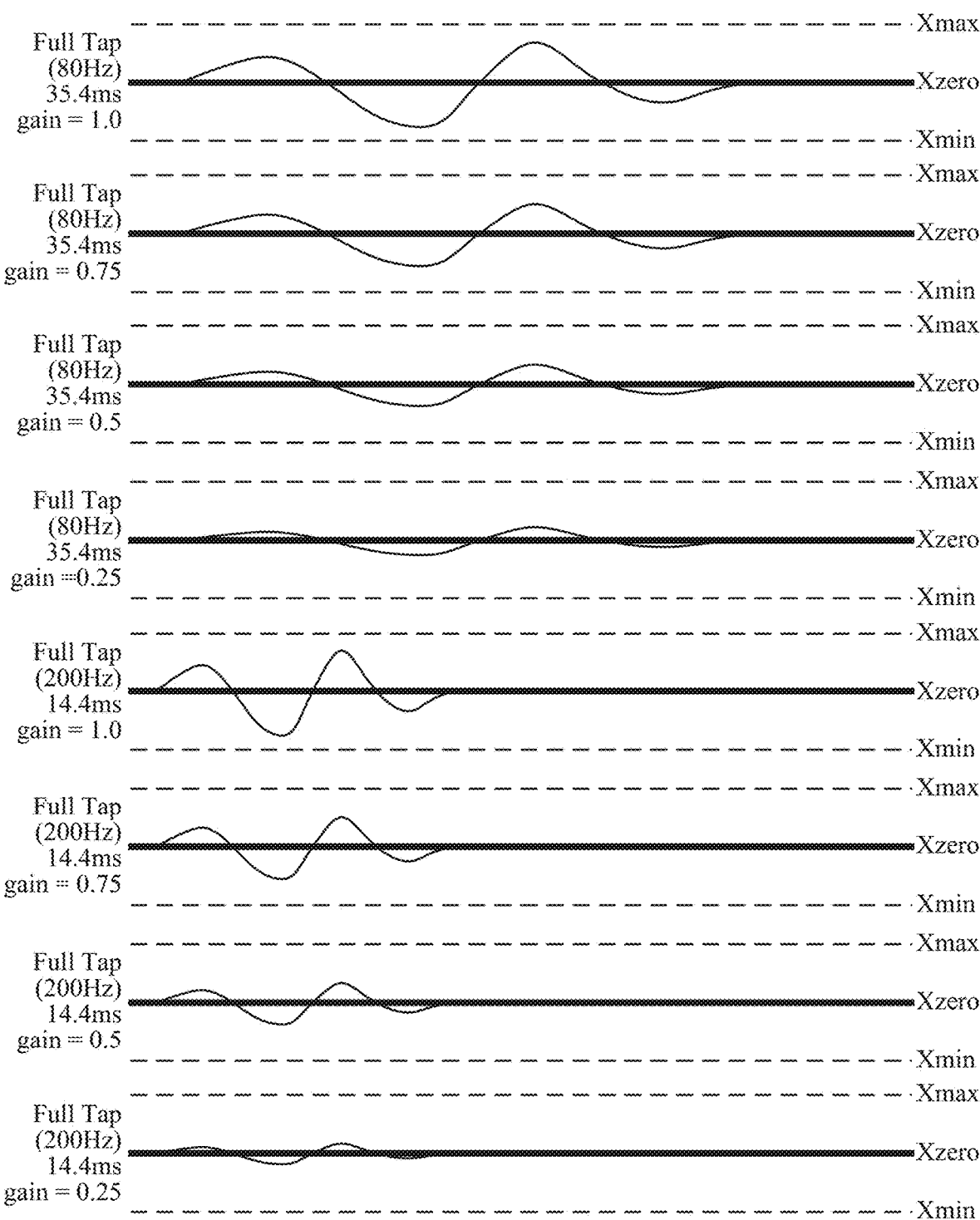
Figure 5M:
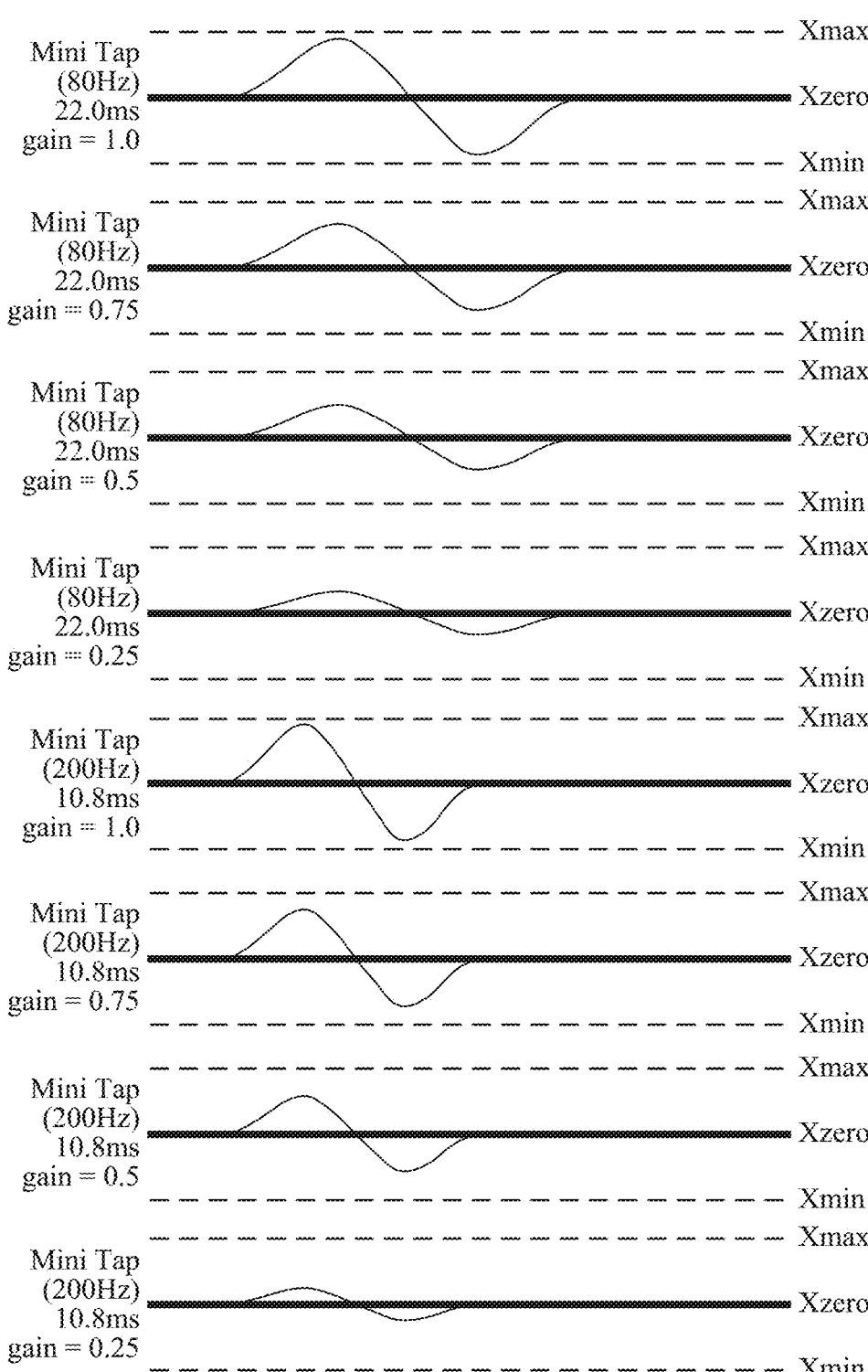
Figure 5N:
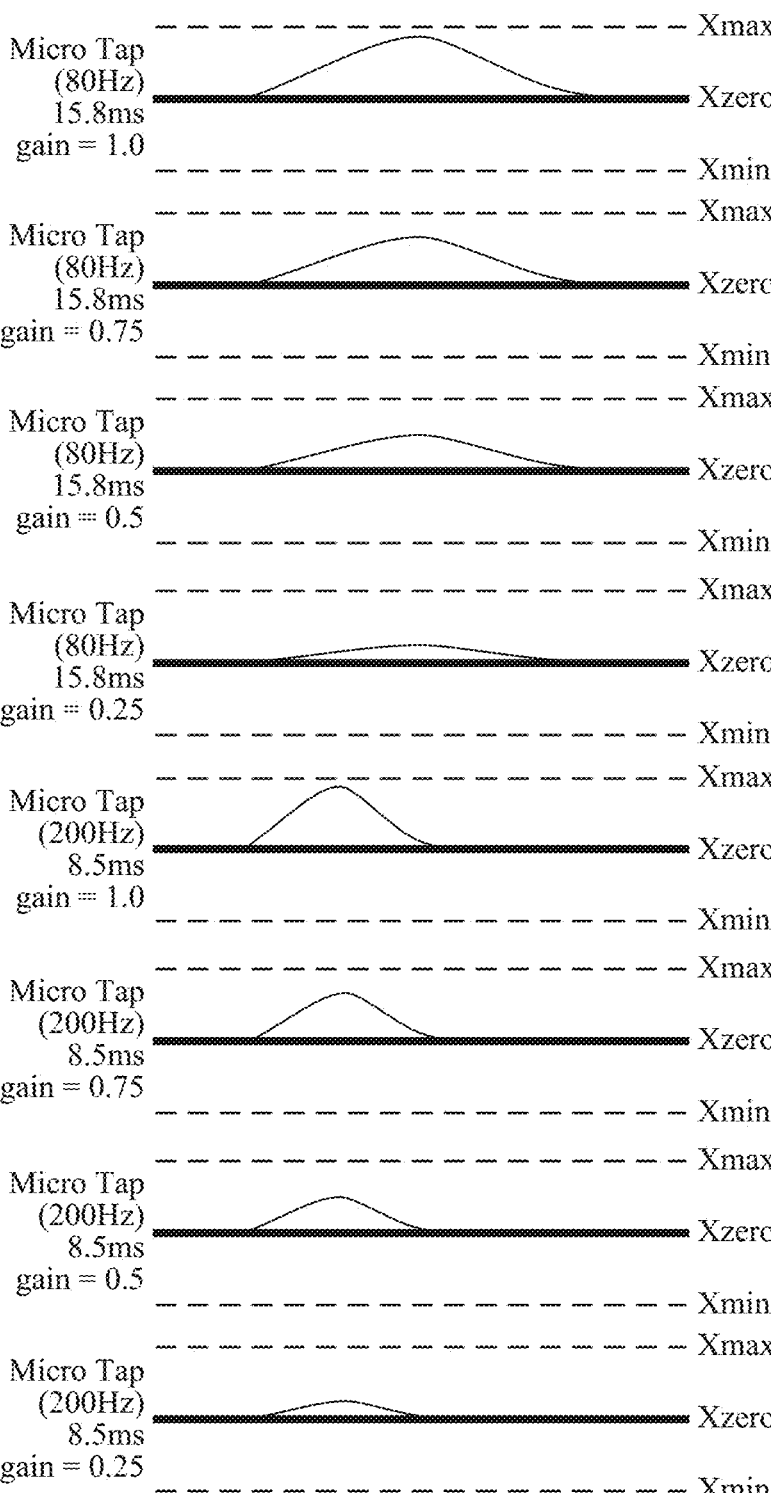

More specifically, FIGS. 5I-5K provide a set of sample tactile output patterns that may be used, either individually or in combination, either as is or through one or more transformations (e.g., modulation, amplification, truncation, etc.), to create suitable haptic feedback in various scenarios and for various purposes, such as those mentioned above and those described with respect to the user interfaces and methods discussed herein. This example of a palette of tactile outputs shows how a set of three waveforms and eight frequencies can be used to produce an array of tactile output patterns. In addition to the tactile output patterns shown in these figures, each of these tactile output patterns is optionally adjusted in amplitude by changing a gain value for the tactile output pattern, as shown, for example for FullTap 80 Hz, FullTap 200 Hz, MiniTap 80 Hz, MiniTap 200 Hz, MicroTap 80 Hz, and MicroTap 200 Hz in FIGS. 5L-5N, which are each shown with variants having a gain of 1.0, 0.75, 0.5, and 0.25. As shown in FIGS. 5L-5N, changing the gain of a tactile output pattern changes the amplitude of the pattern without changing the frequency of the pattern or changing the shape of the waveform. In some embodiments, changing the frequency of a tactile output pattern also results in a lower amplitude as some tactile output generators are limited by how much force can be applied to the moveable mass and thus higher frequency movements of the mass are constrained to lower amplitudes to ensure that the acceleration needed to create the waveform does not require force outside of an operational force range of the tactile output generator (e.g., the peak amplitudes of the FullTap at 230 Hz, 270 Hz, and 300 Hz are lower than the amplitudes of the FullTap at 80 Hz, 100 Hz, 125 Nz, and 200 Hz).

FIGS. 5I-5N show tactile output patterns that have a particular waveform. The waveform of a tactile output pattern represents the pattern of physical displacements relative to a neutral position (e.g., Xzero) versus time that a moveable mass goes through to generate a tactile output with that tactile output pattern. For example, a first set of tactile output patterns shown in FIG. 5I (e.g., tactile output patterns of a "FullTap") each have a waveform that includes an oscillation with two complete cycles (e.g., an oscillation that starts and ends in a neutral position and crosses the neutral position three times). A second set of tactile output patterns shown in FIG. 5J (e.g., tactile output patterns of a "MiniTap") each have a waveform that includes an oscillation that includes one complete cycle (e.g., an oscillation that starts and ends in a neutral position and crosses the neutral position one time). A third set of tactile output patterns shown in FIG. 5K (e.g., tactile output patterns of a "MicroTap") each have a waveform that includes an oscillation that include one half of a complete cycle (e.g., an oscillation that starts and ends in a neutral position and does not cross the neutral position). The waveform of a tactile output pattern also includes a start buffer and an end buffer that represent the gradual speeding up and slowing down of the moveable mass at the start and at the end of the tactile output. The example waveforms shown in FIGS. 5I-5N include Xmin and Xmax values which represent the maximum and minimum extent of movement of the moveable mass. For larger electronic devices with larger moveable masses, there may be larger or smaller minimum and maximum extents of movement of the mass. The examples shown in FIGS. 5I-5N describe movement of a mass in one dimension, however similar principles would also apply to movement of a moveable mass in two or three dimensions.

As shown in FIGS. 5I-5K, each tactile output pattern also has a corresponding characteristic frequency that affects the "pitch" of a haptic sensation that is felt by a user from a tactile output with that characteristic frequency. For a continuous tactile output, the characteristic frequency represents the number of cycles that are completed within a given period of time (e.g., cycles per second) by the moveable mass of the tactile output generator. For a discrete tactile output, a discrete output signal (e.g., with 0.5, 1, or 2 cycles) is generated, and the characteristic frequency value specifies how fast the moveable mass needs to move to generate a tactile output with that characteristic frequency. As shown in FIGS. 5I-5N, for each type of tactile output (e.g., as defined by a respective waveform, such as FullTap, MiniTap, or MicroTap), a higher frequency value corresponds to faster movement(s) by the moveable mass, and hence, in general, a shorter time to complete the tactile output (e.g., including the time to complete the required number of cycle(s) for the discrete tactile output, plus a start and an end buffer time). For example, a FullTap with a characteristic frequency of 80 Hz takes longer to complete than FullTap with a characteristic frequency of 100 Hz (e.g., 35.4 ms vs. 28.3 ms in FIG. SI). In addition, for a given frequency, a tactile output with more cycles in its waveform at a respective frequency takes longer to complete than a tactile output with fewer cycles its waveform at the same respective frequency. For example, a FullTap at 150 Hz takes longer to complete than a MiniTap at 150 Hz (e.g., 19.4 ms vs. 12.8 ms), and a MiniTap at 150 Hz takes longer to complete than a MicroTap at 150 Hz (e.g., 12.8 ms vs. 9.4 ms). However, for tactile output patterns with different frequencies this rule may not apply (e.g., tactile outputs with more cycles but a higher frequency may take a shorter amount of time to complete than tactile outputs with fewer cycles but a lower frequency, and vice versa). For example, at 300 Hz, a FullTap takes as long as a MiniTap (e.g., 9.9 ms).

As shown in FIGS. 5I-5K, a tactile output pattern also has a characteristic amplitude that affects the amount of energy that is contained in a tactile signal, or a "strength" of a haptic sensation that may be felt by a user through a tactile output with that characteristic amplitude. In some embodiments, the characteristic amplitude of a tactile output pattern refers to an absolute or normalized value that represents the maximum displacement of the moveable mass from a neutral position when generating the tactile output. In some embodiments, the characteristic amplitude of a tactile output pattern is adjustable, e.g., by a fixed or dynamically determined gain factor (e.g., a value between 0 and 1), in accordance with various conditions (e.g., customized based on user interface contexts and behaviors) and/or preconfigured metrics (e.g., input-based metrics, and/or user-interface-based metrics). In some embodiments, an input-based metric (e.g., an intensity-change metric or an input-speed metric) measures a characteristic of an input (e.g., a rate of change of a characteristic intensity of a contact in a press input or a rate of movement of the contact across a touch-sensitive surface) during the input that triggers generation of a tactile output. In some embodiments, a user-interface-based metric (e.g., a speed-across-boundary metric) measures a characteristic of a user interface element (e.g., a speed of movement of the element across a hidden or visible boundary in a user interface) during the user interface change that triggers generation of the tactile output. In some embodiments, the characteristic amplitude of a tactile output pattern may be modulated by an "envelope" and the peaks of adjacent cycles may have different amplitudes, where one of the waveforms shown above is further modified by multiplication by an envelope parameter that changes over time (e.g., from 0 to 1) to gradually adjust amplitude of portions of the tactile output over time as the tactile output is being generated.

Although specific frequencies, amplitudes, and waveforms are represented in the sample tactile output patterns in FIGS. 5I-5K for illustrative purposes, tactile output patterns with other frequencies, amplitudes, and waveforms may be used for similar purposes. For example, waveforms that have between 0.5 to 4 cycles can be used. Other frequencies in the range of 60 Hz-400 Hz may be used as well. Table 1 below provides representative examples of tactile output/haptic feedback behaviors and configurations, and examples of their use with respect to the user interfaces for managing content-based tactile outputs that are illustrated and described herein.

TABLE 1

| Type of Tactile Output Sequence | Waveform | Textural (continuous) or Discrete |
|---|---|---|
| "Major" | MiniTap at 180 Hz | Discrete |
| "Minor" | MicroTap at 80 Hz | Textural |
| "Major-reduced" | MiniTap at 200 Hz | Discrete |
| "Minor-Reduced" | MicroTap at 200 Hz | Discrete |

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

an active application, which is currently displayed on a display screen of the device that the application is being used on;

a background application (or background processes), which is not currently displayed, but one or more processes for the application are being processed by one or more processors; and a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, or device 500.

User Interfaces and Associated Processes

Creating Stickers for Use within Messaging Conversations

Users interact with electronic devices in many different manners. The embodiments described below provide ways in which an electronic device generates user-created stickers for use within messaging conversations, thus enhancing the user's interactions with the electronic device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 6B:
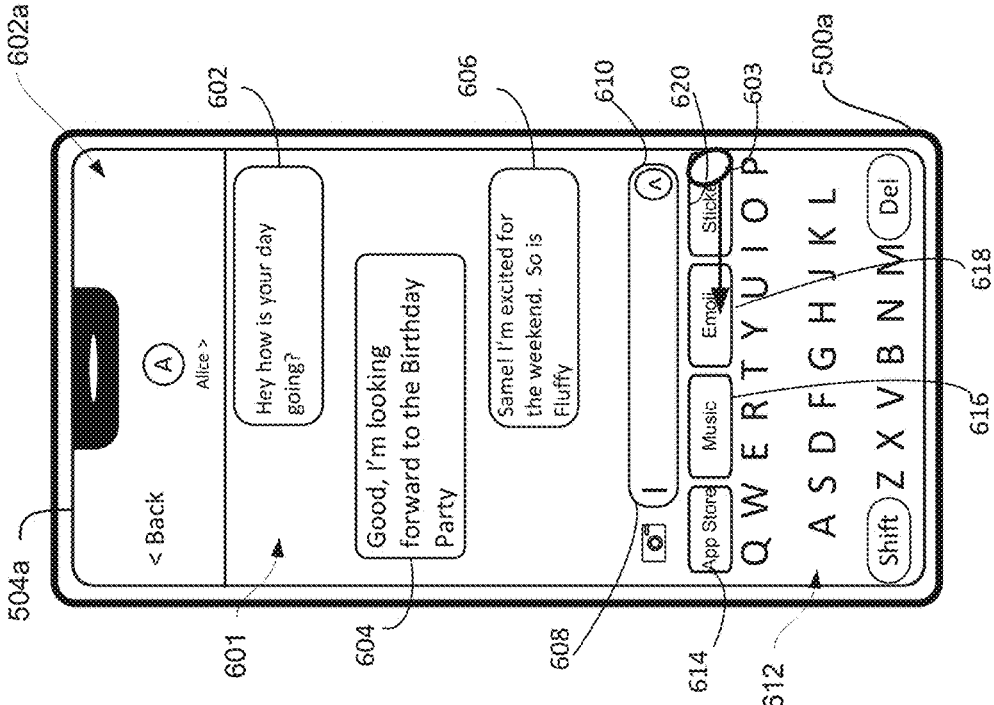
FIGS. 6A-6Z illustrate exemplary ways of creating stickers for use within a messaging conversation in accordance with some embodiments of the disclosure.
Figure 6A:
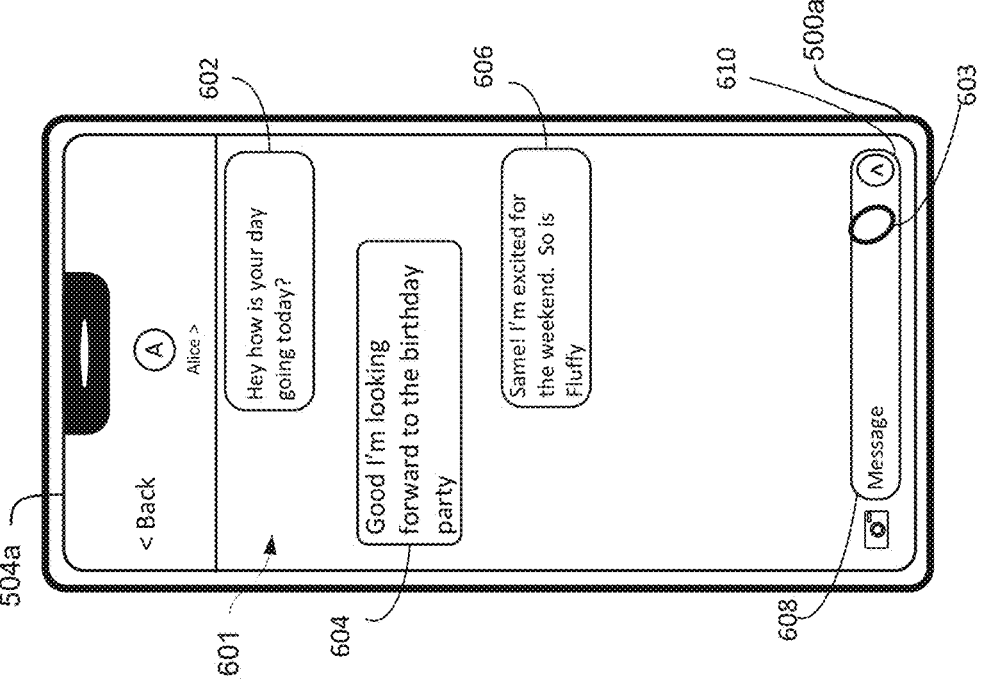
Figure 6D:
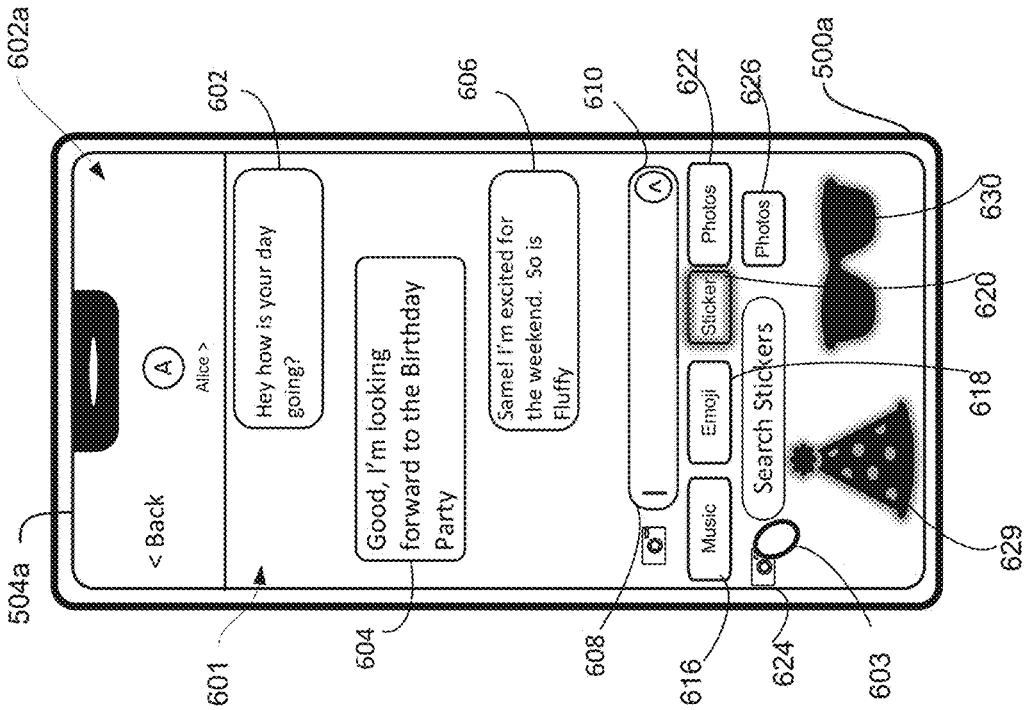
Figure 6C:
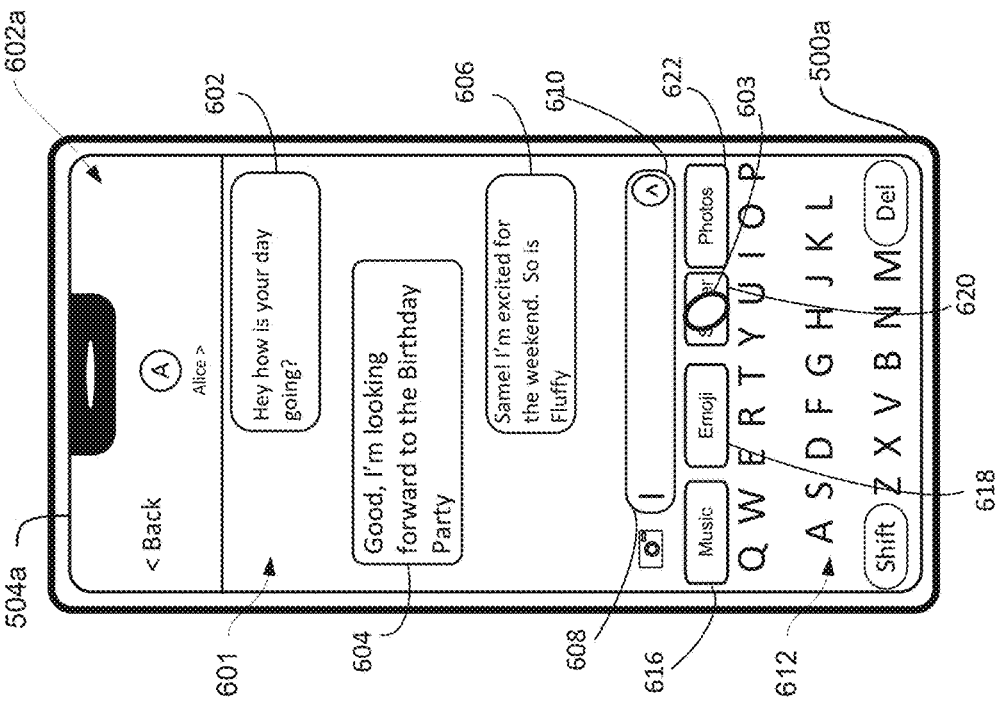
Figure 6F:
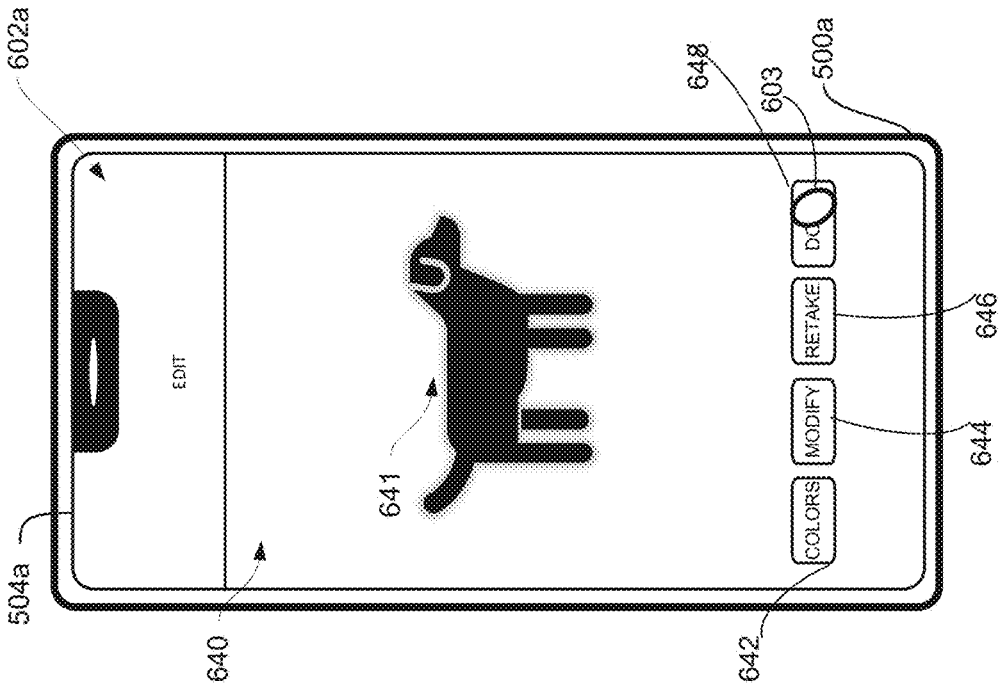
Figure 6E:
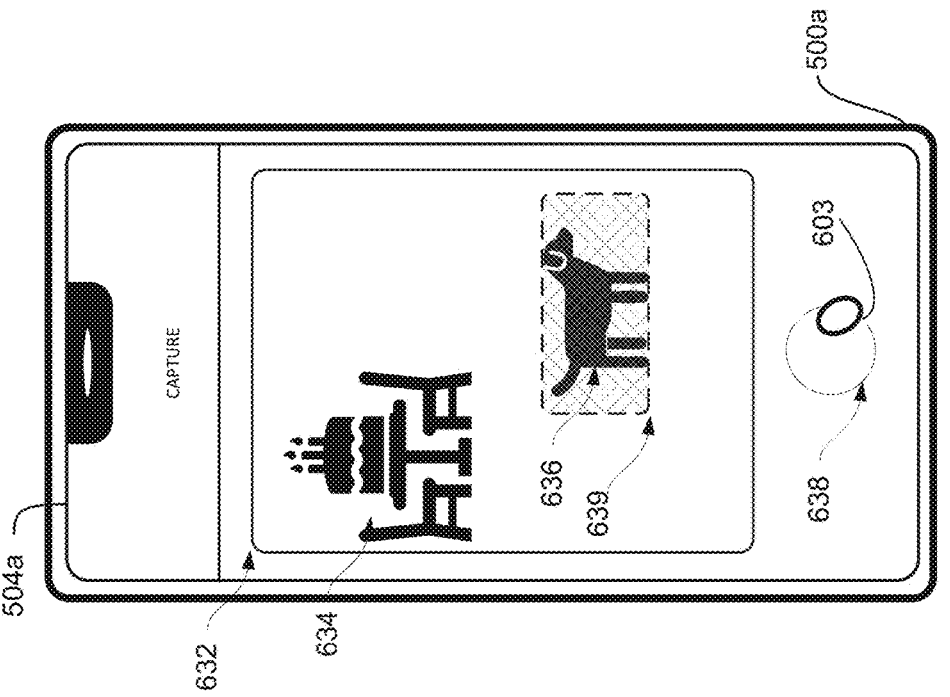
Figure 6H:
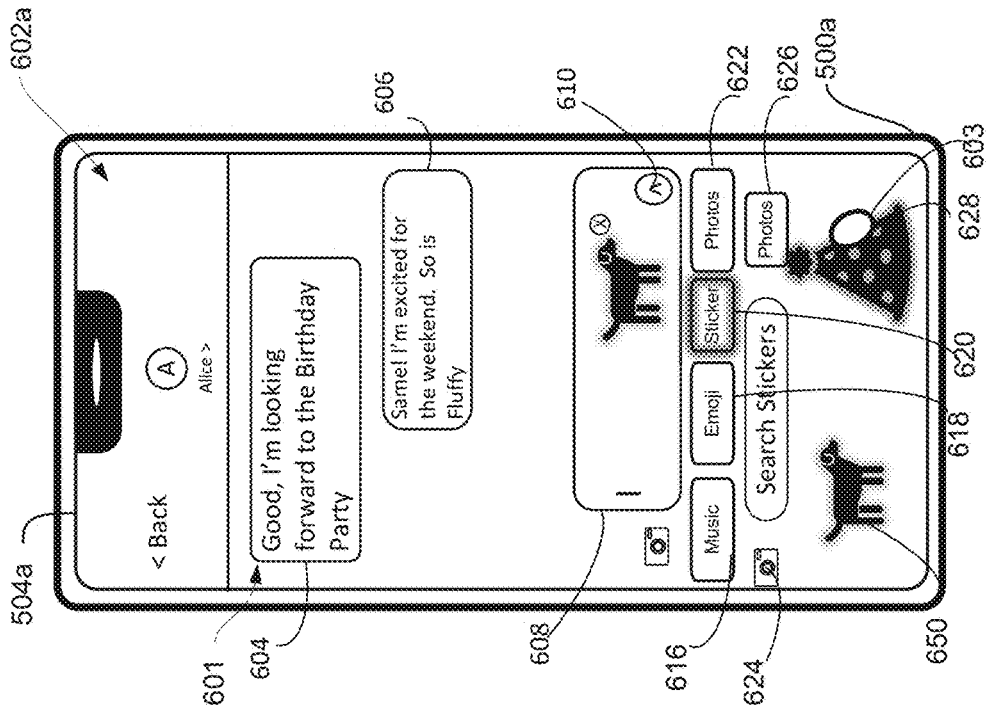
Figure 6G:
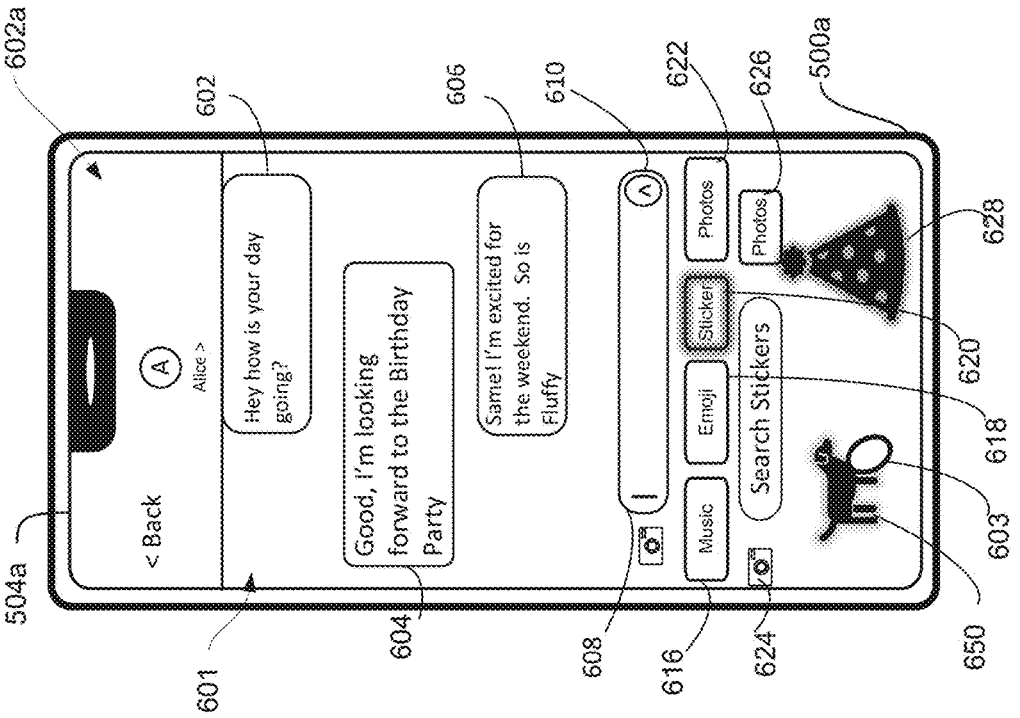
Figure 6J:
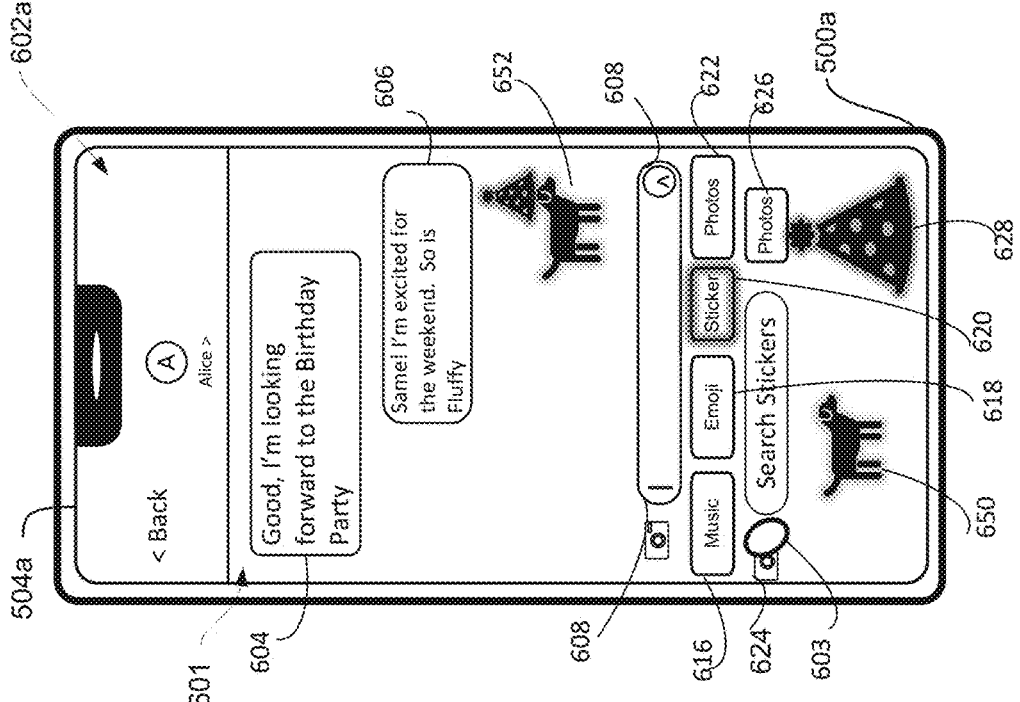
Figure 6I:
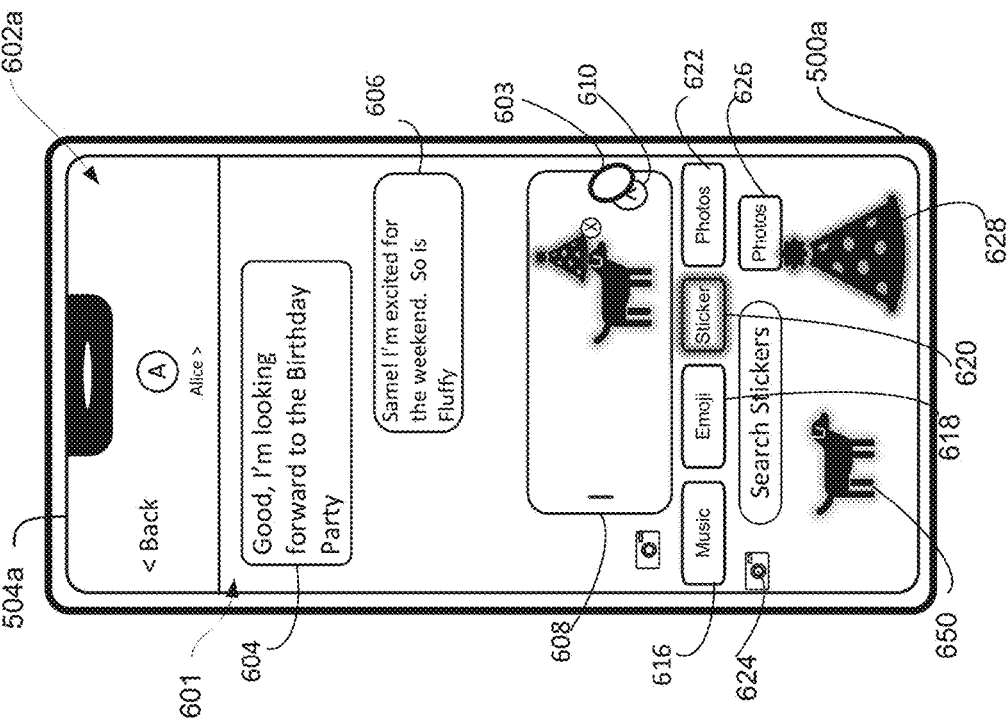
Figure 6L:
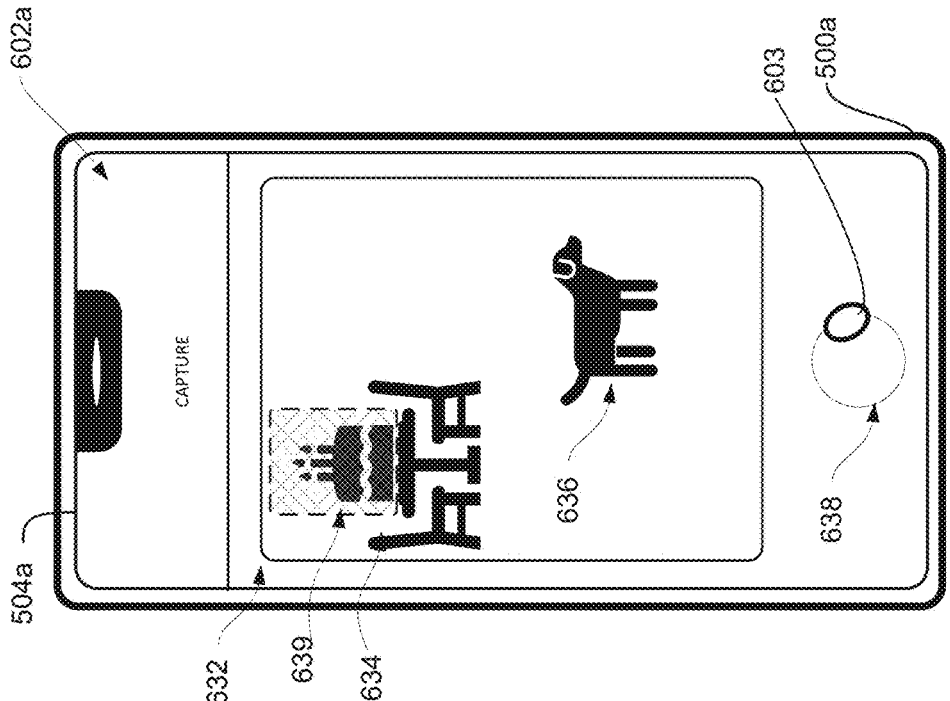
Figure 6K:
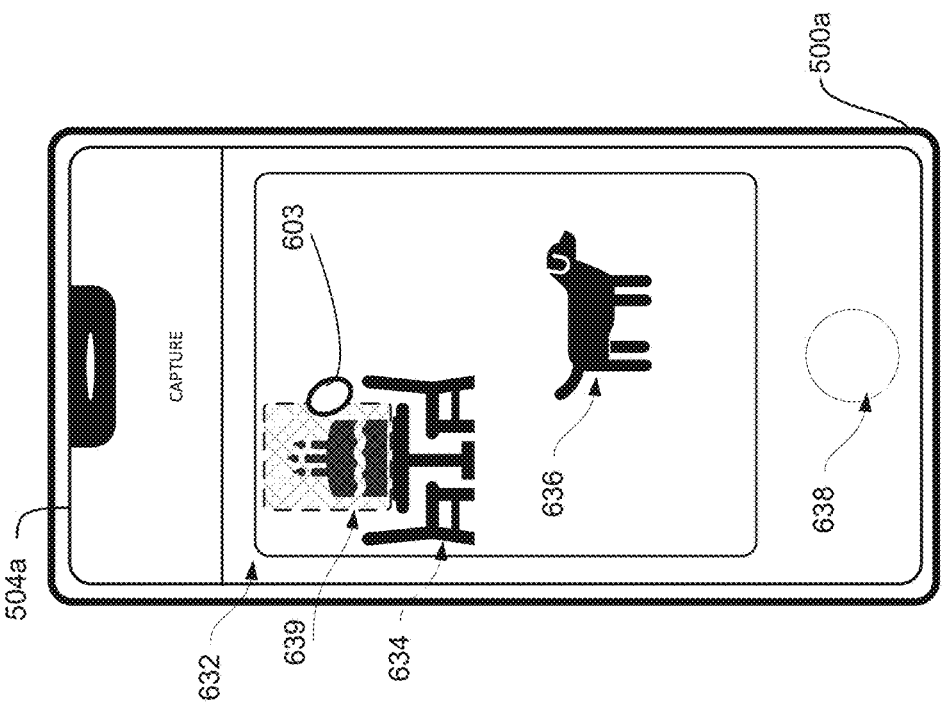
Figure 6N:
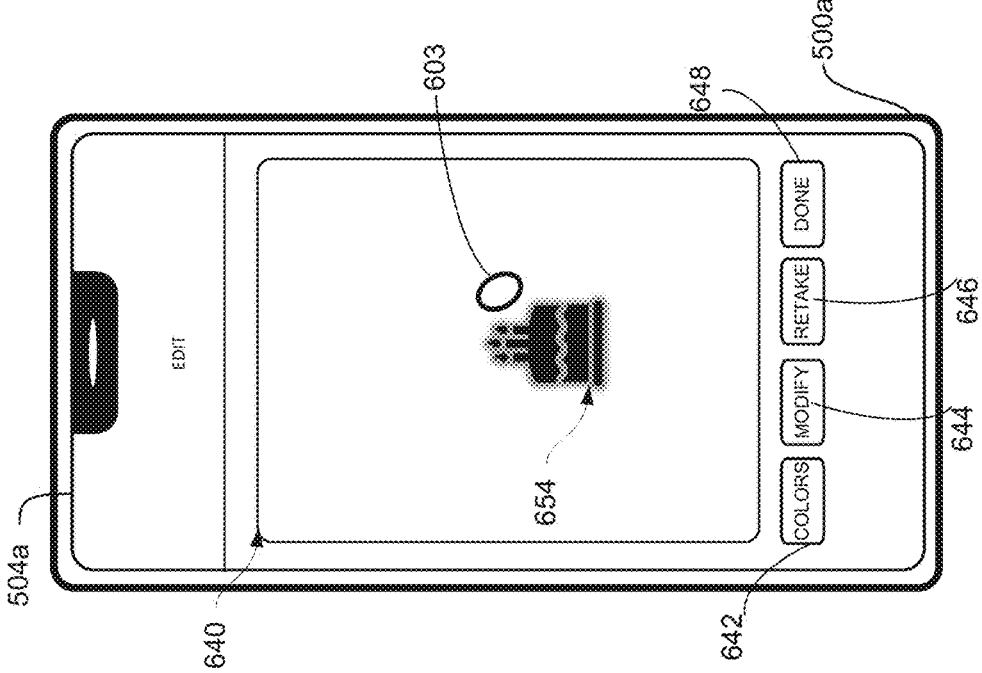
Figure 6M:
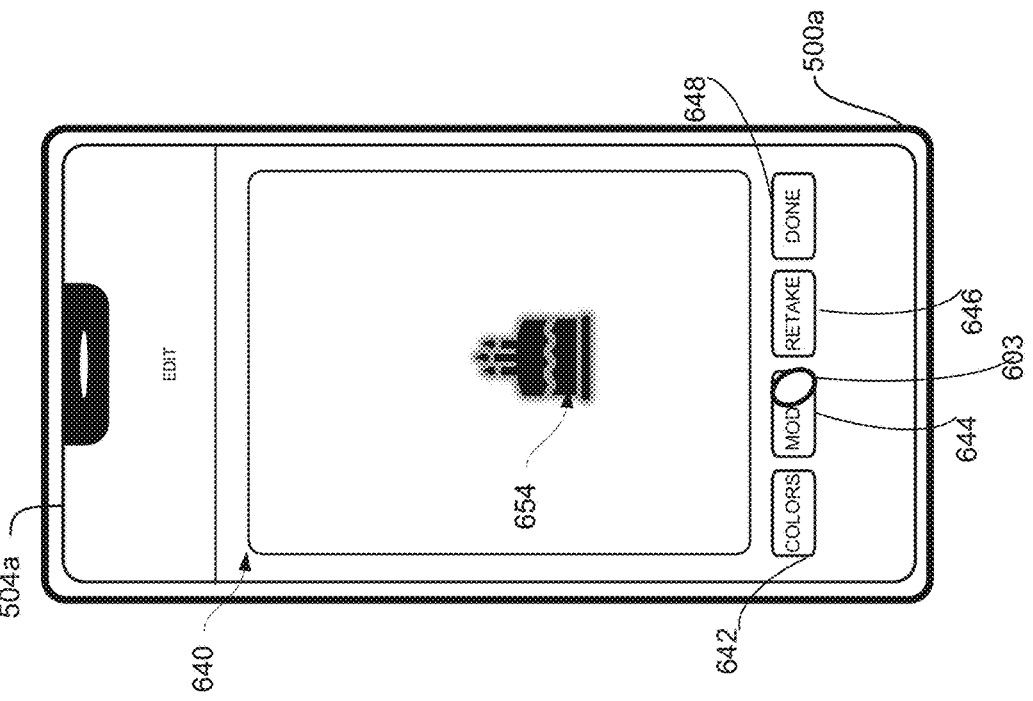
Figure 6P:
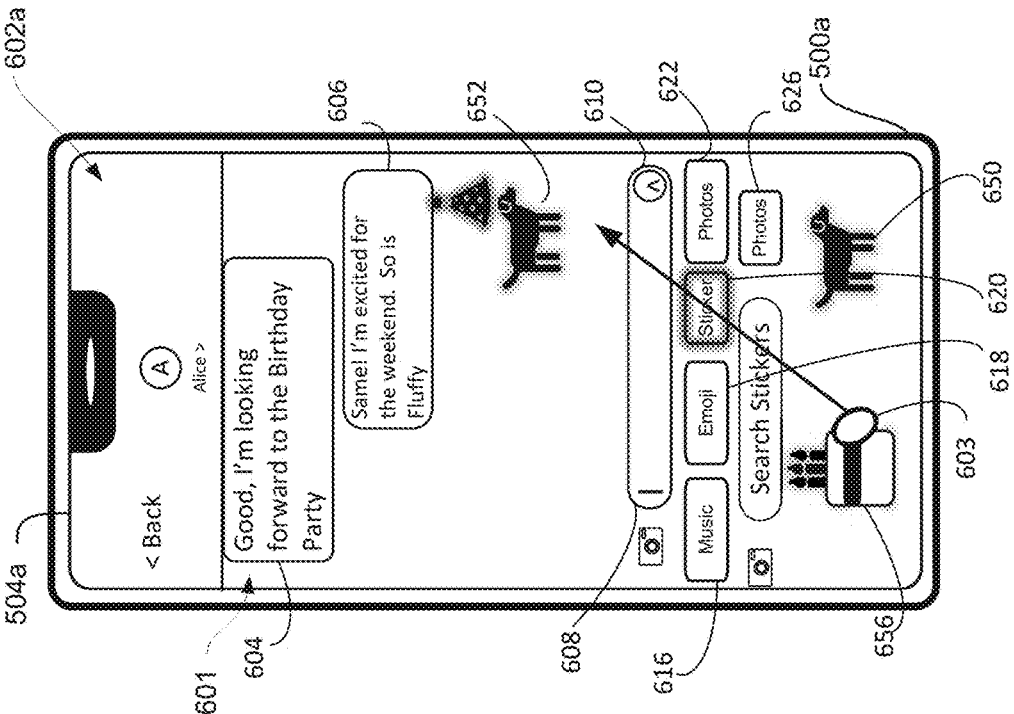
Figure 6O:
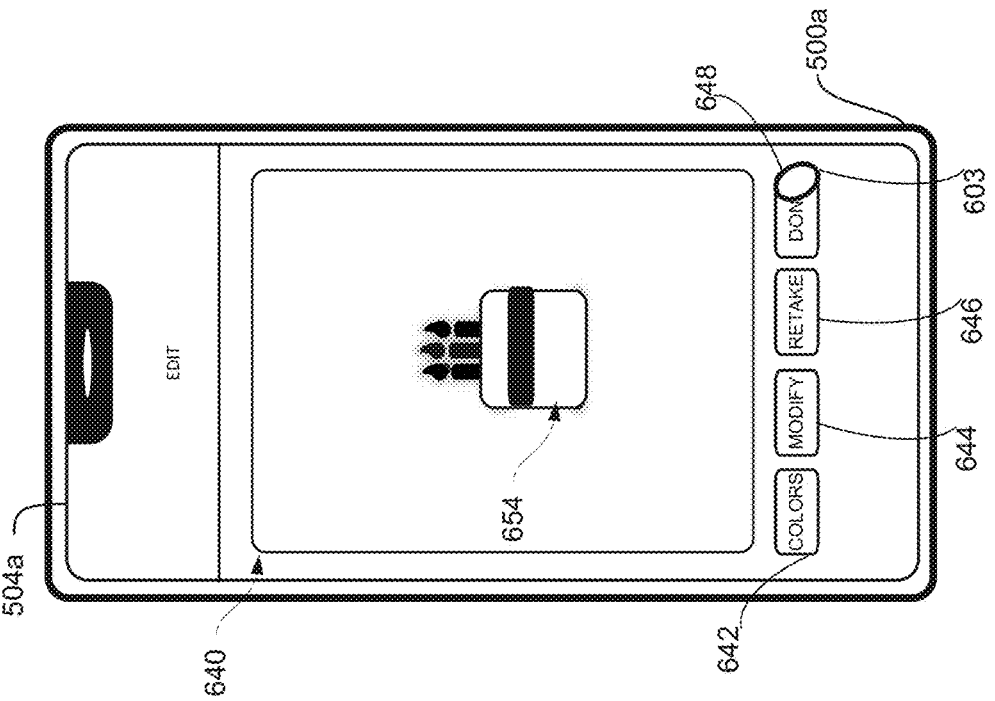
Figure 6R:
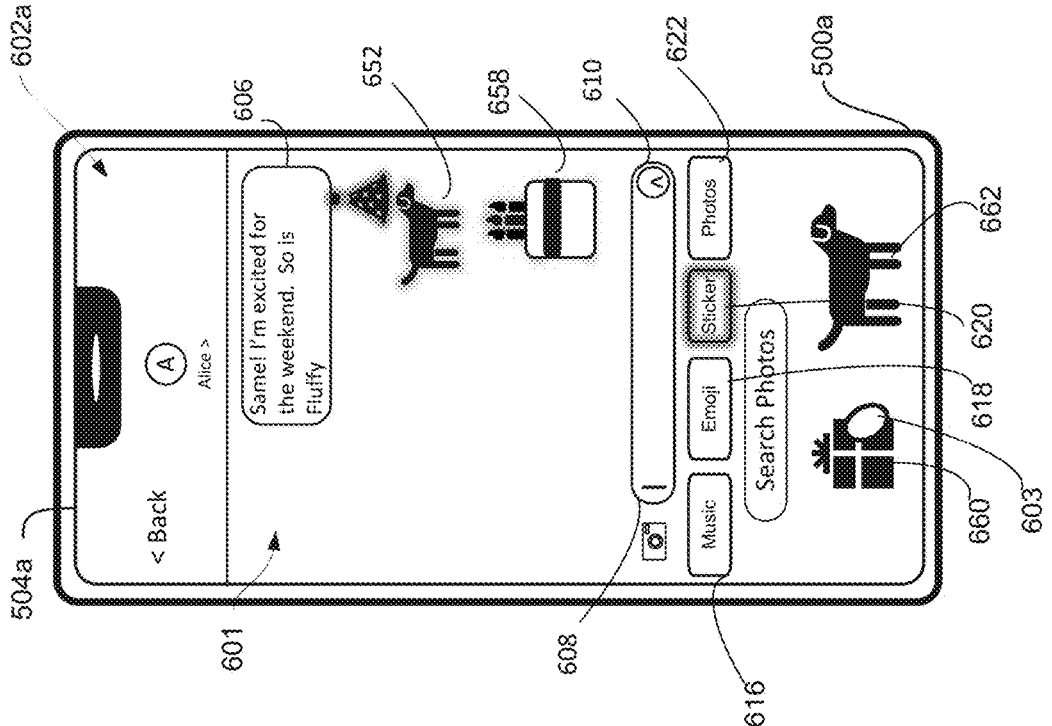
Figure 6Q:
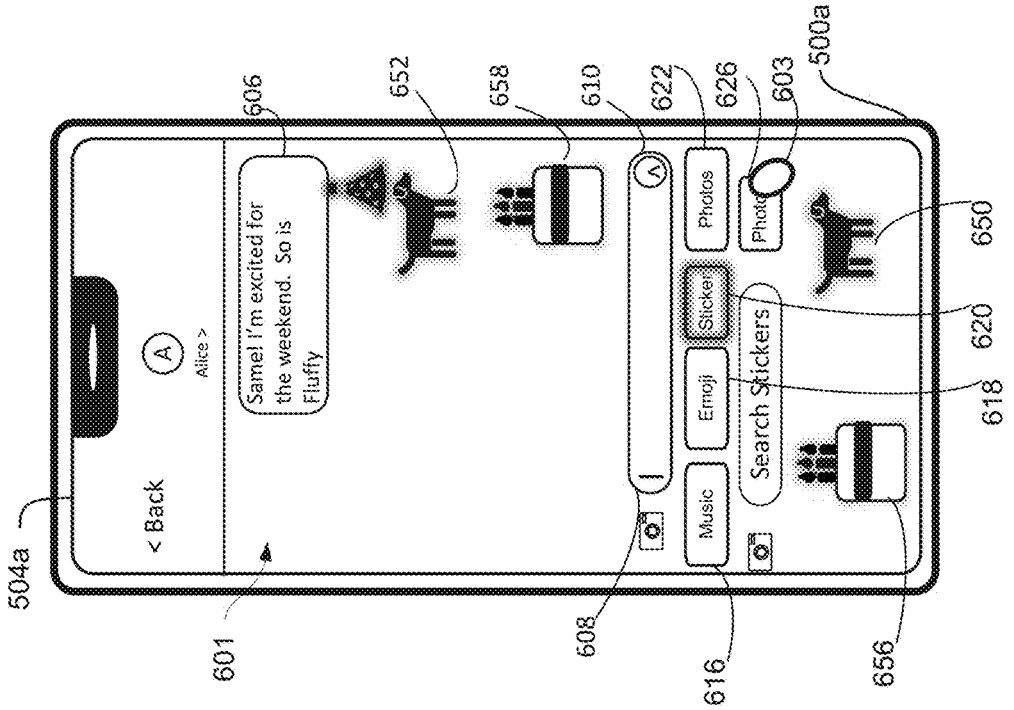
Figure 6T:
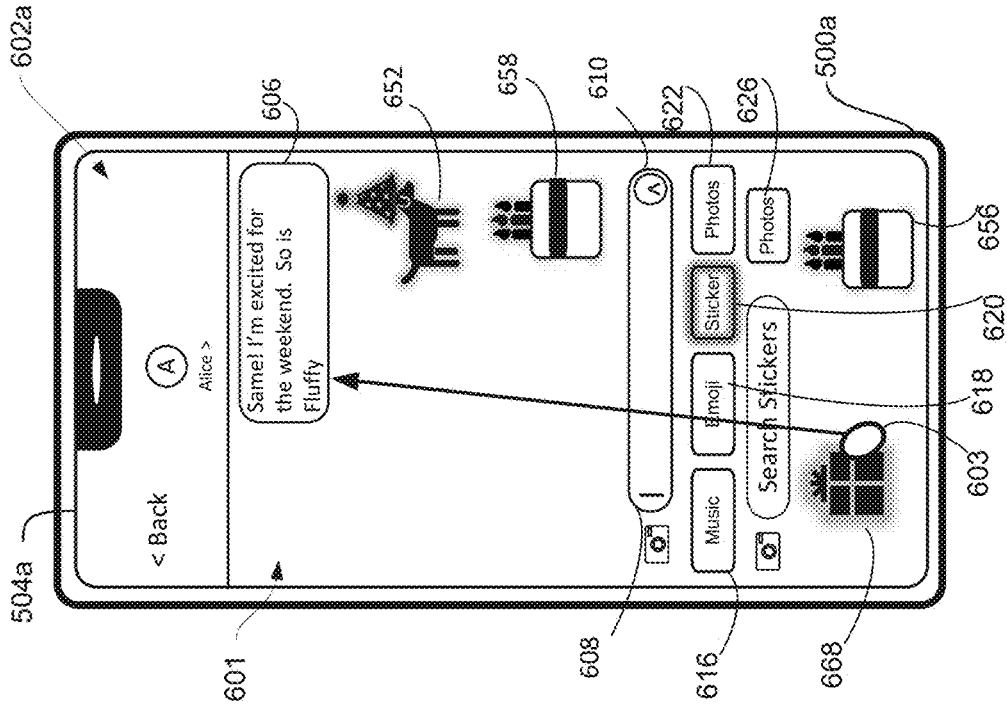
Figure 6S:
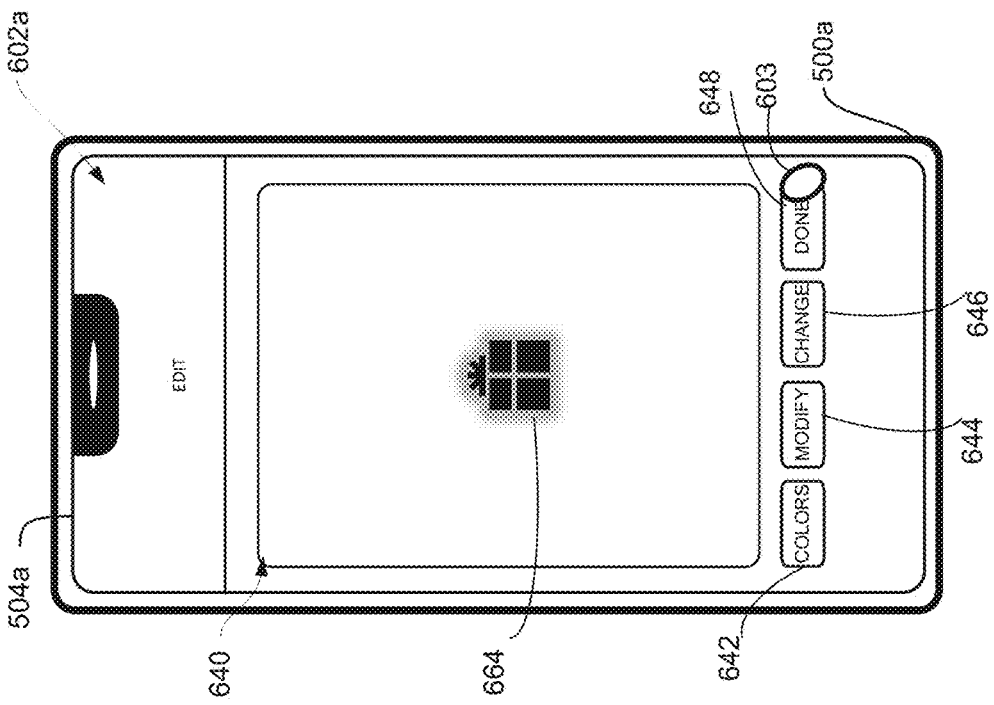
Figure 6V:
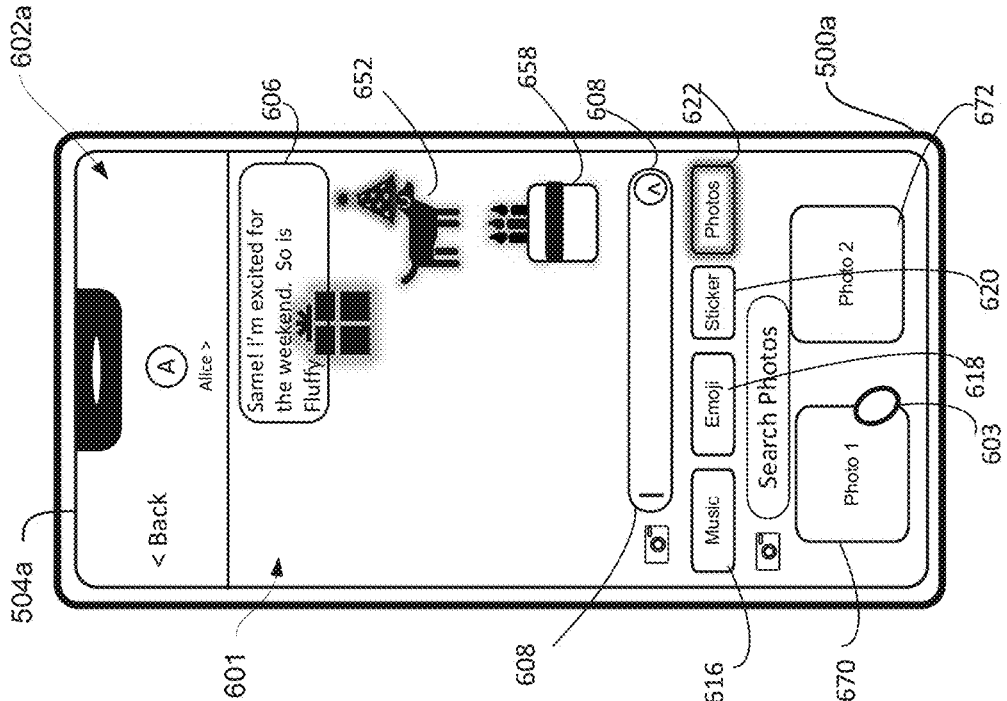
Figure 6U:
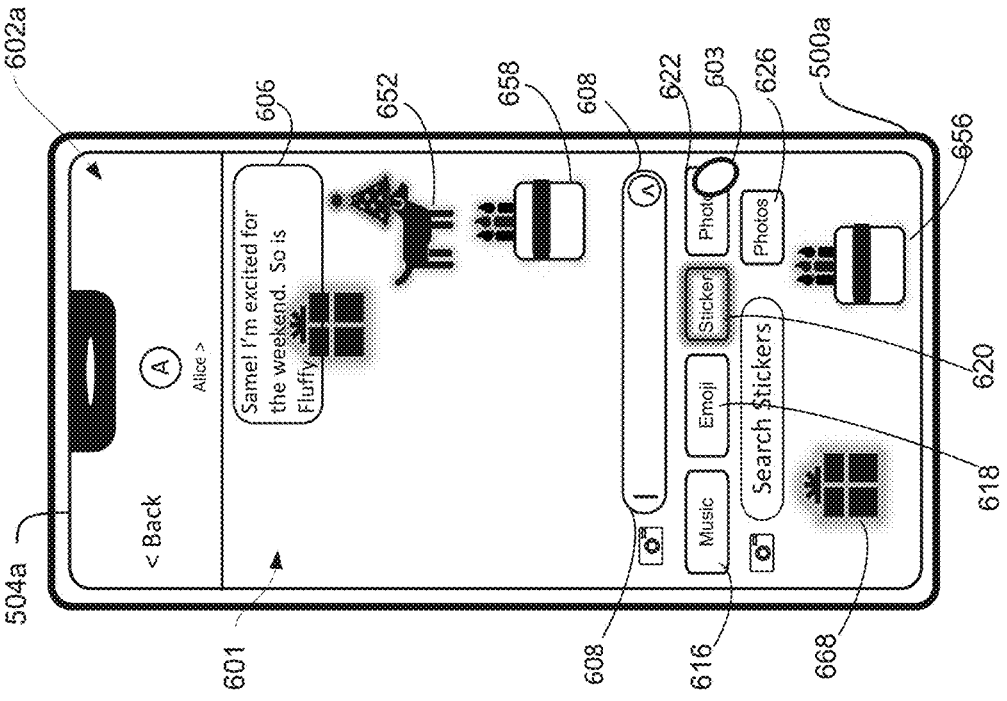
Figure 6X:
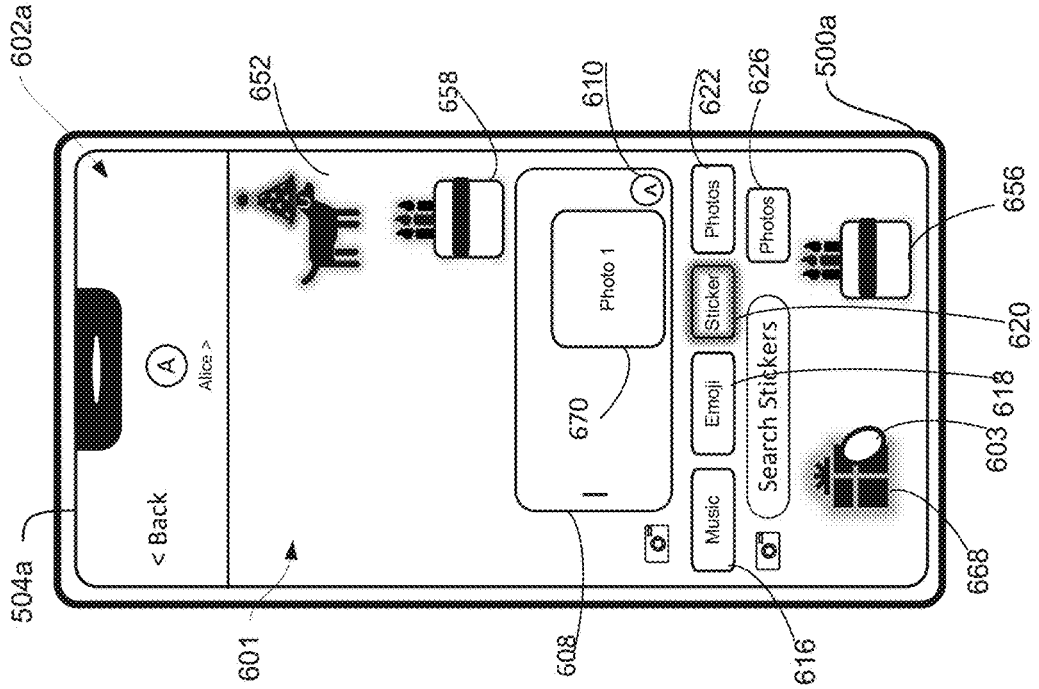
Figure 6W:
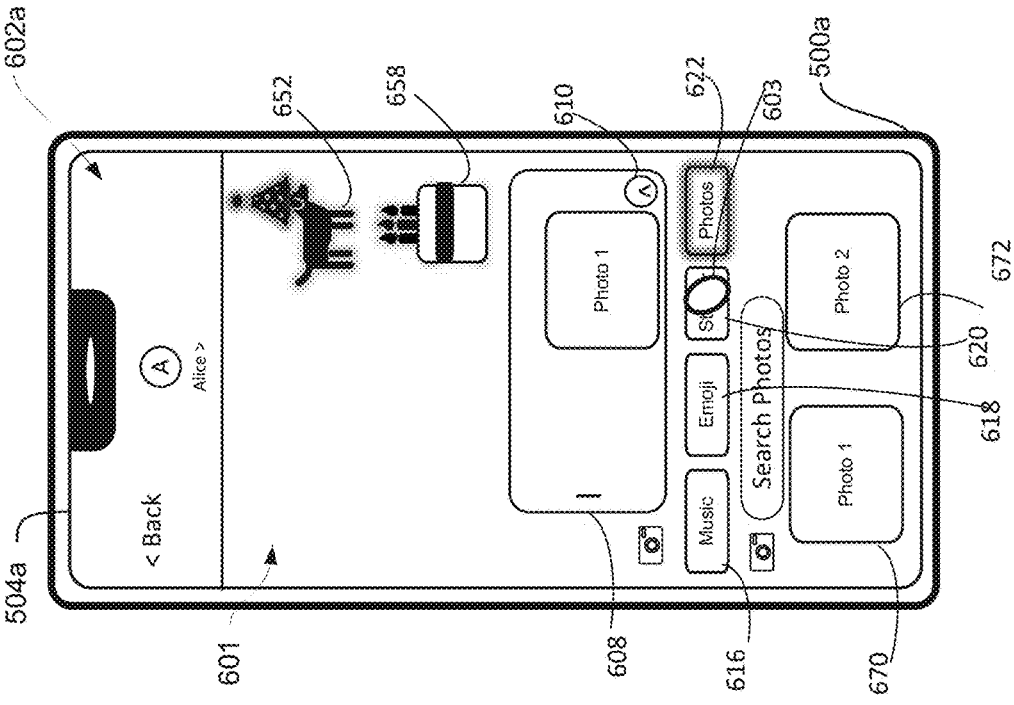
Figure 6Z:
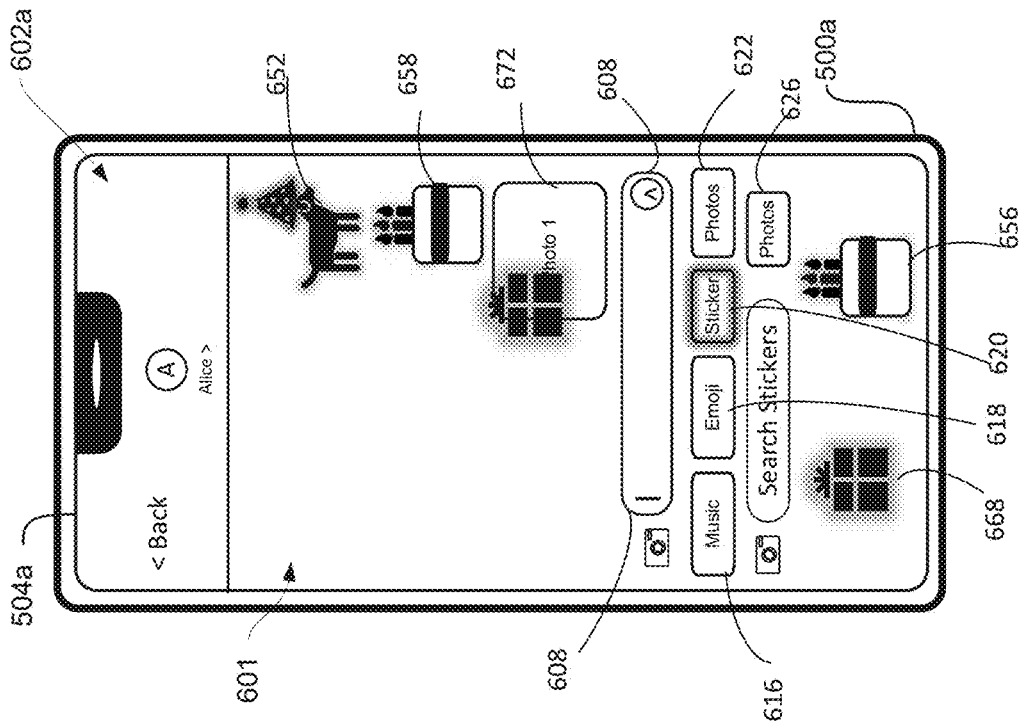

FIGS. 6A-6Z illustrate exemplary ways of generating user-created stickers for use in messaging conversations in accordance with some embodiments of the disclosure. The embodiments in these figures are used to illustrate the processes described below, including the processes described with reference to FIG. 7.

FIG. 6A illustrates an exemplary device 500a that includes touch screen 504a. In FIG. 6A, device 500a is displaying a messaging user interface 601 including a messaging conversation that includes representation 602 of a first message in the messaging conversation, representation 604 of a second message in the messaging conversation, and representation 606 of a third message in the messaging conversation. Messaging user interface 601 further includes text entry field 608 towards which input composing a message is directed, and an enter option 610 that, when selected, causes device 500a to transmit a message to the messaging conversation.

In FIG. 6A, device 500a detects selection of text entry field 608 (e.g., via contact 603). In response, in FIG. 6B, device 500a displays a soft keyboard 612 for facilitating the composing of a message for entry into the messaging conversation (e.g., via the text entry field 608), while remaining in the messaging user interface 601. Device 500a further displays selectable options 614-620 that are selectable to enter into corresponding sub-applications of the messaging application via which a user can select content to input into the messaging conversation (e.g., via text entry field 608). Selectable option 614 is selectable to display, in or over messaging user interface 601, an application store user interface for purchasing and/or accessing additional applications. Selectable option 616 is selectable to display, in or over messaging user interface 601, a user interface of a music application for listening to music. Selectable option 618 is selectable to display, in or over messaging user interface 601, a user interface of an application to access emojis. Selectable option 620 is selectable to display, in or over messaging user interface 601, a user interface of a sticker application for generating and accessing stickers for use within the messaging conversation. The selectable options are scrollable such that in response to the device 500a detecting a swipe in either the left or right direction, device 500a will display additional applications for selection.

In FIG. 6B, device 500a detects a left swipe across selectable options 614-620 (e.g., via contact 603). In response, in FIG. 6C, device 500a displays an updated display of selectable options 616-622. Selectable option 622 is selectable to display, in or over messaging user interface 601, a user interface of a photos application to access stored photos.

In FIG. 6C, device 500a detects selection of selectable option 620 (e.g., via contact 603). In response, in FIG. 6D, device 500a displays a user interface of the sticker application (e.g., below selectable options 616-622) that includes a first sticker 628 and a second sticker 630 in place of soft keyboard 612 within messaging user interface 601. Device 500a optionally visually distinguishes (e.g., darkens the outline around) selectable option 620 to indicate that selectable option 620 is currently selected. Device 500a further displays a camera selectable option 624 that is selectable to display a camera user interface to capture images for use in creating stickers, photos selectable option 626 that is selectable to access stored photos for use in creating stickers, as well as first sticker 629 and second sticker 630. Device 500a further displays a searching text entry field for searching the existing stickers.

In FIG. 6D, device 500a detects selection of photo selectable option 626 (e.g., via contact 603). In response, in FIG. 6E, device 500a displays a camera user interface 632 for capturing images for use to create stickers. Camera user interface 632 includes a representation of one or more images being captured by device 500a in real-time, wherein the currently displayed image includes a representation of first object 636 and a representation of second object 634 within the photo/image area, and a selectable option 638 that is selectable to capture the image for use in creating stickers. Device 500a visually distinguishes the portion of the image being captured and/or object that is going to be identified and captured to use to create stickers. The visual distinguishing optionally occurs in real-time and includes a mesh overlay (or other overlay or highlighting or other visual distinguishing) of the portion and/or object to be identified. In some embodiments, such as shown in FIG. 6E, device 500a automatically (e.g., without user input) identifies the portion or object in the captured image for sticker creation. In FIG. 6E, mesh overlay 639 identifies representation of first object 636 as being captured to create stickers.

In FIG. 6E, device 500a detects selection of selectable option 638 (e.g., via contact 603). In response, in FIG. 6F, device 500a captures the image that was being displayed in FIG. 6E, and displays an editing user interface 640 for editing objects captured via camera user interface 632. Editing user interface 640 includes a first sticker representation 641 of first object 636 (e.g., device 500a converted the object that it identified for sticker creation in FIG. 6E into sticker 641 in FIG. 6F) that is capable of being edited via selectable options 642-646. Selectable option 642 is selectable to initiate a process to edit the colors of first sticker representation 641. Selectable option 644 is selectable to initiate a process to modify first sticker representation 641. Selectable option 646 is selectable to initiate a process to discard the captured image from FIG. 6E and retake the image. Selectable option 648 is selectable to end the editing and accept the sticker 641 as it currently stands, and add the respective sticker to the messaging conversation and/or sticker application.

In FIG. 6F, device 500a detects selection of selectable option 648 (e.g., via contact 603). In response, in FIG. 6G, device 500a returns to messaging user interface 601 and updates the sticker application user interface to include third sticker 650 that corresponds to first sticker representation 641 of first object 636 for use within the messaging conversation.

In FIG. 6G, device 500a detects selection of third sticker 650 (e.g., via contact 603). In response, in FIG. 6H, device 500a expands text entry field 608 to include third sticker 650 (e.g., without adding sticker 650 to the messaging conversation).

In FIG. 6H, device 500a detects selection of second sticker 628 (e.g., via contact 603). In response, in FIG. 6I, device adds second sticker 628 to third sticker 650 within text entry field 608 at a suggested placement (e.g., without adding the sticker to the messaging conversation). It should be noted that device 500a optionally detects a user placement of stickers within text entry field 608 and/or enables repositioning of stickers prior to entry into the messaging conversation.

In FIG. 6I, device 500a detects selection of enter option 610 (e.g., via contact 603). In response, in FIG. 6J, device 500a updates messaging user interface 601 to include representation 652 of fourth message (e.g., corresponding to a compound sticker) in messaging conversation that corresponds to the entry in text entry field 608.

In FIG. 6J, device 500a detects selection of camera selectable option 624 (e.g., via contact 603). In response, in FIG. 6K, device 500a displays camera user interface 632, similar to the camera user interface of FIG. 6E.

In some embodiments, the user provides one or more inputs to designate the object to be captured for sticker creation. For example, the one or more inputs optionally include tapping on a portion of the image that is captured by the camera to designate the object(s) in the selected portion (to be captured for sticker creation). In FIG. 6K, device 500a detects movement of mesh overlay 639 around representation of second object 634 (e.g., in response to contact 603 tapping on a portion of the image captured by the cameras that corresponds to second object 634), indicating that the user of device 500a wants to capture second object 634 to create stickers. In response, in FIG. 6L, device 500a places mesh overlay 639 around representation of second object 634.

In FIG. 6L, device 500a detects selection of selectable option 638 (e.g., via contact 603). In response, in FIG. 6M, device 500a captures the image that was being displayed in FIG. 6L, and displays editing user interface 640, similar to the editing user interface 640 of FIG. 6F. Editing user interface 640 includes a second sticker representation 654 of second object 634 (e.g., device 500a converted the object that it identified for sticker creation in FIG. 6L into sticker 654 in FIG. 6M) that is capable of being edited via selectable options 642-646.

In FIG. 6M, device 500a detects selection of selectable option 644 (e.g., via contact 603). In response, in FIG. 6N, device 500a enables the user of device 500a to modify second sticker representation 654.

In FIG. 6N, device 500a detects modification of second sticker representation 654 (e.g., via contact 603 and/or via one or more other inputs for modifying sticker 654 as described with reference to method 700). In response, in FIG. 6O, device 500a updates editing user interface 640 to include a modified version of second sticker representation 654 (e.g., the colors of second sticker representation 654 are modified, the shape of second sticker representation 654 are modified, and/or the size of second sticker representation 654 is modified.)

In FIG. 6O, device 500a detects selection of selectable option 648 (e.g., via contact 603). In response, in FIG. 6P, device 500a returns to messaging user interface 601 and updates the sticker application to include fourth sticker 656 that corresponds to second sticker representation 654 of second object 634 for use within the messaging conversation.

In FIG. 6P, device 500a detects selection and movement of fourth sticker 656 from the sticker application directly into the messaging application at a desired location (e.g., such as via a drag and drop input from contact 603 on sticker 656). In response, in FIG. 6Q, device 500a updates messaging user interface 601 and messaging conversation to include representation 658 of fifth message in the messaging conversation at the desired placement (e.g., via contact 603).

In FIG. 6Q, device 500a detects selection of photo selectable option 626 (e.g., via contact 603). In response, in FIG. 6R, device 500a facilitates access to stored photos from within the sticker application. In FIG. 6R, device 500a displays a first photo 660 and a second photo 662 that are stored and/or accessible on device 500a, and are selectable for sticker creation based on those photos.

In FIG. 6R, device 500a detects selection of first photo 660 (e.g., via contact 603). In response, in FIG. 6S, device 500a displays editing user interface 640, such as described with reference to FIG. 6E (e.g., device 500a converted the object in photo 660 for sticker creation in FIG. 6S). Editing user interface 640 includes a third sticker representation 664 of first photo 660 that is capable of being edited via selectable options 642-646.

In FIG. 6S, device 500a detects selection of selectable option 648 (e.g., via contact 603). In response, in FIG. 6T, device 500a returns to messaging user interface 601 and updates the sticker application to include a fifth sticker 668 that corresponds to third sticker representation 664 of first photo 660 for use within the messaging conversation.

In FIG. 6T, device 500a detects selection and movement of fifth sticker 668 (e.g., via contact 603) to representation 606 of third message in the messaging conversation (e.g., such as via a drag and drop input from contact 603 on sticker 668). In response, in FIG. 6U, device 500a updates messaging user interface 601 to include fifth sticker 668 placed over representation 606 of third message in the messaging conversation at the desired position (e.g., as indicated via contact 603).

In FIG. 6U, device 500a detects selection of selectable option 622 (e.g., via contact 603). In response, in FIG. 6V, device 500a displays a user interface of a photo application within messaging user interface 601 (e.g., outside of the sticker creation application), and displays a representation of a first image 670 and a representation of a second image 672 that are selectable for use within the messaging conversation. The first and second images are optionally populated from the same repository of images and/or photos as the sticker creation application in FIG. 6R. Device 500a visually distinguished (e.g., darkens the outline around) selectable option 622 to indicate that selectable option 622 is currently selected.

In FIG. 6V, device 500a detects selection of representation of a first image 670 (e.g., via contact 603). In response, in FIG. 6W, device 500a updates messaging user interface 601 to expand text entry field 608 and include first image 670 in text entry field 608.

In FIG. 6W, device 500a detects selection of selectable option 620 (e.g., via contact 603). In response, in FIG. 6X, device 500a displays the user interface of the sticker application and displays fourth sticker 656 and fifth sticker 668, while continuing to display first image 670 in text entry field 608, as well as continuing to display messaging user interface 601.

In FIG. 6X, device 500a detects selection of fifth sticker 668 (e.g., via contact 603). In response, in FIG. 6Y, device 500a updates messaging user interface 601 to include fifth sticker 668 within text entry field 608 at a suggested placement (or user-defined placement) relative to first image 670 (e.g., stacked on top of and/or added to first image 670).

Figure 6Y:
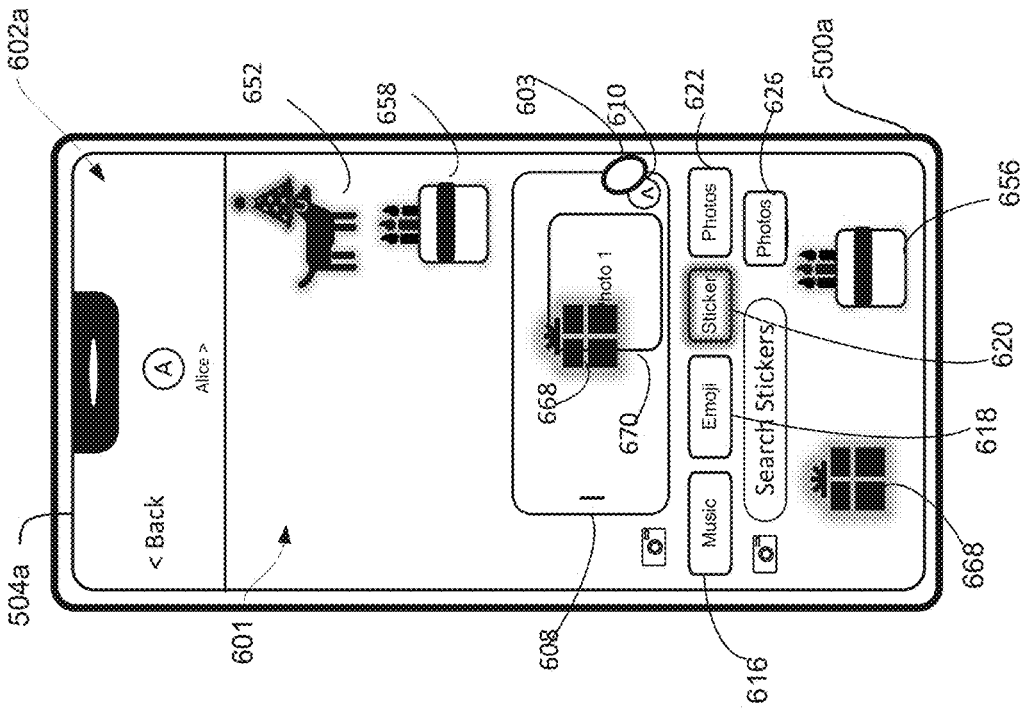

In FIG. 6Y, device 500a detects selection of enter option 610 (e.g., via contact 603). In response, in FIG. 6Z, device 500a updates messaging user interface 601 to include representation 690 of sixth message in messaging conversation that corresponds to the entry in text entry field 608 (e.g., the combined image and sticker collection created by user input).

FIG. 7 is a flow diagram illustrating a method 700 of exemplary ways of generating user-created stickers for use in messaging conversations in accordance with some embodiments, such as in FIGS. 6A-6Z. The method 700 is optionally performed at an electronic device such as device 100, device 300, or device 500 as described above with reference to FIGS. 1A-1B, 2-3, 4A-4B and 5A-5H. In some embodiments, method 700 is performed at or by an automobile (e.g., at an infotainment system of an automobile having or in communication with one or more display generation components and/or input devices). Some operations in method 700 are, optionally combined and/or order of some operations is, optionally, changed.

In some embodiments, method 700 is performed, at an electronic device in communication with a display generation component and one or more input devices, such as display 340 and sensor(s) 350 of FIG. 3 and electronic device 500 of FIG. 6A. For example, a mobile device (e.g., a tablet, a smartphone, a media player, or a wearable device) including wireless communication circuitry, optionally in communication with one or more of a mouse (e.g., external), trackpad (optionally integrated or external), touchpad (optionally integrated or external), remote control device (e.g., external), another mobile device (e.g., separate from the electronic device), a handheld device (e.g., external), and/or a controller (e.g., external), etc.). In some embodiments, the display generation component is a display integrated with the electronic device (optionally a touch screen display), external display such as a monitor, projector, television, or a hardware component (optionally integrated or external) for projecting a user interface or causing a user interface to be visible to one or more users, etc.

In some embodiments, while displaying, via the display generation component, a first user interface corresponding to a messaging conversation in a messaging application, the electronic device detects (702a), via the one or more input devices, a first user input corresponding to a request to initiate a process to create a first sticker based on a first image including one or more objects, wherein the first sticker is for use in the messaging application, such as contact 603 in FIG. 6D. In some embodiments, the electronic device includes a messaging application and the first user interface is a messaging conversation within messaging application. In some embodiments, the electronic device is capable of initiating a process to create and store stickers based on objects contained in images for use within the messaging application, while remaining in the messaging application (e.g., while continuing to display at least a portion of the messaging conversation, such as representations of one or more messages included in the messaging conversation and/or the input text/content field and corresponding button that is selectable to send the content of the input text/content field to the messaging conversation). For example, the electronic device optionally detects a first user input to create a first sticker (e.g., of a dog) based on a first image including one or more objects (e.g., a dog and a table). In some embodiments, the first user input is selection of a selectable option displayed in the first user interface that causes display of a sticker creation user interface from which stickers are created from one or more images, as will be described in more detail below. In some embodiments, stickers (including the first sticker) are detailed illustrations of a character and/or object that are a mix of cartoons and/or emojis. In some embodiments, stickers are user interface elements that can be placed in a messaging conversation to decorate the conversation. For instance, stickers are optionally placed in a messaging conversation in empty space or placed on top of a portion of a message in the messaging conversation. Furthermore, stickers are optionally adjusted prior to decorating the messaging conversation such as by adjusting the orientation/alignment relative to the user interface, adjusting the size, or adjusting a portion of the size.

In some embodiments, in response to detecting the first user input, the electronic device initiates (702b) the process to create the first sticker, such as via contact 603 in FIG. 6E and contact 603 in FIG. 6F (e.g., while remaining in the messaging application (e.g., while continuing to display at least a portion of the messaging conversation, such as representations of one or more messages included in the messaging conversation and/or the input text/content field and corresponding button that is selectable to send the content of the input text/content field to the messaging conversation)).

In some embodiments, the electronic device identifies (702c) a first object of the one or more objects in the first image, such as via overlay 639 of FIG. 6E. For example, the electronic device optionally parses the first image to identify one or more objects in the first image. Upon identifying the one or more objects, the electronic device optionally identifies a particular object in the first image, and optionally visually distinguishes it from other parts of the image, such as by surrounding the object with an identification indication. The identification indication is optionally a shape such as a circle, a square, a rectangle, or the like. In some embodiments, the electronic device receives a user input (e.g., a tap on the particular object) identifying the object.

In some embodiments, the electronic device generates (702d) the first sticker for use within the messaging application, wherein the first sticker is a representation of the first object and is based on a first portion of the image that includes the first object and is not based on a second portion of the image that does not include the first object, such as sticker 650 in FIG. 6G that includes representation of first object 636 but does not include representation of second object 634 of FIG. 6K. For instance, the first sticker is optionally a representation of the first object that resembles a handheld sticker. The first sticker optionally includes an outline surrounding the first sticker and has a cartoonlike appearance. The first sticker optionally includes the first object in the first portion but does not include one or more other objects that are present within the second portion of the image and/or does not include portions of the image outside of the first object that do not include objects (e.g., portions of the image that include empty space).

In some embodiments, after initiating the process to create the first sticker, the electronic device displays (702e), in the first user interface, the first sticker, such as sticker 650 in FIG. 6G. In some embodiments, the first sticker is displayed within the first user interface such that the user of the electronic device can view and/or manipulate the first sticker. In some embodiments, the first sticker is displayed in a sticker viewing and/or browsing user interface (e.g., included in the first user interface) from which stickers (including the first sticker) that have been created by the user are browsable and/or selectable for use in the messaging application.

In some embodiments, while displaying the first sticker, the electronic device detects (7020, via the one or more input devices, a second user input corresponding to a request to place the first sticker in the messaging conversation, such as contact 603 in FIG. 6G. In some embodiments, the request includes a user input directed to the first sticker, such as a tap input, a click input, (e.g., via a mouse or trackpad in communication with the electronic device), a swipe or drag input, and/or a hover input (e.g., in which a hand of the user is maintained above a portion of the electronic device, such as the display generation component, and/or provides a pinch gesture (e.g., in which the index finger and thumb of the hand of the user make contact)) on a location of the display generation component that is associated with the first sticker.

In some embodiments, in response to detecting the second user input, the electronic device displays (702e) the first sticker in the messaging conversation, such as shown in FIG. 6H. In some embodiments, the first sticker is displayed within the messaging conversation as a standalone message. Additionally or alternatively, the first sticker is optionally displayed within the messaging conversation in association with and/or as an addition to (e.g., covering a portion of) another message in the messaging conversation. Generating user-created stickers in the manner described above reduces the number of inputs needed to create unique and personalized stickers to utilize in messaging conversations.

In some embodiments, the process to create the first sticker includes ceasing display of the first user interface corresponding to the messaging conversation, such as shown in FIG. 6E. In some embodiments, the ceasing display of the first user interface includes hiding display of the first user interface.

In some embodiments, the electronic device displays, via the display generation component, a camera user interface that is configured to capture the first image, such as camera user interface 632 in FIG. 6E. In some embodiments, the camera user interface includes a portion that includes live images captured by one or more cameras of the electronic device, and a selectable option for capturing and/or storing the live images (e.g., of an area surrounding the electronic device). In some embodiments, the camera user interface includes a second portion that includes stored images previously captured by the electronic device (or a selectable option for displaying stored images previously captured by the electronic device) for selection as the first image. In some embodiments, the camera user interface facilitates the capture of the first image from an external repository to which the electronic device has access. Capturing images in the manner described above reduces the number of inputs needed to create unique and personalized stickers to utilize in a messaging conversation.

In some embodiments, the first object has a respective characteristic having a first value in the first image (e.g., a size of a part of the first object such as a head of a person or animal, a color of a portion of the first object such as a head of a person or an animal, or a shading of a part of the first object such as an outline of a person or an animal), and has the respective characteristic having a second value, different from the first value, in the first sticker, such as the color of representation of second object 639 in FIG. 6L and the color of second sticker 656 in FIG. 6P. For instance, in some embodiments, the first sticker is a representation of a person where the person is displayed with a larger head than in the first image, giving the first sticker a more cartoony look. This changing of the respective characteristic is optionally accomplished by a user of the electronic device during the creation of the sticker, or is optionally performed automatically by the electronic device after the first image has been captured without user input for performing such modification of the respective characteristic. Generating user-created stickers with different visual appearances than the images from which they are created reduces the number of inputs needed to create unique stickers to utilize in messaging conversations.

In some embodiments, while displaying the camera user interface, the electronic device receives, via one or more input devices, a third user input to initiate a process to capture the first image via one or more cameras of the electronic device, such as contact 603 in FIG. 6D and contact 603 in FIG. 6E. In some embodiments, the first image is captured in real-time via one or more cameras of the electronic device and includes one or more objects, including the first object, surrounding the electronic device. In some embodiments, the third user input includes selection of a selectable option in the camera user interface for capturing the first image.

In some embodiments, in response to receiving the third user input, the electronic device captures the first image via the one or more cameras of the electronic device, and after capturing the first image, identifying the first object in the first image and generating the first sticker from the first image, such as contact 603 in FIG. 6E and contact 603 in FIG. 6F. In some embodiments, the electronic device identifies the first object and generates the first sticker as described herein such that the first sticker is representative of an object in the area surrounding the electronic device. Generating user-created stickers based on captured real-time images of objects surrounding the electronic device reduces the number of inputs needed to create unique and personalized stickers to utilize in messaging conversations.

In some embodiments, the electronic device initiates a process (e.g., contact 603 in FIGS. 6D and 6E) to create the first sticker (e.g., 650). In some embodiments, the electronic device receives, via one or more input devices, a third user input corresponding to a request to select the first image from an image repository accessible via the electronic device, such as via contact 603 in FIG. 6Q. In some embodiments, the first image is selected from an image repository stored on the electronic device. Alternatively, in some embodiments, the first image is selected from an external repository to which the electronic device has access.

In some embodiments, the first image was captured by one or more cameras of the electronic device, but prior to detecting the first user input. In some embodiments, the first image was not captured by one or more cameras of the electronic device (e.g., the first image was sent to the electronic device by another user, or the first image was downloaded to the electronic device from a public repository of images on the Internet). Generating user-created stickers based on images in an image repository increases the images available and reduces the number of inputs needed to create unique and personalized stickers to utilize in messaging conversations.

In some embodiments, the electronic device identifies the first object of the one or more objects in the first image is performed automatically, such as via overlay 639 in FIG. 6E (e.g., without user input identifying or selecting the first object in the first image). In some embodiments, the electronic device identifies the first object based on an algorithm and/or the user's past history. For example, in some embodiments, the electronic device utilizes one or more image recognition algorithms to identify the first object in the image as the object to be converted into a sticker based on one or more of: the first object being in a central region of the captured image, the first object corresponding to a person, the first object corresponding to a pet, and/or the first object being an object that is further than a threshold distance (e.g., 0.1, 0.3, 0.5, 1, 3, 5, 10 or 20 meters) from other objects in the first image. Identifying the first object automatically reduces the number of user inputs needed to identify the first object.

In some embodiments, while identifying the first object of the one or more objects in the first image, a first portion of the image corresponding to the first object is visually distinguished from a second portion of the image not corresponding to the first object, such as shown in FIG. 6E since overlay 639 is visually distinguished from the remaining portion of the image. In some embodiments, the first portion is visually distinguished in real-time. In some embodiments, the first portion is visually distinguished by displaying a mesh overlay (or other overlay or highlighting) on the first portion and not the second portion. In some embodiments, the mesh overlay is a circle, a square, or the like. In some embodiments, the mesh overlay is transparent by an amount of 20%, 40%, 60%, or 80%. In some embodiments, the mesh overlay is patterned and is checkered, striped, or the like. In some embodiments, the first portion is visually distinguished by a highlighting of the first portion (and a lack of highlighting of the second portion). In some embodiments, the size and/or placement of the highlighting and/or overlay is based on the size and/or location of the first object in the first image. Distinguishing the first portion of the image that will be stickered provides the user with a real-time indication and feedback of what object will be the basis of the sticker, and reduces errors in usage of the electronic device for sticker creation.

In some embodiments, identifying the first object of the one or more objects in the first image is based on a third user input corresponding to an identification of the first object in the first image, such as via contact 603 selection of overlay 639 in FIG. 6K. In some embodiments, the third user input corresponds to a manual user selection of the first object and/or a first portion of the image that includes the first object. In some embodiments, the third user input is a tap input, a click input, (e.g., via a mouse or trackpad in communication with the electronic device), a swipe or drag input, and/or a hover input directed to the first portion of the image. In some embodiments, the electronic device receives one or more subsequent user inputs adjusting the identification of the first object in the first image. For instance, the subsequent user input optionally corresponds to a widening of the identification area, a reduction of the identification area, and/or a movement of the identification area within the first image such that the final object to be identified for sticker creation is based on the adjusted identification area. In some embodiments, the identification of the first object is in a first portion of the first image that is visually distinguished from a second portion of the first image in one or more of the ways described with reference to method 700. Identifying the first object based on user input provides the user with control over the first object selection and reduces user inputs needed to generate the desired sticker.

In some embodiments, the first sticker is displayed with an outline that was not included around the first object in the first image, such as shown in first sticker representation 641 in FIG. 6F. In some embodiments, the outline is a darkened edge and/or thicker border around the first object to mimic a handheld sticker. In some embodiments, the electronic device automatically determines the placement, size and/or shape of the outline (e.g., based on the first object, such as based on the size and/or shape of the first object); in some embodiments, the placement, size and/or shape of the outline is determined based on user input specifying the placement, size and/or shape of the outline. Displaying the first sticker with an outline clearly conveys that the first sticker is a sticker and not an image and reduces errors in usage of the first sticker.

In some embodiments, the second user input corresponds to a request to place the first sticker (e.g., 650) in the messaging conversation (e.g., via 608) by placing the first sticker on a respective image, and placing the respective image (e.g., 670) including the first sticker into the messaging conversation, such as contact 603 in FIG. 6X. In some embodiments, the electronic device receives one or more user inputs to generate a combined element that includes one or more stickers and/or images, and one or more inputs to send that combined element to the messaging conversation. For instance, the first sticker or combined element optionally includes one or more stickers stacked on top of each other, one or more stickers stacked on top of an image, or both. In some embodiments, the electronic device stores the layered sticker in addition to the individual one or more stickers and/or images that are part of the layered sticker in a sticker repository for later use. In some embodiments, the one or more stickers peel off to mimic the peeling of a real sticker. Generating user-created layered stickers in the manner described above reduces the number of inputs needed to create unique and personalized stickers to utilize in messaging conversations.

In some embodiments, after initiating the process to create the first sticker, the electronic device displays, via the display generation component, the first user interface, including a first set of selectable options (e.g., 616, 618, 620, and/or 622) including a first selectable option (e.g., 620) that is selectable to display one or more stickers, including the first sticker, for use in the messaging application, such as in FIG. 6C (e.g., one or more representations of one or more stickers including the first sticker. In some embodiments, the first set of selectable options is displayed within the messaging application user interface or as a separate tab within the messaging application user interface.).

In some embodiments, the electronic device displays a second selectable option that is selectable to display a second user interface for performing one or more operations other than sticker operations with respect to the messaging application, such as selectable options 616, 618, and/or 622 in FIG. 6C. In some embodiments, selection of the second selectable option causes display of a second user interface that does not include the one or more stickers. For instance, selection of the second selectable option causes display of an application store user interface, a photo storage user interface, a stored sticker pack user interface, a memoji pack user interface, or the like.

In some embodiments, while displaying the first user interface, the electronic device detects via the one or more input devices, a third user input corresponding to selection of the first selectable option, such as contact 603 in FIG. 6C. In some embodiments, the third user input includes a tap input, a click input (e.g., via a mouse or trackpad in communication with the electronic device), a swipe or drag input, and/or a hover input directed to the first selectable option.

In some embodiments, in response to detecting the third user input, the electronic device displays, via the display generation component, a third user interface including the first sticker, such as first sticker 650 in FIG. 6G. In some embodiments, the third user interface includes one or more stickers created by the user of the electronic device. In some embodiments, the third user interface is scrollable to access/view the one or more stickers within the third user interface. Providing easy access to previously-user-created stickers in the manner described above reduces the number of inputs needed to access desired stickers for use within messaging conversations.

In some embodiments, after initiating the process to create the first sticker, the electronic device detects, via the one or more input devices, a third user input corresponding to a request to alter a visual appearance of the first sticker, such as contact 603 in FIG. 6M and contact 603 in FIG. 6N. In some embodiments, the first sticker is displayed within an editing user interface capable of receiving one or more user inputs/requests to alter the appearance of the first sticker. For instance, the request optionally includes an alteration to one or more portions of the first sticker. In some embodiments, the request includes a first alteration to a first portion of the first sticker and second alteration to a second portion of the first sticker. The first alteration and the second alteration are optionally the same or different.

In some embodiments, in response to detecting the third user input, the electronic device alters the visual appearance of the first sticker in accordance with the third user input, such as shown in FIG. 6O. In some embodiments, the altered visual appearance of the first sticker is displayed within the editing user interface, and the resulting sticker that is created has the altered appearance based on the third user input. Altering the appearance of user-created stickers provides increased flexibility to create unique and personalized stickers to utilize in messaging conversations.

In some embodiments, the request to alter the visual appearance of the first sticker includes a request to alter one or more colors of the first sticker, such as shown in FIG. 6O by changing the color of the cake (e.g., 654). In some embodiments, the request alters either a first color of a first portion of the first sticker, a second color of a second portion of the first sticker, or both. The first color and the second color are optionally the same or different. In some embodiments, the request alters additional portions of the first sticker. Altering the color(s) of user-created stickers provides increased flexibility to create unique and personalized stickers to utilize in messaging conversations.

In some embodiments, the request to alter the appearance of the first sticker includes a request to alter a first portion of the first sticker without altering a second portion of the first sticker, such as shown in FIG. 6O by enlarging the cake (e.g., 654). For instance, the request optionally alters a head of an animal (or other subject) of the first sticker without altering the body of the animal (e.g., making the head bigger without making the body bigger, or making the body smaller without making the head bigger). Altering the size(s) of user-created stickers provides increased flexibility to create unique and personalized stickers to utilize in messaging conversations.

In some embodiments, the process to create the first sticker is performed within a first application, different from the messaging application, such as stickers 628 and 630 of FIG. 6D that were created in the first application different from the messaging application. In some embodiments, the creation of the sticker occurs within the messaging user interface. In alternative embodiments, the creation of the sticker occurs in a separate user interface from the messaging user interface. For example, a sticker creation application is separately launched in response to user input from the user (e.g., selection of an icon corresponding to the sticker creation application on the home screen of the electronic device, such as a home screen as described with reference to FIG. 4A), separate from the messaging application, and the sticker is created in that application user interface (rather than from a user interface of the messaging application). Allowing creation of the user-created stickers in multiple ways allows for efficient and easy sticker-creation and reduces the number of inputs needed to create unique and personalized stickers to utilize in messaging conversations.

In some embodiments, the process to create the first sticker is performed within the messaging application, such as illustrated with respect to first sticker 650 in FIG. 6G. In some embodiments, the creation of the sticker occurs within a sticker application that is a sub-application of the messaging application (e.g., that is launched from and/or displayed within the messaging application). In some embodiments, the electronic device redirects a user to the sticker application upon receiving a user input (e.g., directed to the sticker sub-application) requesting redirection to the sticker application. Allowing creation of the user-created stickers in multiple ways allows for efficient and easy sticker-creation and reduces the number of inputs needed to create unique and personalized stickers to utilize in messaging conversations.

In some embodiments, the second user input corresponds to a request to place the first sticker (e.g., 628) in the messaging conversation by placing the first sticker (e.g., 628) on a second sticker (e.g., 650), and placing the second sticker (e.g., 650) including the first sticker (e.g., 628) into the messaging conversation, such as shown in FIG. 6I. In some embodiments, the electronic device receives one or more user inputs to generate a layered sticker that includes one or more stickers layered on top of each other. For instance, the layered sticker optionally includes the one or more stickers (including the first sticker) stacked on top of the second sticker and/or each other. In some embodiments, the layered sticker is generated within a message/content input field for the messaging conversation. In some embodiments, the layered sticker is generated within a portion of the user interface in which the stickers are displayed and/or created before they are placed in the message/content input field for the messaging conversation. In some embodiments, the layered sticker includes only user-created stickers that are generated based on user-provided images as described herein, only system/default stickers that are not generated based on user-provided images as described herein, or a mix.

Generating user-created layered stickers in the manner described above reduces the number of inputs needed to create unique and personalized stickers to utilize in messaging conversations.

In some embodiments, the second user input corresponds to a request to place the first sticker in the messaging conversation by placing the first sticker at a user-defined location within the messaging conversation, and displaying the first sticker in the messaging conversation includes displaying the first sticker at the user-defined location in the messaging conversation, such as displaying representation 658 in FIG. 6Q in response to movement of contact 603 in FIG. 6P. In some embodiments, the request includes a user input directed to the first sticker such as a drag input beginning at a current location of the first sticker and ending at a desired, user-defined location within the messaging conversation. In some embodiments, the user-defined location is not a last and/or most-recent position in the messaging conversation (e.g., is a position in the messaging conversation that corresponds to past messaging activity in the messaging conversation). In some embodiments, the user-defined location corresponds to messaging activity of the user of the electronic device. In some embodiments, the user-defined location corresponds to messaging activity of a user other than the user of the electronic device. In some embodiments, the user-defined location is within the message/content input field for the messaging conversation. In some embodiments, the user-defined location is within the messaging conversation, outside of the message/content input field for the messaging conversation. Providing an option to place the sticker within the messaging conversation at a location that is user-defined reduces the number of inputs needed to personalize the messaging conversation.

In some embodiments, the user-defined location corresponds to an existing first message (e.g., the message corresponding to representation 606 in FIG. 6T) in the messaging conversation, such as via contact 603 in FIG. 6T. In some embodiments, the request includes a user input directed to the first sticker such as a drag input beginning at a current location of the first sticker and ending at a first message within the messaging conversation, where the first message has previously already been sent to the messaging conversation (e.g., by the user of the electronic device or a user of another electronic device). Providing an option to place stickers on existing messaging within the messaging conversation reduces the number of inputs needed to personalize the messaging conversation.

It should be understood that the particular order in which the operations in FIG. 7 have been described as merely exemplary and is not intended to indicate that the described order is the only order in which the operations could be performed. One of ordinary skill in the art would recognize various ways to reorder the operations described herein.

The operations in the information processing methods described above are, optionally, implemented by running one or more functional modules in an information processing apparatus such as general purpose processors (e.g., a as described with respect to FIGS. 1A-1B, 3, 5A-5H) or application specific chips. Further, the operations described above with reference to FIG. 7 are, optionally, implemented by components depicted in FIGS. 1A-1B. For example, detecting operations 702a and 702c are, optionally, implemented by event sorter 170, event recognizer 180, and event handler 190. Event monitor 171 in event sorter 170 detects a contact on touch screen 504, and event dispatcher module 174 delivers the event information to application 136-1. A respective event recognizer 180 of application 136-1 compares the event information to respective event definitions 186, and determines whether a first contact at a first location on the touch screen corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

As described above, one aspect of the present technology is the gathering and use of data available from specific and legitimate sources to facilitate the creation of stickers for use in messaging conversations. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used to identify sources, such as images, for sticker creation. Accordingly, use of such personal information data enables users to identify, find, and facilitate creation of stickers. Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, such as in the case of advertisement delivery services, the present technology can be configured to allow users to select to "opt in" or "opt out" of participation in the collection of personal information data during registration for services or anytime thereafter. In another example, users can select not to provide personal data and/or device or object location data. In yet another example, users can select to limit the length of time personal data and/or device or object location data is maintained or entirely block the development of a baseline location profile. In addition to providing "opt in" and "opt out" options, the present disclosure contemplates providing notifications relating to the access or use of personal information. For instance, a user may be notified upon downloading an application that their personal information data and/or location data will be accessed and then reminded again just before personal information data is accessed by the application.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, location data and notifications can be delivered to users based on aggregated non-personal information data or a bare minimum amount of personal information.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method comprising:

at an electronic device in communication with a display generation component and one or more input devices:

while displaying, via the display generation component, a first user interface corresponding to a messaging conversation in a messaging application, detecting, via the one or more input devices, a first user input corresponding to a request to initiate a process to create a first sticker based on a first image including one or more objects, wherein the first sticker is for use in the messaging application;

in response to receiving the first user input, initiating the process to create the first sticker, including:

automatically identifying a first object of the one or more objects in the first image without additional user input; and generating the first sticker for use within the messaging application, wherein the first sticker is a representation of the first object that has a shape based on an automatically determined shape of the first object in the first image, and is based on a first portion of the first image that includes the first object and is not based on a second portion of the first image that does not include the first object; and after initiating the process to create the first sticker, displaying, in the first user interface, the first sticker;

while displaying the first sticker, detecting, via the one or more input devices, a second user input corresponding to a request to place the first sticker in the messaging conversation; and in response to detecting the second user input, displaying the first sticker in the messaging conversation.

2. The method of claim 1, wherein after identifying the first object of the one or more objects in the first image, the first portion of the first image that includes the first object is visually distinguished from the second portion of the first image that does not include the first object.

3. The method of claim 1, wherein the first sticker is displayed with an outline that was not included around the first object in the first image.

4. The method of claim 1, wherein the second user input corresponds to a request to place the first sticker in the messaging conversation by placing the first sticker on a respective image, and placing the respective image including the first sticker into the messaging conversation.

5. The method of claim 1, further comprising:

after initiating the process to create the first sticker, displaying, via the display generation component, the first user interface, including a first set of selectable options including a first selectable option that is selectable to display one or more stickers, including the first sticker, for use in the messaging application, and a second selectable option that is selectable to display a second user interface for performing one or more operations other than sticker operations with respect to the messaging application;

while displaying the first user interface, detecting, via the one or more input devices, a third user input corresponding to selection of the first selectable option; and in response to detecting the third user input, displaying, via the display generation component, a third user interface including the first sticker.

6. The method of claim 1, further comprising:

after initiating the process to create the first sticker, detecting, via the one or more input devices, a third user input corresponding to a request to alter a visual appearance of the first sticker; and in response to detecting the third user input, altering the visual appearance of the first sticker in accordance with the third user input.

7. The method of claim 6, wherein the request to alter the visual appearance of the first sticker includes a request to alter one or more colors of the first sticker.

8. The method of claim 6, wherein the request to alter the visual appearance of the first sticker includes a request to alter a first portion of the first sticker without altering a second portion of the first sticker.

9. The method of claim 1, wherein the second user input corresponds to a request to place the first sticker in the messaging conversation by placing the first sticker on a second sticker, and placing the second sticker including the first sticker into the messaging conversation.

10. The method of claim 1, wherein the second user input corresponds to a request to place the first sticker in the messaging conversation by placing the first sticker at a user-defined location within the messaging conversation, and displaying the first sticker in the messaging conversation includes displaying the first sticker at the user-defined location in the messaging conversation.

11. An electronic device, comprising:

one or more processors;

memory; and one or more programs stored in the memory and comprising instructions, which, when executed by the one or more processors, cause the electronic device to perform a method, comprising:

while displaying, via a display generation component, a first user interface corresponding to a messaging conversation in a messaging application, detecting, via one or more input devices, a first user input corresponding to a request to initiate a process to create a first sticker based on a first image including one or more objects, wherein the first sticker is for use in the messaging application;

in response to receiving the first user input, initiating the process to create the first sticker, including:

automatically identifying a first object of the one or more objects in the first image without additional user input; and generating the first sticker for use within the messaging application, wherein the first sticker is a representation of the first object that has a shape based on an automatically determined shape of the first object in the first image, and is based on a first portion of the first image that includes the first object and is not based on a second portion of the first image that does not include the first object; and after initiating the process to create the first sticker, displaying, in the first user interface, the first sticker;

while displaying the first sticker, detecting, via the one or more input devices, a second user input corresponding to a request to place the first sticker in the messaging conversation; and in response to detecting the second user input, displaying the first sticker in the messaging conversation.

12. A non-transitory computer-readable storage medium storing one or more programs, the one or more programs comprising instructions, which, when executed by one or more processors of an electronic device, cause the electronic device to perform a method, comprising:

while displaying, via a display generation component, a first user interface corresponding to a messaging conversation in a messaging application, detecting, via one or more input devices, a first user input corresponding to a request to initiate a process to create a first sticker based on a first image including one or more objects, wherein the first sticker is for use in the messaging application;

in response to receiving the first user input, initiating the process to create the first sticker, including:

automatically identifying a first object of the one or more objects in the first image without additional user input; and generating the first sticker for use within the messaging application, wherein the first sticker is a representation of the first object that has a shape based on an automatically determined shape of the first object in the first image, and is based on a first portion of the first image that includes the first object and is not based on a second portion of the first image that does not include the first object; and after initiating the process to create the first sticker, displaying, in the first user interface, the first sticker;

while displaying the first sticker, detecting, via the one or more input devices, a second user input corresponding to a request to place the first sticker in the messaging conversation; and in response to detecting the second user input, displaying the first sticker in the messaging conversation.

13. The method of claim 1, further comprising:

prior to detecting the first user input, and while displaying the first user interface, detecting, via the one or more input devices, a third user input corresponding to a request to generate and access stickers for use in the messaging conversation, wherein the third user input corresponds to selection of an option corresponding to a sticker sub-application from a plurality of sub-applications; and in response to detecting the third user input, displaying a user interface of the sticker sub-application in the first user interface.

14. The method of claim 13, further comprising:

while displaying the user interface of the sticker sub-application in the first user interface, detecting, via the one or more input devices, a fourth user input corresponding to a request to access a plurality of stickers associated with a plurality of images, wherein the fourth user input corresponds to selection of an option corresponding to accessing the plurality of stickers associated with the plurality of images; and in response to detecting the fourth user input, displaying, in the first user interface, a user interface for generating and accessing the plurality of stickers associated with the plurality of images.

15. The method of claim 1, wherein the process to create the first sticker includes:

in response to generating the sticker, displaying a preview of the first sticker; and while displaying the preview of the first sticker, detecting a third user input to approve the first sticker, and after detecting the third user input to approve the first sticker, displaying the first sticker in the first user interface.

16. The method of claim 1, wherein the process to create the first sticker includes:

displaying, concurrently with the first user interface, a plurality of representations of a plurality of images including the first image, wherein each representation of the plurality of representations of images is selectable for sticker creation; and while displaying the plurality of representations of the plurality of images concurrently with the first user interface, receiving, via the one or more input devices, an input corresponding to a designation of the first image, wherein the input corresponds to selection of a first representation of the first image from the plurality of representations of the plurality of images.

17. The non-transitory computer-readable storage medium of claim 12, wherein the process to create the first sticker includes:

ceasing display of the first user interface corresponding to the messaging conversation; and displaying, via the display generation component, a camera user interface that is configured to capture the first image for designation for sticker creation.

18. The non-transitory computer-readable storage medium of claim 17, wherein the method further comprises:

while displaying the camera user interface, receiving, via the one or more input devices, a third user input to initiate a process to capture the first image via one or more cameras of the electronic device; and in response to receiving the third user input, capturing the first image via the one or more cameras of the electronic device, and after capturing the first image, initiating the process to create the first sticker, including automatically identifying the first object in the first image and generating the first sticker from the first image.

19. The non-transitory computer-readable storage medium of claim 12, wherein the first object has a respective characteristic having a first value in the first image, and has the respective characteristic having a second value, different from the first value, in the first sticker.

20. The non-transitory computer-readable storage medium of claim 12, wherein after identifying the first object of the one or more objects in the first image, the first portion of the first image that includes the first object is visually distinguished from the second portion of the first image that does not include the first object.

21. The non-transitory computer-readable storage medium of claim 12, wherein the first sticker is displayed with an outline that was not included around the first object in the first image.

22. The non-transitory computer-readable storage medium of claim 12, wherein the second user input corresponds to a request to place the first sticker in the messaging conversation by placing the first sticker on a respective image, and placing the respective image including the first sticker into the messaging conversation.

23. The non-transitory computer-readable storage medium of claim 12, wherein the method further comprises:

after initiating the process to create the first sticker, displaying, via the display generation component, the first user interface, including a first set of selectable options including a first selectable option that is selectable to display one or more stickers, including the first sticker, for use in the messaging application, and a second selectable option that is selectable to display a second user interface for performing one or more operations other than sticker operations with respect to the messaging application;

while displaying the first user interface, detecting, via the one or more input devices, a third user input corresponding to selection of the first selectable option; and in response to detecting the third user input, displaying, via the display generation component, a third user interface including the first sticker.

24. The non-transitory computer-readable storage medium of claim 12, wherein the method further comprises:

after initiating the process to create the first sticker, detecting, via the one or more input devices, a third user input corresponding to a request to alter a visual appearance of the first sticker; and in response to detecting the third user input, altering the visual appearance of the first sticker in accordance with the third user input.

25. The non-transitory computer-readable storage medium of claim 24, wherein the request to alter the visual appearance of the first sticker includes a request to alter one or more colors of the first sticker.

26. The non-transitory computer-readable storage medium of claim 24, wherein the request to alter the visual appearance of the first sticker includes a request to alter a first portion of the first sticker without altering a second portion of the first sticker.

27. The non-transitory computer-readable storage medium of claim 12, wherein the process to create the first sticker is performed within a first application, different from the messaging application.

28. The non-transitory computer-readable storage medium of claim 12, wherein the process to create the first sticker is performed within the messaging application, including displaying the first sticker in the messaging conversation.

29. The non-transitory computer-readable storage medium of claim 12, wherein the second user input corresponds to a request to place the first sticker in the messaging conversation by placing the first sticker on a second sticker, and placing the second sticker including the first sticker into the messaging conversation.

30. The non-transitory computer-readable storage medium of claim 12, wherein the second user input corresponds to a request to place the first sticker in the messaging conversation by placing the first sticker at a user-defined location within the messaging conversation, and displaying the first sticker in the messaging conversation includes displaying the first sticker at the user-defined location in the messaging conversation.

31. The non-transitory computer-readable storage medium of claim 12, wherein the first object is automatically identified based on a past history of a user of the electronic device.

32. The non-transitory computer-readable storage medium of claim 12, wherein the first object is automatically identified based on the first object being in a central region of the first image.

33. The non-transitory computer-readable storage medium of claim 12, wherein the first object is automatically identified based on the first object corresponding to a person or a pet included in the first image.

34. The non-transitory computer-readable storage medium of claim 12, wherein the first object is automatically identified based on the first object being further than a threshold distance from one or more other objects in the first image.

35. The non-transitory computer-readable storage medium of claim 12, wherein the method further comprises:

prior to detecting the first user input, and while displaying the first user interface, detecting, via the one or more input devices, a third user input corresponding to a request to generate and access stickers for use in the messaging conversation, wherein the third user input corresponds to selection of an option corresponding to a sticker sub-application from a plurality of sub-applications; and in response to detecting the third user input, displaying a user interface of the sticker sub-application in the first user interface.

36. The non-transitory computer-readable storage medium of claim 35, wherein the method further comprises:

while displaying the user interface of the sticker sub-application in the first user interface, detecting, via the one or more input devices, a fourth user input corresponding to a request to access a plurality of stickers associated with a plurality of images, wherein the fourth user input corresponds to selection of an option corresponding to accessing the plurality of stickers associated with the plurality of images; and in response to detecting the fourth user input, displaying, in the first user interface, a user interface for generating and accessing the plurality of stickers associated with the plurality of images.

37. The non-transitory computer-readable storage medium of claim 12, wherein the process to create the first sticker includes:

in response to generating the sticker, displaying a preview of the first sticker; and while displaying the preview of the first sticker, detecting a third user input to approve the first sticker, and after detecting the third user input to approve the first sticker, displaying the first sticker in the first user interface.

38. The non-transitory computer-readable storage medium of claim 12, wherein the process to create the first sticker includes:

displaying, concurrently with the first user interface, a plurality of representations of a plurality of images including the first image, wherein each representation of the plurality of representations of images is selectable for sticker creation; and while displaying the plurality of representations of the plurality of images concurrently with the first user interface, receiving, via the one or more input devices, an input corresponding to a designation of the first image, wherein the input corresponds to selection of a first representation of the first image from the plurality of representations of the plurality of images.

39. The non-transitory computer-readable storage medium of claim 12, wherein the first image includes a live image captured by one or more cameras of the electronic device.

40. The electronic device of claim 11, wherein the process to create the first sticker includes:

ceasing display of the first user interface corresponding to the messaging conversation; and displaying, via the display generation component, a camera user interface that is configured to capture the first image for designation for sticker creation.

41. The electronic device of claim 40, wherein the method further comprises:

while displaying the camera user interface, receiving, via the one or more input devices, a third user input to initiate a process to capture the first image via one or more cameras of the electronic device; and in response to receiving the third user input, capturing the first image via the one or more cameras of the electronic device, and after capturing the first image, initiating the process to create the first sticker, including automatically identifying the first object in the first image and generating the first sticker from the first image.

42. The electronic device of claim 11, wherein the first object has a respective characteristic having a first value in the first image, and has the respective characteristic having a second value, different from the first value, in the first sticker.

43. The electronic device of claim 11, wherein the process to create the first sticker is performed within a first application, different from the messaging application.

44. The electronic device of claim 11, wherein the process to create the first sticker is performed within the messaging application, including displaying the first sticker in the messaging conversation.

45. The electronic device of claim 11, wherein the first object is automatically identified based on a past history of a user of the electronic device.

46. The electronic device of claim 11, wherein the first object is automatically identified based on the first object being in a central region of the first image.

47. The electronic device of claim 11, wherein the first object is automatically identified based on the first object corresponding to a person or a pet included in the first image.

48. The electronic device of claim 11, wherein the first object is automatically identified based on the first object being further than a threshold distance from one or more other objects in the first image.

49. The electronic device of claim 11, wherein the first image includes a live image captured by one or more cameras of the electronic device.

* * * * *